(12) United States Patent
Park et al.

(10) Patent No.: US 10,747,015 B2
(45) Date of Patent: Aug. 18, 2020

(54) LENS DRIVING APPARATUS, AND CAMERA MODULE AND OPTICAL DEVICE INCLUDING SAME

(71) Applicant: LG INNOTEK CO., LTD., Seoul (KR)

(72) Inventors: Tae Bong Park, Seoul (KR); Jun Taek Lee, Seoul (KR); Kyoung Ho Yoo, Seoul (KR); Seung Taek Shin, Seoul (KR); Jin Suk Han, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 135 days.

(21) Appl. No.: 16/085,434

(22) PCT Filed: Mar. 16, 2017

(86) PCT No.: PCT/KR2017/002834
§ 371 (c)(1),
(2) Date: Sep. 14, 2018

(87) PCT Pub. No.: WO2017/160094
PCT Pub. Date: Sep. 21, 2017

(65) Prior Publication Data
US 2019/0094565 A1  Mar. 28, 2019

(30) Foreign Application Priority Data

Mar. 17, 2016 (KR) .................. 10-2016-0031871
Mar. 25, 2016 (KR) .................. 10-2016-0035737

(51) Int. Cl.
*G02B 27/64* (2006.01)
*G02B 7/02* (2006.01)
*G03B 11/04* (2006.01)
*G03B 5/04* (2006.01)
(Continued)

(52) U.S. Cl.
CPC ............ *G02B 27/646* (2013.01); *G02B 7/02* (2013.01); *G02B 7/08* (2013.01); *G02B 13/001* (2013.01);
(Continued)

(58) Field of Classification Search
CPC .......... G02B 27/646; G02B 7/02; G02B 7/08; G02B 13/001; G03B 5/04; G03B 11/04;
(Continued)

(56) References Cited

U.S. PATENT DOCUMENTS

2011/0217029 A1* 9/2011 Wu .................. G03B 17/00
396/55
2012/0314307 A1* 12/2012 Ikushima ............. G02B 27/646
359/814
(Continued)

FOREIGN PATENT DOCUMENTS

CN      104902149 A    9/2015
JP      2011-085666 A  4/2011
(Continued)

*Primary Examiner* — Sinh Tran
*Assistant Examiner* — Zhenzhen Wu
(74) *Attorney, Agent, or Firm* — Birch, Stewart, Kolasch & Birch, LLP

(57) ABSTRACT

One embodiment comprises: a housing; a bobbin arranged in the housing so as to mount a lens therein; a magnet arranged in the housing; a first coil, which is arranged in the bobbin and moves in the optical axial direction according to an interaction with the magnet; an elastic member coupled with the bobbin and the housing; a second coil to which a first drive signal is applied, and moving the housing in a direction perpendicular to the optical axial direction according to the interaction with the magnet; a location sensor for sensing the strength of the magnetic field of the magnet according to the movement of the housing; and a third coil to which a second drive signal is applied, and is arranged in correspondence with the location sensor, wherein a first magnetic field, of the second coil, which is generated by the first drive signal, and a second magnetic field, of the third coil, which is generated by the second drive signal, are generated in directions offsetting each other.

20 Claims, 27 Drawing Sheets

(51) Int. Cl.
*G02B 7/08* (2006.01)
*G03B 17/08* (2006.01)
*G02B 13/00* (2006.01)
*H04N 5/225* (2006.01)
*H04N 5/232* (2006.01)

(52) U.S. Cl.
CPC ............... *G03B 5/04* (2013.01); *G03B 11/04* (2013.01); *G03B 17/08* (2013.01); *H04N 5/2257* (2013.01); *H04N 5/23287* (2013.01); *G03B 2205/0069* (2013.01)

(58) Field of Classification Search
CPC ... G03B 17/08; H04N 5/2257; H04N 5/23287
See application file for complete search history.

(56) References Cited

U.S. PATENT DOCUMENTS

| 2013/0050828 A1* | 2/2013 | Sato | G02B 27/64 |
| | | | 359/557 |
| 2013/0215511 A1* | 8/2013 | Wu | G02B 27/646 |
| | | | 359/554 |
| 2014/0177056 A1 | 6/2014 | Hayashi et al. | |
| 2015/0022891 A1 | 1/2015 | Hu et al. | |
| 2016/0011394 A1 | 1/2016 | Cho et al. | |
| 2016/0025995 A1 | 1/2016 | Ariji | |
| 2016/0154249 A1 | 6/2016 | Yeo | |
| 2017/0108705 A1* | 4/2017 | Yu | H04N 5/23216 |

FOREIGN PATENT DOCUMENTS

| JP | 2013-024938 A | 2/2013 |
| JP | 2013-024944 A | 2/2013 |
| JP | 2015-96975 A | 5/2015 |
| KR | 10-2013-0072721 A | 7/2013 |
| KR | 10-2014-0140329 A | 12/2014 |
| KR | 10-2015-0007699 A | 1/2015 |
| KR | 10-2015-0051097 A | 5/2015 |
| KR | 10-2015-0054719 A | 5/2015 |
| KR | 10-2015-0109894 A | 10/2015 |
| KR | 10-2016-0021158 A | 2/2016 |
| WO | WO 2017/084090 A1 | 5/2017 |

* cited by examiner

LENS DRIVING APPARATUS, AND CAMERA MODULE AND OPTICAL DEVICE INCLUDING SAME

CROSS REFERENCE TO RELATED APPLICATIONS

This application is the National Phase of PCT International Application No. PCT/KR2017/002834, filed on Mar. 16, 2017, which claims priority under 35 U.S.C. 119(a) to Patent Application Nos. 10-2016-0031871, filed in the Republic of Korea on Mar. 17, 2016 and 10-2016-0035737, filed in the Republic of Korea on Mar. 25, 2016, all of which are hereby expressly incorporated by reference into the present application.

TECHNICAL FIELD

Embodiments relate to a lens moving apparatus and to a camera module and an optical device each including the same.

BACKGROUND ART

Technology of a voice coil motor (VCM), which is used in existing general camera modules, is difficult to apply to a micro-scale, low-power camera module, and studies related thereto have been actively conducted.

The demand for electronic products, such as a smartphone and a cellular phone equipped with a camera, is increasing. The trend is for a camera for a cellular phone to become high-resolution and miniaturized, and the associated actuator is correspondingly developed so as to realize miniaturization, a large aperture and multiple functions. In order to realize a high-resolution camera for a cellular phone, there are demands for increased performance of the camera for a cellular phone and for additional functions, such as autofocusing, reduction in shaking of a shutter, zooming and the like.

DISCLOSURE

Technical Problem

The embodiments provide a lens moving apparatus, which is capable of reducing the influence of an induction magnetic field of an OIS coil on an OIS position sensor and of ensuring the stability of OIS feedback control and reliability of handshake correction, and to a camera module and an optical device each including the same.

Technical Solution

A lens moving apparatus according to an embodiment includes a housing; a bobbin disposed in the housing for mounting of a lens; a magnet disposed on the housing; a first coil disposed on the bobbin, the first coil being moved in an optical-axis direction via interaction with the magnet; an elastic member coupled to the bobbin and the housing; a second coil, to which a first drive signal is applied, the second coil moving the housing in a direction perpendicular to the optical-axis direction via interaction with the magnet; a position sensor for detecting the intensity of a magnetic field of the magnet depending on movement of the housing; and a third coil, to which a second drive signal is applied and which is disposed so as to correspond to the position sensor, wherein a first magnetic field of the second coil, which is generated in response to the first drive signal, and a second magnetic field of the third coil, which is generated in response to the second drive signal, are directed so as to counteract each other.

The lens moving apparatus may further include a circuit board disposed under the housing and providing the first drive signal and the second drive signal, wherein the third coil is provided at the circuit board.

The second coil may be disposed on the circuit board, and the position sensor may be disposed under the circuit board.

Each of the second coil and the third coil may be configured to have a loop shape, which is wound clockwise or counterclockwise about the optical-axis, and a number of times the third coil is wound may be smaller than a number of times the second coil is wound.

At least part of the third coil may overlap the position sensor in the optical-axis direction.

Intensity of the second magnetic field may be smaller than intensity of the first magnetic field.

The third coil may include: a first wire with one end connected to one terminal of the circuit board; a second wire with one end connected to another terminal of the circuit board; and a loop portion connected between the other end of the first wire and the other end of the second wire and having a loop shape.

A point at which the other end of the first wire is connected to one end of the loop portion and a point at which the other end of the second wire is connected to the other end of the loop portion may be spaced apart from each other by a predetermined distance.

The housing may include a protrusion projecting upwards from an upper surface thereof and positioned outside the upper elastic member, wherein the protrusion overlaps the upper elastic member in the direction perpendicular to the optical-axis.

The housing may further include an upper stopper projecting upwards from the upper surface thereof and positioned inside the upper stopper, wherein an upper end of the protrusion is lower than an upper end of the upper stopper but higher than the upper elastic member, and wherein at least part of the upper elastic member is positioned between the upper stopper and the protrusion.

Advantageous Effects

Embodiments are capable of reducing the influence of an induction magnetic field of an OIS coil on an OIS position sensor and of ensuring the stability of OIS feedback control and reliability of handshake correction.

BEST MODE

Hereinafter, embodiments will be clearly elucidated via description thereof with reference to the accompanying drawings. In the following description of the embodiments, it will be understood that, when an element such as a layer (film), region, pattern, or structure is referred to as being "on" or "under" another element, it can be "directly" on or under the other element, or can be "indirectly" formed such that an intervening element may also be present. In addition, it will also be understood that the meaning of "on" and "under" are determined on the basis of the drawings. The same reference numbers will be used throughout the drawings to refer to the same or like parts.

Hereinafter, a lens moving apparatus according to an embodiment will be described with reference to the accompanying drawings. For the convenience of description, although the lens moving apparatus is described using a rectangular coordinate system (x, y, z), the lens moving apparatus may be described using some other coordinate systems, and the embodiment is not limited thereto. In the respective drawings, the X-axis and the Y-axis mean directions perpendicular to an optical-axis, i.e. the Z-axis, and the optical-axis (Z-axis) direction may be referred to as a "first direction", the X-axis direction may be referred to as a "second direction", and the Y-axis direction may be referred to as a "third direction".

A "handshake correction device", which is applied to a subminiature camera module of a mobile device such as, for example, a smart phone or a tablet PC, may be a device that is configured to move a lens moving apparatus in a direction perpendicular to the optical-axis or to tilt the lens moving apparatus so as to counteract vibration or motion caused by shaking of the user's hand when capturing a still image.

In addition, an "auto-focusing device" is a device that automatically focuses an image of a subject on an image sensor by moving a lens moving apparatus in the optical-axis direction depending on the distance to the subject. The handshake correction device and the auto-focusing device may be configured in various ways, and the lens moving apparatus according to the embodiment may move an optical module, which is constituted of at least one lens, in the first direction, or relative to a plane defined by the second and third directions, which are perpendicular to the first direction, thereby performing handshake correction motion and/or auto-focusing.

Figure 1:
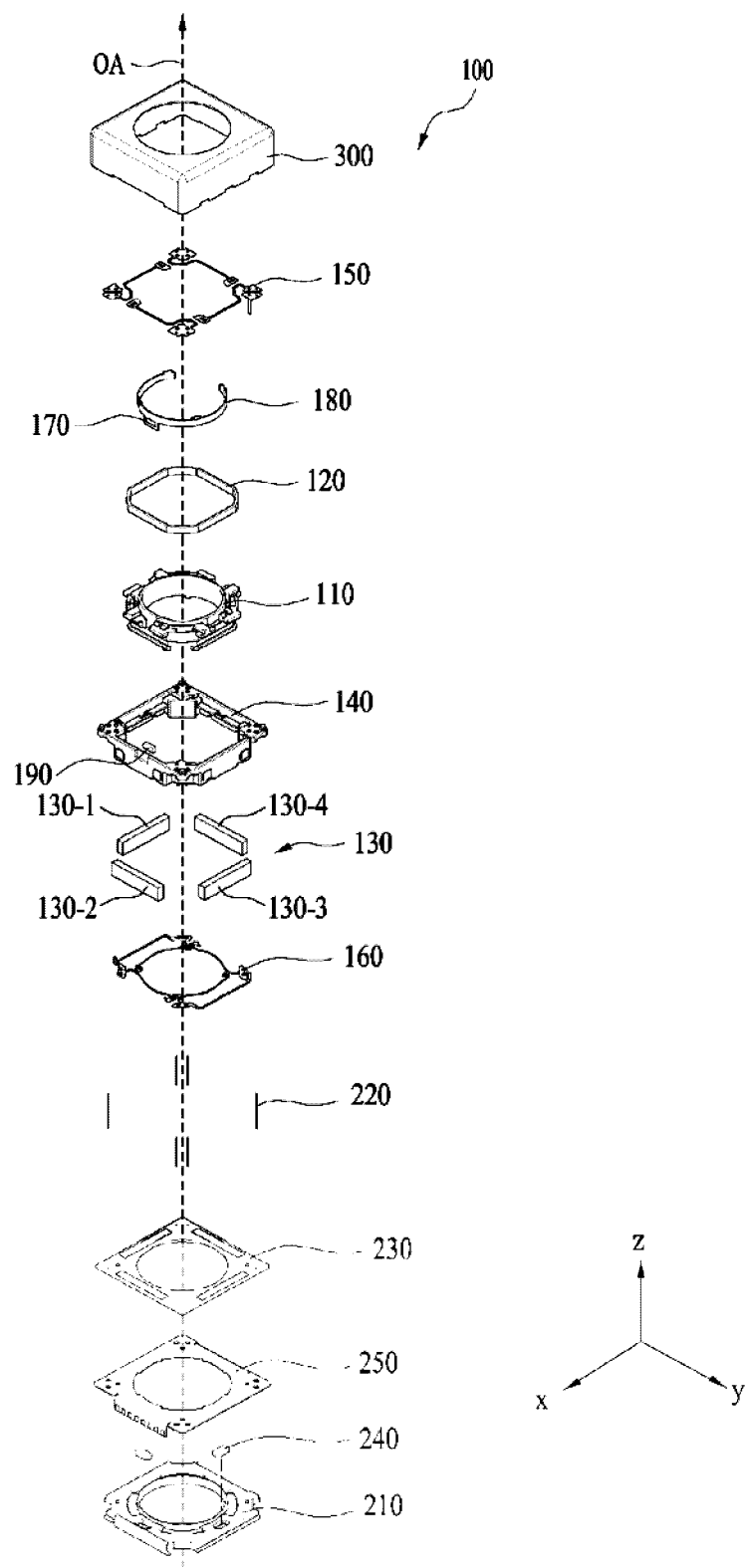
FIG. 1 is an exploded perspective view of a lens moving apparatus.
Figure 2:
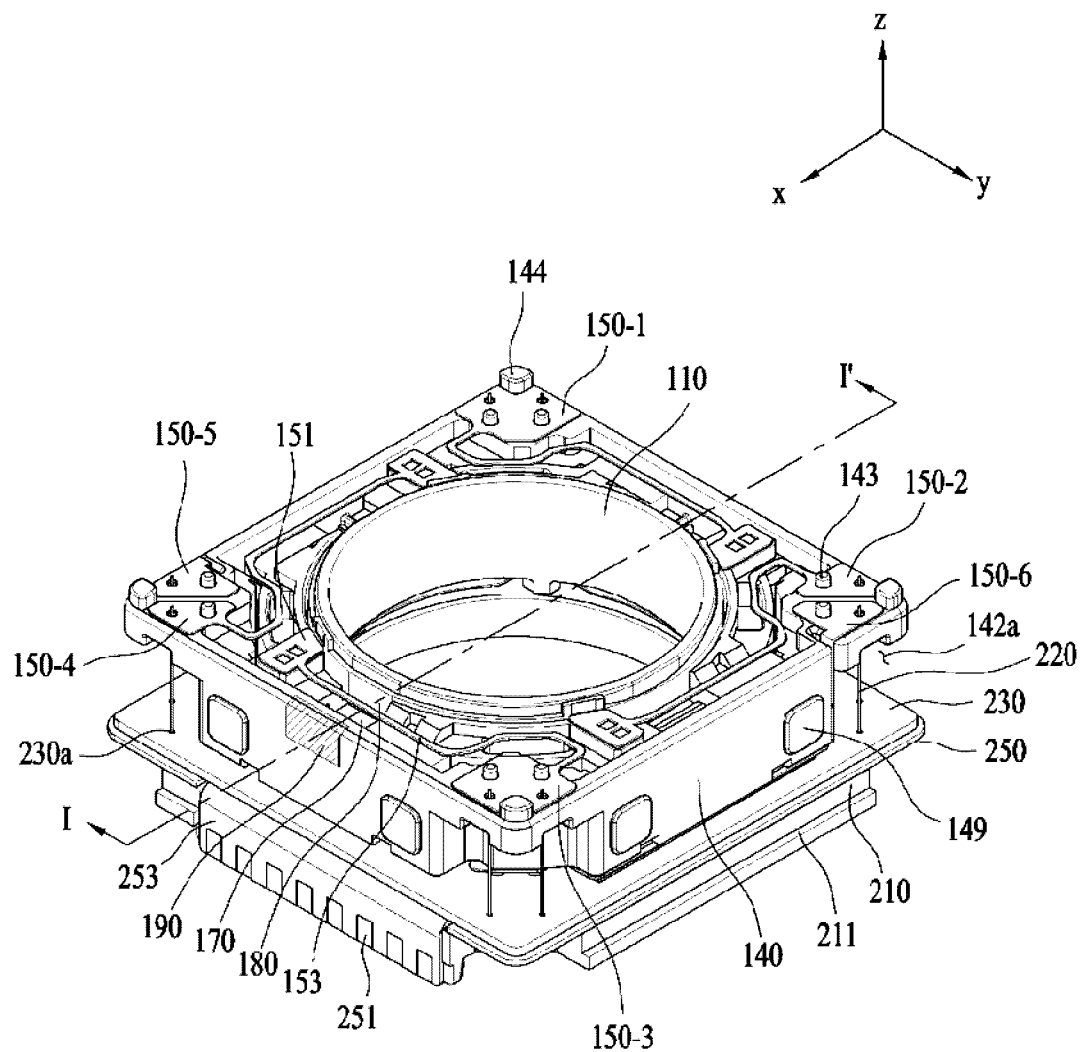
FIG. 2 is an assembled perspective view illustrating the lens moving apparatus shown in FIG. 1, from which a cover member is removed.

FIG. 1 is a schematic perspective view illustrating the lens moving apparatus 100 according to an embodiment, and FIG. 2 is an exploded perspective view of the lens moving apparatus 100 illustrated in FIG. 1.

Referring to FIGS. 1 and 2, the lens moving apparatus 100 may include a cover member 300, an upper elastic member 150, a sensor board 180, a first position sensor 170, a first coil 120, a bobbin 110, a housing 140, a first magnet 130, a lower elastic member 160, a plurality of support members 220, a circuit board 250, a third coil 260 and a base 210.

The lens moving apparatus 100 according to the embodiment may further include a second magnet 190, which serves as a sensing magnet for the first position sensor 170.

The lens moving apparatus 100 according to the embodiment may further include a second coil 230, which interacts with the first magnet 130 for handshake correction.

The lens moving apparatus 100 according to the embodiment may further include a second position sensor 240 for detecting the intensity of a magnetic field of the first magnet 130 for handshake correction.

First, the cover member 300 will be described.

The cover member 300 defines an accommodation space along with the base 210, such that the upper elastic member 150, the bobbin 110, the first coil 120, the housing 140, the second magnet 190, the first magnet 130, the lower elastic member 160, the support members 220, the second coil 230, and the circuit board 250 are accommodated in the accommodation space.

The cover member 300 may take the form of a box that has an open bottom and includes an upper end portion and sidewalls. The bottom of the cover member 300 may be coupled to the top of the base 210. The upper end portion of the cover member 300 may have a polygonal shape, such as, for example, a square or octagonal shape.

The cover member 300 may have a bore formed in the upper end portion thereof in order to expose a lens (not shown), coupled to the bobbin 110, to outside light. In addition, the bore of the cover member 300 may be provided with a window formed of a light-transmitting material, in order to prevent impurities, such as, for example, dust or moisture, from entering a camera module.

Although the material of the cover member 300 may be a non-magnetic material such as, for example, SUS in order to prevent the cover member 300 from being attracted by the first magnet 130, the cover member 300 may be formed of a magnetic material, and may function as a yoke.

Figure 3:
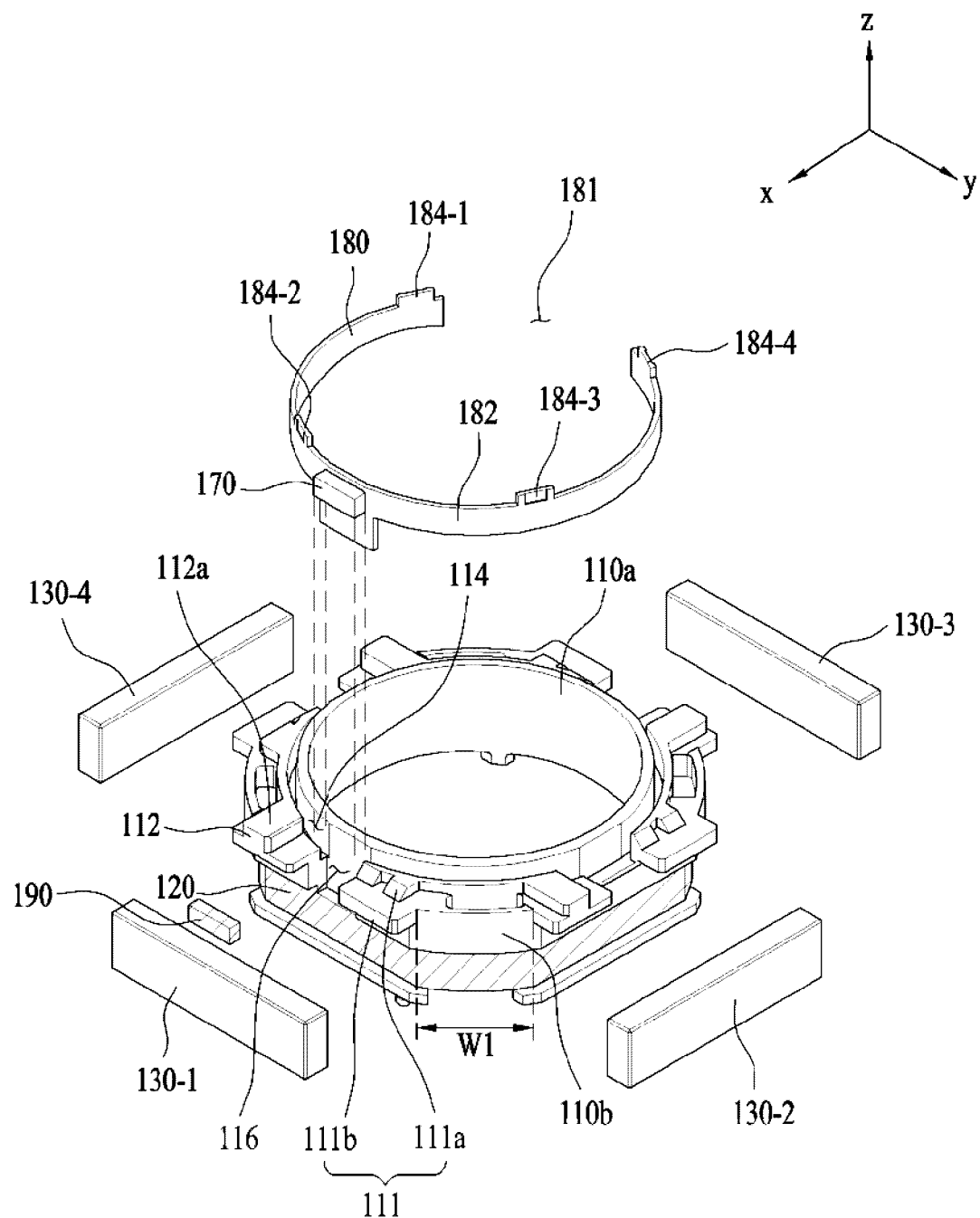
FIG. 3 is an exploded perspective view of a bobbin, a first coil, a first magnet, a second magnet, a first position sensor, and a sensor board, which are illustrated in FIG. 1.
Figure 4:
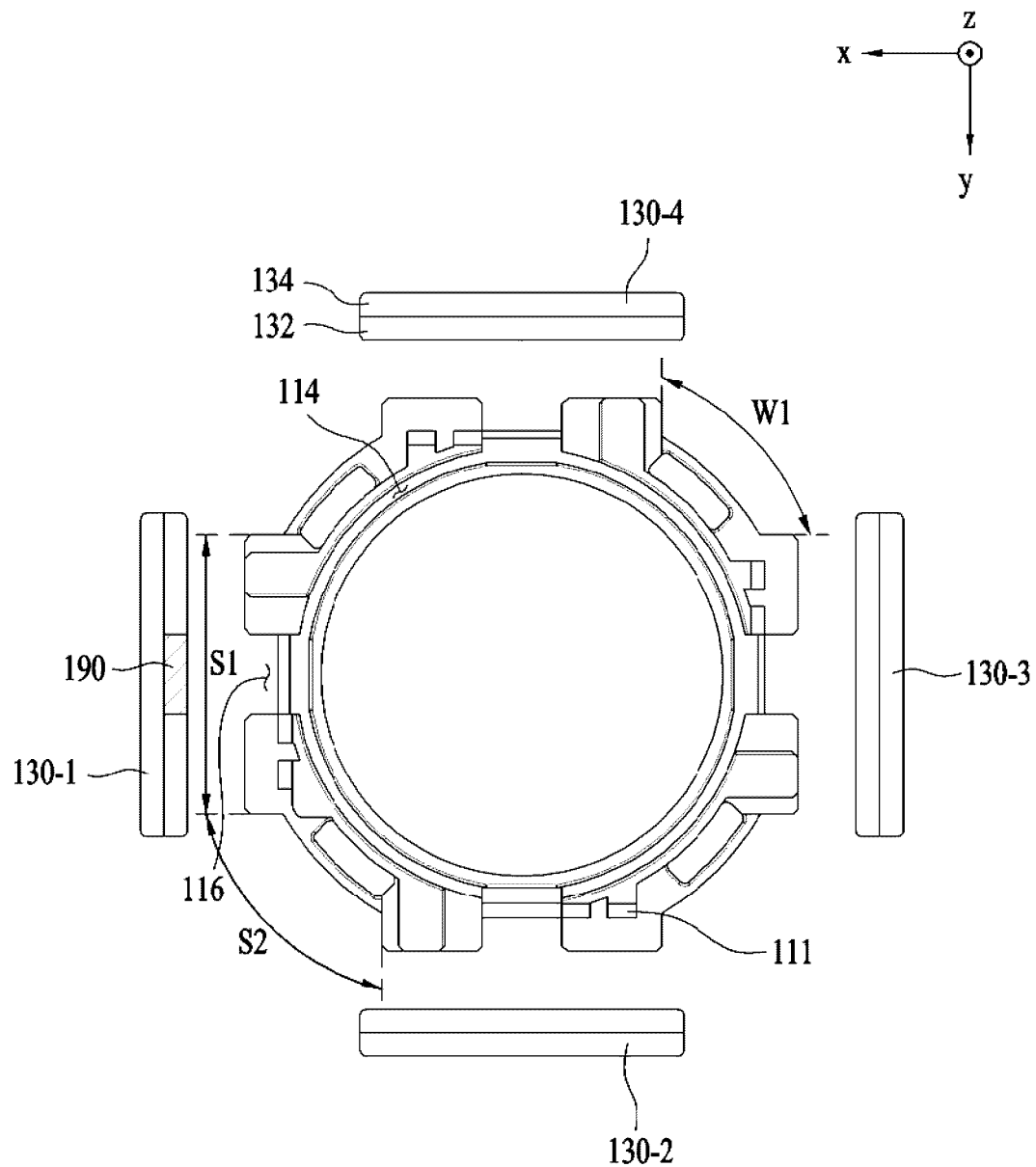
FIG. 4 is a plan view illustrating the bobbin and the second magnet, which are illustrated in FIG. 3.

FIG. 3 is an assembled perspective view illustrating the lens moving apparatus 100 after removal of the cover member 300 of FIG. 1, and FIG. 4 is an exploded perspective view of the bobbin 110, the first coil 120, the second magnet 190, the first magnets 130-1 to 130-4, the first position sensor 170, and the sensor board 180 illustrated in FIG. 1.

Next, the bobbin 110 will be described.

Referring to FIGS. 3 and 4, the bobbin 110 is placed inside the housing 140, and is movable in the direction of the optical-axis or in the first direction, for example, in the Z-axis direction, via electromagnetic interaction between the first coil 120 and the first magnet 130.

The bobbin 110 may be provided with a lens mounted thereon, or may include a lens barrel (not shown) in which at least one lens is installed. The lens barrel may be coupled inside the bobbin 110 in various manners.

The bobbin 110 may be configured to have a bore for mounting the lens or the lens barrel. The bore may have a circular, elliptical, or polygonal shape, without being limited thereto.

The bobbin 110 may include a first protrusion 111 and a second protrusion 112.

The first protrusion 111 of the bobbin 110 may include a guide portion 111a and a first stopper 111b.

The guide portion 111a of the bobbin 110 may serve to guide the position at which the upper elastic member 150 is installed. For example, as exemplarily illustrated in FIG. 3, the guide portion 111a of the bobbin 110 may define the path along which a first frame connector 153 of the upper elastic member 150 extends.

For example, a plurality of guide portions 111a may protrude in the second and third directions, which are perpendicular to the first direction. In addition, the guide portions 111a may be arranged in a pattern symmetric with respect to the center of the plane defined by the x-axis and the y-axis, as illustrated in the drawings, or may be arranged in a pattern asymmetric with respect to the center without interference with other components, unlike the embodiment illustrated in the drawings.

The second protrusion 112 of the bobbin 110 may be formed so as to protrude in the second and third directions, which are perpendicular to the first direction. In addition, the second protrusion 112 of the bobbin 110 may have an upper surface 112a having a shape on which the first inner frame 151 is mounted.

The first stopper 111b of the first protrusion 111 of the bobbin 110 and the second protrusion 112 of the bobbin 110 may serve to prevent the bottom surface of the body of the bobbin 110 from directly colliding with the base 210 and the upper surface of the circuit board 250 even if the bobbin 110 moves beyond a prescribed range due to, for example, external shocks, when being moved in the first direction parallel to the optical-axis and a direction parallel to the first direction for auto-focusing.

The bobbin 110 may have a support groove 114, which is depressed from the upper surface of the bobbin 110 and disposed between the inner circumferential surface 110a and the outer circumferential surface of the bobbin 110 so as to allow the sensor board 180 to be inserted into the bobbin 110 in the first direction (in the Z-axis direction).

For example, the support groove 114 in the bobbin 110 may be provided between the inner circumferential surface 110a and the outer circumferential surface 110b of the bobbin 110 so as to enable the insertion of the sensor board 180 in the first direction (in the Z-axis direction). For example, the support groove 114 of the bobbin 110 may be provided between the inner circumferential surface 110a and the first and second protrusions 111 and 112.

The bobbin 110 may have a receiving recess 116, in which the first position sensor 170, which is disposed, coupled, or mounted on the sensor board 180, is received or disposed.

For example, the receiving recess 116 of the bobbin 110 may be provided in the space between the first and second protrusions 111 and 112 of the bobbin 110, so as to allow the first position sensor 170, mounted on the sensor board 180, to be inserted in the first direction. The receiving recess 116 of the bobbin 110 may be depressed from the outer circumferential surface of the bobbin 110, and may be connected or adjacent to the support groove 114.

The bobbin 110 may have a support protrusion 117 (see FIG. 8) formed on the lower surface thereof so as to be coupled and fixed to the lower elastic member 160.

When the state in which the lower surface of the first protrusion 111 and the lower surface of the second protrusion 112 of the bobbin 110 are in contact with the bottom surface 146a of a first mounting groove 146 of the housing 140 is set to be an initial position, the auto-focusing function may be controlled as in unidirectional control in an existing voice coil motor (VCM). Specifically, the bobbin 100 may be raised when current is supplied to the first coil 120, and may be lowered when the supply of current to the first coil 120 is cut off, thereby performing the auto-focusing function.

However, when the position at which the lower surface of the first protrusion 111 and the lower surface of the second protrusion 112 of the bobbin 110 are spaced apart from the bottom surface 146a of the first seating groove 146 by a predetermined distance is set to be the initial position of the bobbin 110, the auto-focusing function may be controlled depending on the direction of current, as in bidirectional control in an existing voice coil motor. Specifically, the auto-focusing function may also be fulfilled by moving the bobbin 110 in an upward or downward direction parallel to the optical-axis. For example, the bobbin 110 may be moved upwards when forward drive current is applied to the first coil 120, and may be moved downwards when reverse drive current is applied to the first coil 120.

Next, the first coil 120 will be described.

The first coil 120 is disposed on the outer circumferential surface 110b (see FIG. 3) of the bobbin 110. The first coil 120 may be located so as not to overlap the first position sensor 170 in the second or third direction.

In order to ensure that the first coil 130 and the first position sensor 170 do not interfere or overlap each other in the second or third direction, the first coil 120 and the first position sensor 170 may be located on the outer circumferential surface 110b of the bobbin 110 so as to be spaced apart from each other. For example, the first coil 120 may be located on the lower side or the lower portion of the outer circumferential surface 110*a* of the bobbin 110, and the first position sensor 170 may be located on the upper side of the first coil 120.

The first coil 120, as exemplarily illustrated in FIG. 3, may be disposed on the outer circumferential surface 110*a* of the bobbin 110 so as to be wound in the clockwise or counterclockwise direction about the optical-axis OA.

The first coil 120 may be fitted, disposed, wound or secured in a groove 118 (see FIG. 8) formed in the outer circumferential surface 110*b* of the bobbin 110.

In FIG. 3, although the first coil 120 may be situated directly on the outer circumferential surface 110*b* of the bobbin 110, the disclosure is not limited thereto. In another example, the first coil 120 may be disposed on the outer circumferential surface 110*b* of the bobbin 110 via a coil ring. In this case, the coil ring may be coupled to the bobbin 110 in the same manner as the manner in which the sensor board 180 is fitted into the support groove 114 in the bobbin 110.

Figure 5A:
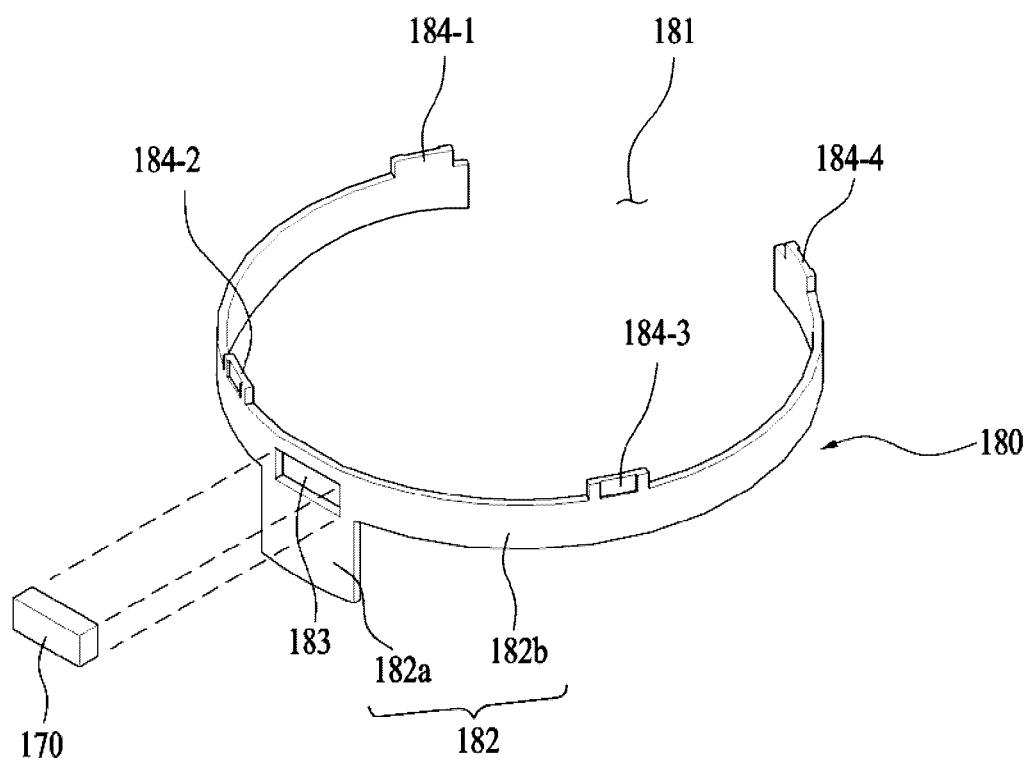
FIG. 5a is an exploded perspective view illustrating the sensor board and the first position sensor, which are illustrated in FIG. 3.

As illustrated in FIG. 1, the first coil 120 may be configured to have an octagonal shape. The reason for this is because the shape of the first coil 120 is configured to correspond to the shape of the outer circumferential surface of the bobbin 110, which is octagonal, as illustrated in FIG. 5A.

At least four sides of the first coil 120 may be configured to have a linear shape, and the corner portions between the four sides may also be configured to have a linear shape. However, they may also be configured to have a round shape.

The first coil 120 may produce electromagnetic force via electromagnetic interaction between the first coil 120 and the magnet 130 when a drive signal, for example, drive current is supplied thereto, thereby moving the bobbin 110 in the first direction using the electromagnetic force.

The first coil 120 may be configured to correspond to the first magnet 130. When the first magnet 130 is constituted by a single body such that the surface of the first magnet 130 that faces the first coil 120 has the same polarity, the surface of the first coil 120 that faces the first magnet 130 may also be configured to have the same polarity.

If the first magnet 130 is divided into two or four segments by a plane, which is perpendicular to the optical-axis, such that the surface of the magnet 130 that faces the first coil 120 is correspondingly sectioned into two or more surfaces, the first coil 120 may also be divided into a number of coil segments that corresponds to the number of first magnet segments.

Next, the first position sensor 170 and the sensor board 180 will be described.

The first position sensor 170 may be disposed, coupled, or mounted on the bobbin 110 so as to move along with the bobbin 110.

The first position sensor 170 may move along with the bobbin 110 when the bobbin 110 moves in the optical-axis direction OA.

The first position sensor 170 may detect the intensity of the magnetic field of the second magnet 190 depending on the movement of the bobbin 110, and may form an output signal based on the result of the detection. The displacement of the bobbin 110 may be adjusted in the optical-axis direction OA depending on the output signal of the first position sensor 170.

For example, the first position sensor 170 may detect the sum of the intensity of the magnetic field of the second magnet 190 and the intensity of the magnetic field of the first magnet 130 depending on the movement of the bobbin 110, and may form an output signal based on the result of the detection.

The first position sensor 170 may be conductively connected to the sensor board 180. The first position sensor 170 may take the form of a driver that includes a Hall sensor, or may take the form of a position detection sensor alone such as, for example, a Hall sensor.

The first position sensor 170 may be disposed, coupled, or mounted on the bobbin 110 in various forms, and may receive current in various ways depending on the manner in which the first position sensor 170 is disposed, coupled, or mounted.

The first position sensor 170 may be disposed, coupled, or mounted on the outer circumferential surface 110*b* of the bobbin 110.

For example, the first position sensor 170 may be disposed, coupled, or mounted on the sensor board 180, and the sensor board 180 may be disposed or coupled to the outer circumference surface 110*b* of the bobbin 110. In other words, the first position sensor 170 may be indirectly disposed, coupled or mounted on the bobbin 110 via the sensor board 180.

The first position sensor 170 may be conductively connected to at least one of the upper elastic member 150 and the lower elastic member 160, which will be described later. For example, the first position sensor 170 may be conductively connected to the upper elastic member 150.

Figure 5B:
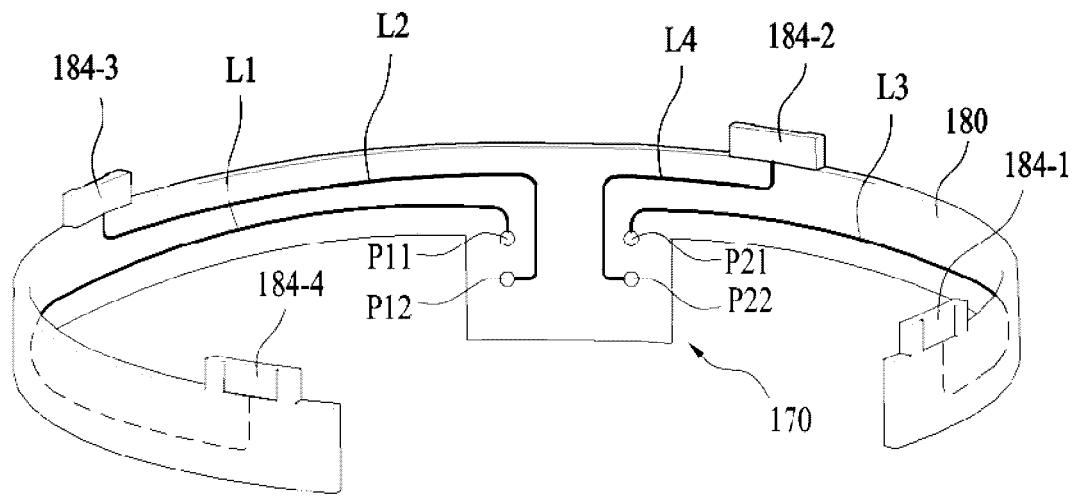
FIG. 5b is a rear perspective view illustrating an embodiment of the sensor board illustrated in FIG. 3.

FIG. 4 is a plan view illustrating the bobbin 110 and the first magnet 130 (130-1, 130-2, 130-3 and 130-4), which are illustrated in FIG. 3. FIG. 5*a* is an exploded perspective view illustrating the sensor board 180 and the first position sensor 170, which are illustrated in FIG. 3. FIG. 5*b* is a rear perspective view illustrating the sensor board 180 according to an embodiment, which is illustrated in FIG. 3.

Referring to FIGS. 3 to 5*c*, the sensor board 180 may be mounted on the bobbin 110, and may move along with the bobbin 110 in the optical-axis direction OA.

For example, the sensor board 180 may be coupled to the bobbin 110 by being fitted or disposed in the support groove 114 in the bobbin 110. It is sufficient for the sensor board 180 to be mounted on the bobbin 110. Although FIG. 5*a* illustrates a sensor board 180 having an open ring shape, the disclosure is not limited thereto.

The first position sensor 170 may be attached to and supported by the front surface of the sensor board 180 using an adhesive member such as, for example, epoxy or a piece of double-sided tape.

The outer circumferential surface 110*b* of the bobbin 110 may include first side surfaces S1 and second side surfaces S2. The first side surfaces S1 correspond to first side portions 141 of the housing 140 on which the first magnet 130 is disposed. The second side surfaces S2 are located between the first side surfaces S1 so as to connect the first side surfaces S1 to one another.

The first position sensor 170 may be disposed on any one of the first side surfaces S1 of the bobbin 110. For example, the recess 116 in the bobbin 110 may be provided in either one of the first side surfaces S1 of the bobbin 110, and the first position sensor 170 may be located in the recess 116 in the bobbin 110.

The first position sensor 170 may be disposed, coupled, or mounted to an upper portion, a middle portion, or a lower portion of the outer circumferential surface of the sensor board 180 in various forms.

For example, the first position sensor 170 may be disposed on any one of the upper portion, the middle portion and the lower portion of the outer circumferential surface of the sensor board 180 so as to be disposed or directed in the first direction in the space between the first and second magnets 190 and 130 at the initial position of the bobbin 110. The first position sensor 170 may receive a drive signal, for example, drive current, from outside through a circuit of the sensor board 180.

For example, the first position sensor 170 may be disposed, coupled or mounted on the upper portion of the outer circumferential surface of the sensor board 180 so as to be positioned or arranged in the space between the first and second magnets 190 and 130 in the first direction at the initial position of the bobbin 110. The first position sensor 170 may be disposed on the upper portion of the outer circumferential surface of the sensor board 180 so as to be positioned as far from the first coil 120 as possible such that the first position sensor 170 is not influenced by the magnetic field generated by the first coil 120, thereby preventing malfunctions or errors of the first position sensor 170.

For example, the sensor board 180 may have a mounting recess 183 formed in the upper portion of the outer circumferential surface thereof, and the first position sensor 170 may be disposed, coupled or mounted in the mounting recess 183 in the sensor board 180.

In order to allow more efficient injection of epoxy or the like for assembly of the first position sensor 170, at least one surface of the mounting recess 183 of the sensor board 180 may be provided with an inclined surface (not shown). Although additional epoxy or the like may not be injected into the mounting recess 183 in the sensor board 180, it may be possible to increase the force with which the first position sensor 170 is disposed, coupled or mounted by injecting epoxy or the like into the mounting recess 183.

The sensor board 180 may include a body 182, elastic member contact portions 184-1 to 184-4, and a circuit pattern L1-L4.

When the support groove 114 in the bobbin 110 has the same shape as that of the outer circumferential surface of the bobbin 1100, the body 182 of the sensor board 180, which is fitted into the support groove 114 in the bobbin 110, may have a shape that is capable of being fitted into the groove 114 and being secured therein.

Although the support groove 114 in the bobbin 110 and the body 182 of the sensor board 180 may have a circular flat ring or strip shape when viewed in a plan view, as illustrated in FIGS. 3 to 5c, the disclosure is not limited thereto. In another embodiment, the support groove 114 in the bobbin 110 and the body 182 of the sensor board 180 may have a polygonal shape when viewed in a plan view.

The body 182 of the sensor board 180 may include a first segment 182a, on which the first position sensor 170 is disposed, coupled, or mounted, and a second segment 182b, which extends from the first segment 182a and which is fitted into the support groove 114 in the bobbin 110.

Although the sensor board 180 may have an opening 181 in the portion thereof that faces the first segment 182a so as to be easily fitted into the support groove 114 in the bobbin 110, the disclosure is not limited to any specific structure of the sensor board 180.

The elastic member contact portions 184-1 to 184-4 of the sensor board 180 may protrude from the body 182 of the sensor board 180, for example, in the first direction, i.e., the optical-axis direction or a direction parallel to the first direction such that the contact portions can come into contact with the first inner frame 151.

The elastic member contact portions 184-1 to 184-4 of the sensor board 180 may be connected or coupled to the first inner frame 151 of the upper elastic member 150.

The circuit pattern L1-L4 of the sensor board 180 may be formed on the body 182 of the sensor board 180 so as to conductively connect the first position sensor 170 and the elastic member contact portions 184-1 to 184-4 to each other.

The first position sensor 170 may be embodied as a Hall sensor, for example, but may be embodied as any sensor as long as it is able to detect the intensity of a magnetic field. If the first position sensor 170 is embodied as a Hall sensor, the Hall sensor may include a plurality of pins.

For example, the plurality of pins may include input pins P11 and P12 and output pins P21 and P22. Signals output through the output pins P21 and P22 may be a current type or a voltage type.

The input pins P11 and P12 and the output pins P21 and P22 of the first position sensor 170 may be conductively connected to the respective elastic member contact portions 184-1 to 184-4 via the circuit pattern L1 to L4.

In an embodiment, the first to fourth lines L1 to L4 may be formed so as to be visible to the naked eye. In another embodiment, the first to fourth lines L1 to L4 may be formed in the body 182 of the sensor board 180 so as not to be visible to the naked eye.

Next, the housing 140 will be described.

The housing 140 may support the first magnet 130 for driving, and may accommodate the bobbin 110 therein such that the bobbin 110 is allowed to move in the optical-axis direction OA.

The housing 140 may support or accommodate the second magnet 190 for detection.

The housing 140 may generally have a hollow column shape. For example, the housing 140 may have a polygonal (e.g., a square or octagonal) or circular bore 201.

Figure 6:
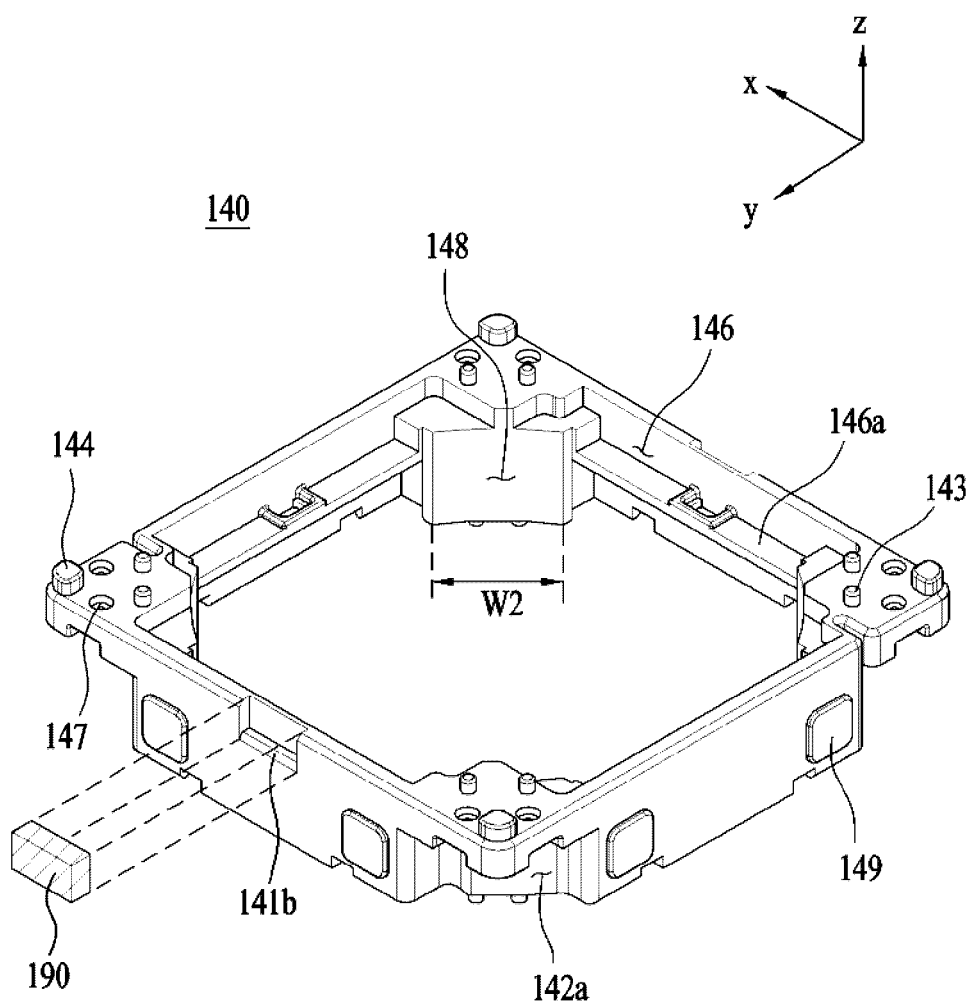
FIG. 6 is a top perspective view of the housing illustrated in FIG. 1.
Figure 7:
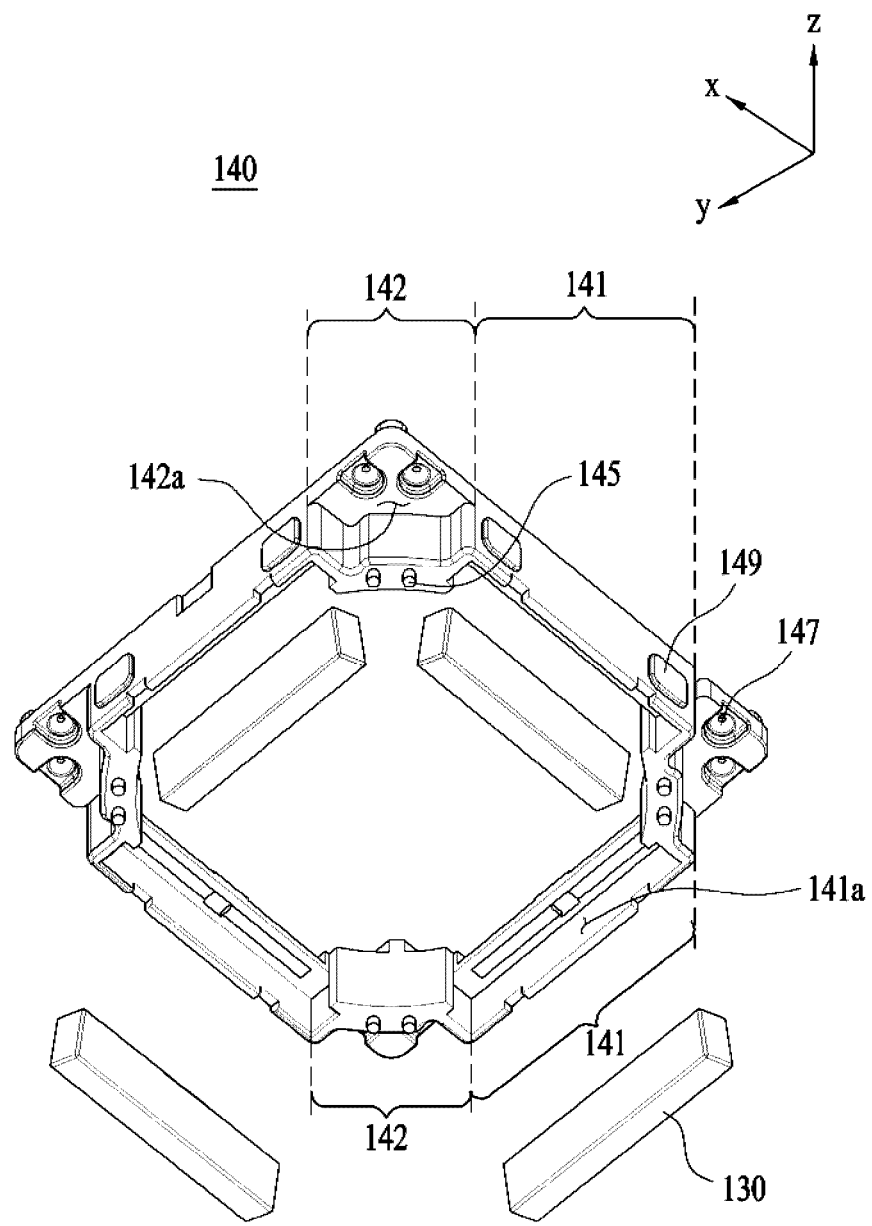
FIG. 7 is a bottom exploded perspective view of the housing, the first magnet, and the second magnet, which are illustrated in FIG. 1.
Figure 8:
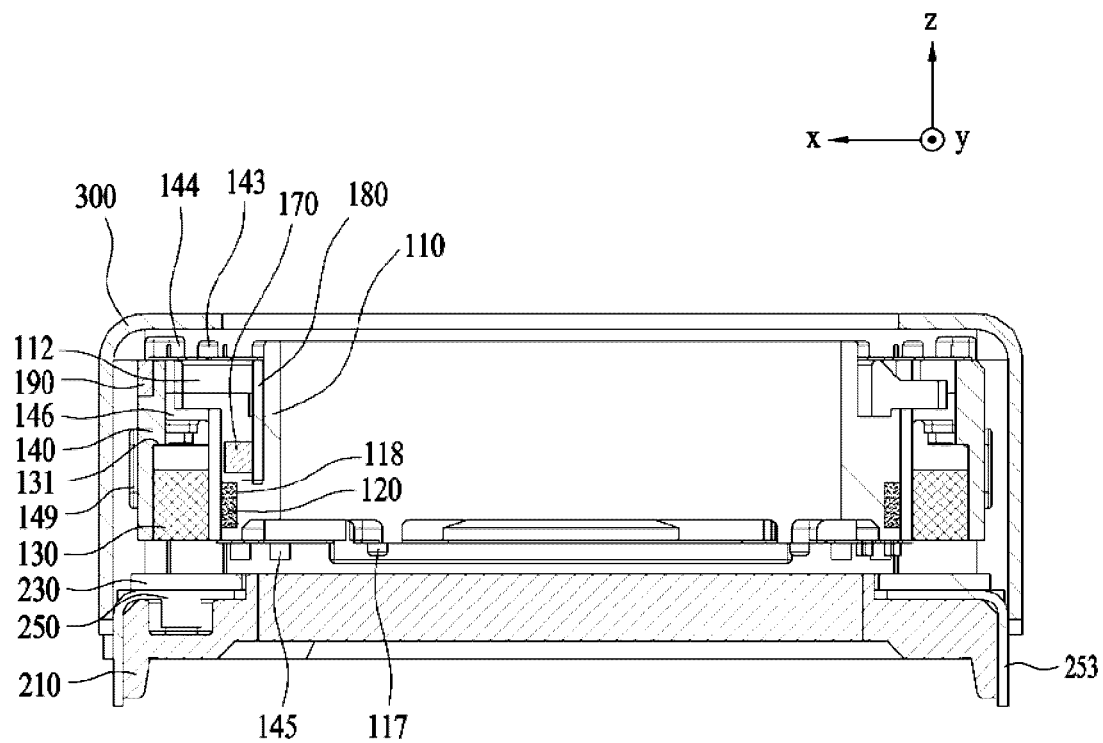
FIG. 8 is a sectional view taken along line I-I' in FIG. 2.
Figure 9:
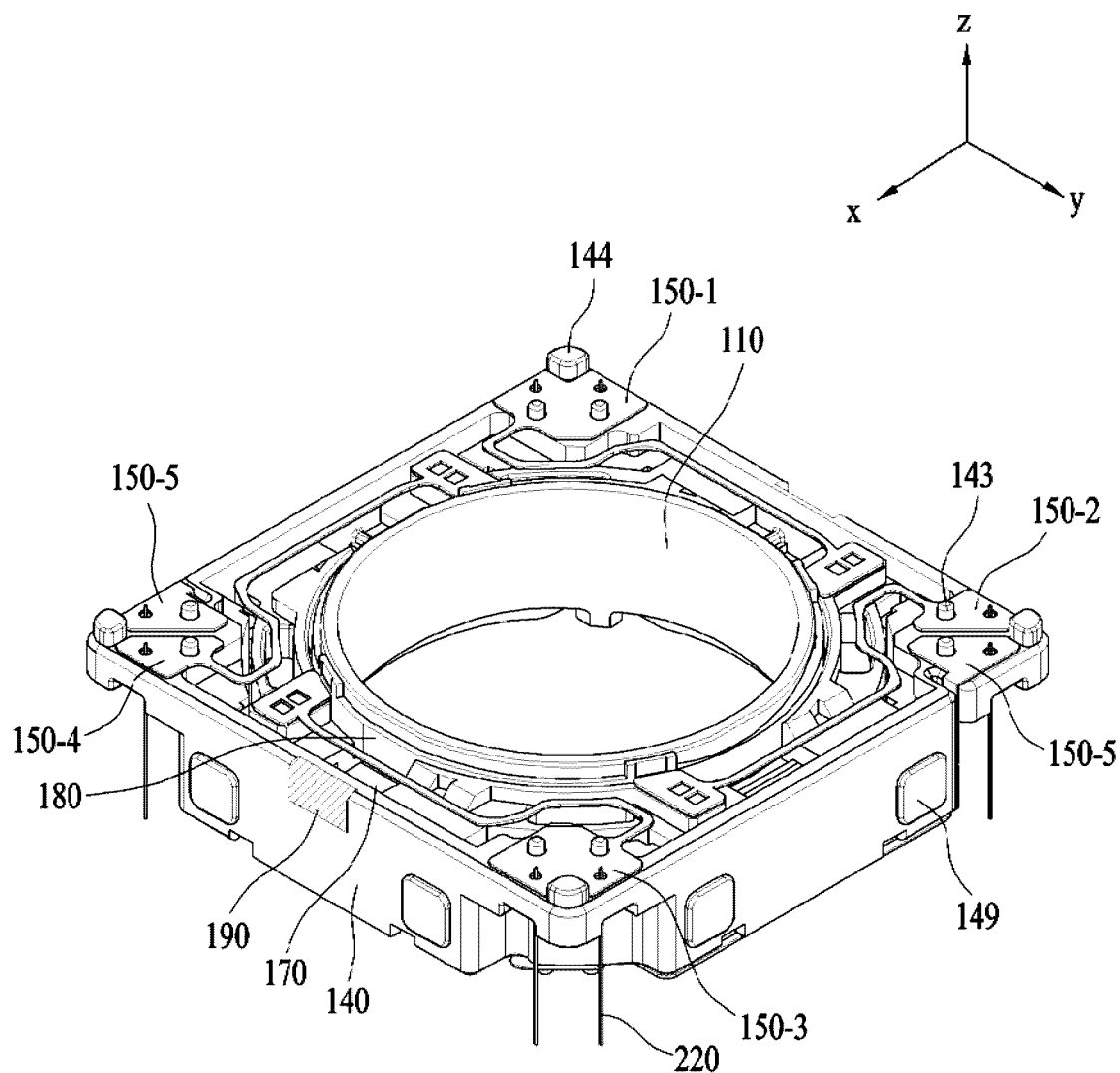
FIG. 9 is a plan perspective view illustrating the coupled state of the bobbin, the housing, the upper elastic member, the first position sensor, the sensor board, and the plurality of support members, which are illustrated in FIG. 1.
Figure 10:
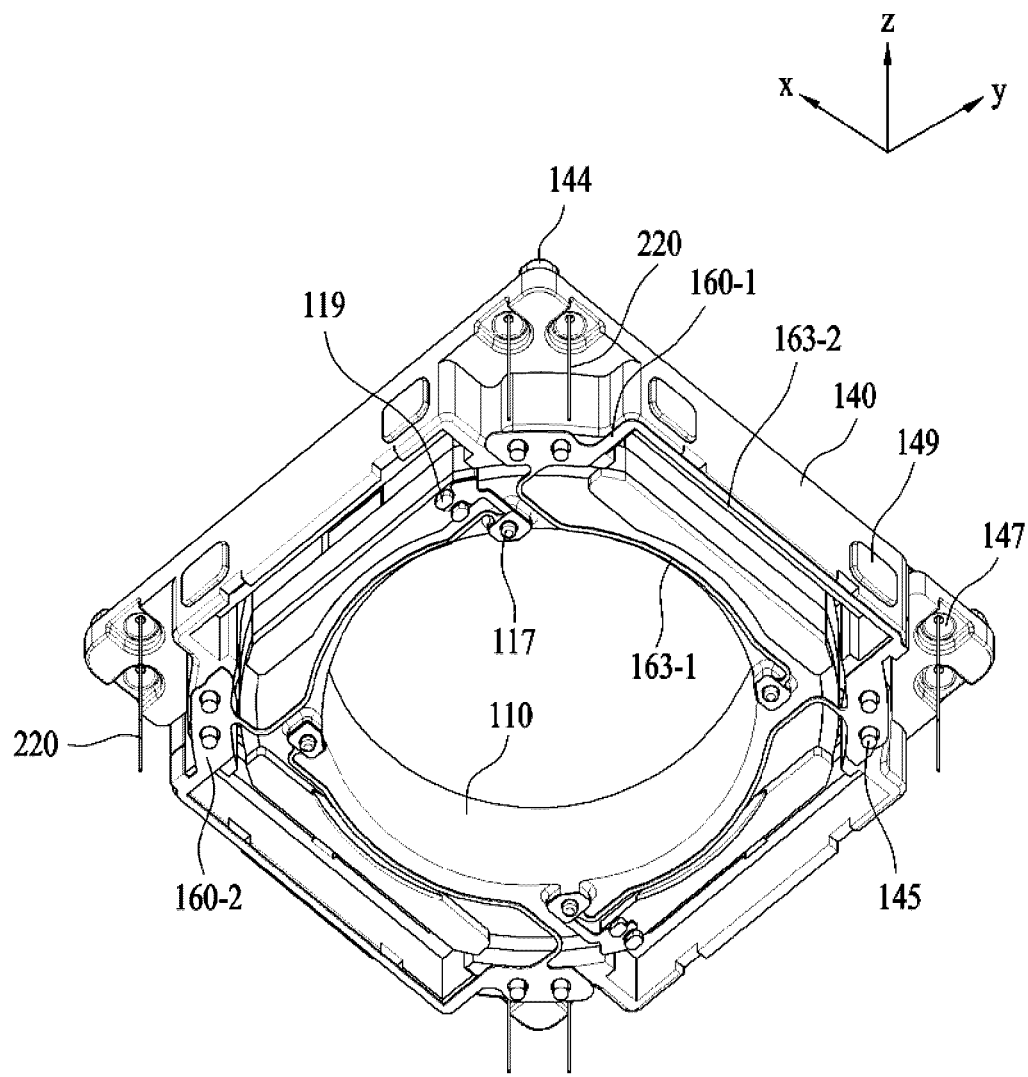
FIG. 10 is a bottom perspective view illustrating the coupled state of the bobbin, the housing, the lower elastic member, and the plurality of support members, which are illustrated in FIG. 1.

FIG. 6 is a perspective view of the housing 140 and the second magnet 190 illustrated in FIG. 1. FIG. 7 is an exploded perspective view of the housing 140 and the first magnet 130, which are illustrated in FIG. 1. FIG. 8 is a sectional view taken along line I-I' in FIG. 3. FIG. 9 is a perspective view of the coupled state of the bobbin 110, the housing 140, the upper elastic member 150, the first position sensor 170, the sensor board 180, and the support members 220, which are illustrated in FIG. 2. FIG. 10 is a perspective view of the coupled state of the bobbin 110, the housing 140, the lower elastic member 160, and the support members 220, which are illustrated in FIG. 2.

The housing 140 may have the first seating groove 146 formed at a position thereof corresponding to the first protrusion 111 and the second protrusion 112 of the bobbin 110.

The housing 140 may include a third protrusion 148, which corresponds to the space defined between the first protrusion 111 and the second protrusion 112, and which has a first width W1.

The third protrusion 148 of the housing 140, which is opposite the bobbin 110, may have a surface having the same shape as the side portion of the bobbin 110. Here, there may be a predetermined difference between the first width W1 between the first and second protrusions 111 and 112 of the bobbin 110, which is illustrated in FIG. 3, and the second width W2 of the third protrusion 148 of the housing 140, which is illustrated in FIG. 6. Consequently, it is possible to restrict the rotation of the third protrusion 148 between the first protrusion 111 and the second protrusion 112 of the bobbin 110. As a result, it is possible for the third protrusion 148 of the housing 140 to prevent the bobbin 110 from being rotated even if the bobbin 110 receives force in the direction in which the bobbin 110 is rotated about the optical-axis OA, rather than being rotated in the optical-axis direction OA.

For example, the upper edge of the outer periphery of the housing 140 may have a square plan shape, whereas the lower edge of the inner periphery may have an octagonal plan shape, as exemplarily illustrated in FIGS. 6 and 7.

The housing 140 may include a plurality of side portions.

For example, the housing 140 may include four first side portions 141 and four second side portions 142, and the width of each of the first side portions 141 may be greater than the width of each of the second side portions 142. For example, the four first side portions 141 may be referred to as first to fourth sides, and the four second side portions 142 may be referred to as first to fourth corner portions.

The first side portions 141 of the housing 140 may correspond to the portions on which the first magnet 130 is mounted. Each of the second side portions 142 of the housing 140 may be disposed between the two adjacent first side portions 141, and may correspond to portions on which the support members 220 are disposed. Each of the first side portions 141 of the housing 140 may connect the two adjacent second side portions 142 of the housing 140 to each other.

Each of the first side portions of the housing 140 may have a surface area that is equal to or larger than the surface area of the first magnet 130, which corresponds to the first side portion 141.

The housing 140 may have a first magnet seat 141a for accommodating the first magnets 130-1 to 130-4 and second magnet seats 141b for accommodating the second magnet 190.

For example, the first magnet seat 141a of the housing 140 may be provided in the lower ends of the inner portions of the first side portions 141, and the second magnet seats 141b may be provided in the upper end of the outer portion of either one of the first side portions 141.

The second magnet seat 141b may be positioned above the first magnet seats 141a, and may be spaced apart from the first magnet seats 141a.

The second magnet 190 may be fitted in, disposed in or secured to the second magnet seat 141b, and each of the first magnets 130-1 to 130-4 may be disposed or fixed to the first magnet seat 141a, which is provided on a corresponding one of the first side portions 141 of the housing 140.

The first magnet seat 141a of the housing 140 may be configured to have the form of a recess having a size corresponding to the size of the first magnet 130, and may be configured to face at least three of the surfaces of the first magnet 130, that is, two lateral side surface and the upper surface of the first magnet 130.

An opening may be formed in the bottom surface of the first magnet seat 141a of the housing 140, that is, the surface that is opposite the second coil 230, which will be described later, and the bottom surface of the first magnet 130 seated on the first magnet seat 141a may directly face the second coil 230.

The first and second magnets 130 and 190 may be secured to the first and second magnet seats 141a and 141b of the housing 140 using an adhesive, without being limited thereto, and an adhesive member such as a piece of double-sided tape may be used.

Alternatively, the first and second magnet seats 141a and 141b of the housing 140 may be configured as mounting holes, which allow the first and second magnets 130 and 190 to be partially fitted thereinto or to be partially exposed therefrom, rather than being configured as the recess illustrated in FIGS. 6 and 7.

For example, the second magnet 190 may be positioned above one (for example, 130-1) of the first magnets 130-1, 130-2, 130-3 and 130-4. The second magnet 190 may be disposed so as to be spaced apart from the first magnet (for example, 130-1). A portion of the housing 140 may be disposed between the second magnet 190 and the first magnet (for example, 130-1).

The first side portion 141 of the housing 140 may be oriented parallel to the side surface of the cover member 300. In addition, the first side portion 141 of the housing 140 may be larger than the second side portion 142. The second side portion 142 of the housing 140 may be provided with paths through which the support members 220 extend. First through-holes 147 may be formed in the upper portion of the second side portion 142 of the housing 140. The support members 220 may be connected to the upper elastic member 150 through the first through holes 147.

In addition, in order to prevent the housing 140 from directly colliding with the inner side surface of the cover member 300 illustrated in FIG. 1, the housing 140 may be provided at the upper end thereof, for example, on the upper surface of the second side portion 142, with a second stopper 144.

The housing 140 may include at least one first upper support protrusion 143 formed on the upper surface thereof for coupling to the upper elastic member 150.

For example, the first upper support protrusion 143 of the housing 140 may be formed on the upper surface of the housing 140 corresponding to the second side portion 142 of the housing 140, without being limited thereto. In another embodiment, the first upper support protrusion 143 may be formed on the upper surface of the housing 140 that corresponds to the first side portion 141.

The first upper support protrusion 143 of the housing 140 may have a semispherical shape, as illustrated in the drawings, or may have a cylindrical shape or a square column shape, without being limited thereto.

The housing 140 may have a lower support protrusion 145 formed on the lower surface thereof for coupling and fixing to the lower elastic member 160.

In order to define paths for the passage of the support members 220 and to ensure the space to be filled with gel-type silicone, which serves as a damper, the housing 140 may have a first recess 142a formed in the second side portion 142. In other words, the first recess 142a of the housing 140 may be filled with damping silicone.

The housing 140 may have a plurality of third stoppers 149 protruding from the side portions 141 thereof. The third stoppers 149 serve to prevent the housing 140 from colliding with the cover member 300 when the housing 140 moves in the second and third directions.

In order to prevent the bottom surface of the housing 140 from colliding with the base 210 and/or the circuit board 250, which will be described below, the housing 140 may further have a fourth stopper (not shown) protruding from the bottom surface thereof. Through this configuration, the housing 140 may be spaced apart from the base 210, which is disposed thereunder, and may be spaced apart from the cover member 300, which is disposed thereabove, with result that the housing 140 may be maintained at a predetermined position in the optical-axis direction without interference therebetween. In this way, the housing 140 may perform a shifting action in the second and third direction, that is, the anteroposterior direction and the lateral direction, on a plane perpendicular to the optical-axis.

Figure 18:
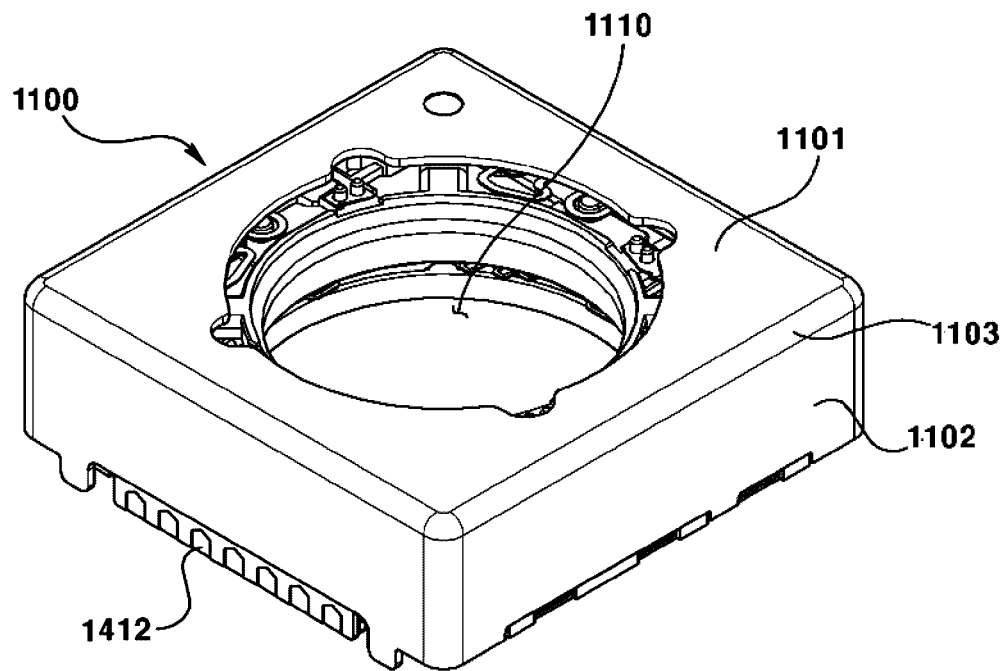
FIG. 18 is a perspective view of a lens moving apparatus according to another embodiment.

The housing 140 is not limited to that illustrated in FIGS. 6 and 7. In another embodiment, the description regarding the housing 1310 illustrated in FIGS. 19 to 23 may be applied. The cover member 300 illustrated in FIG. 1 may include a round portion configured to connect the top plate to the side plate and to connect the side plates to each other, which is illustrated in FIG. 18. The description regarding the top plate 1101, the side plates 1102 and the round portion 1103 of the cover member 1100 illustrated in FIG. 18 may be applied to the top plate, the side plates and the round portion of the cover member 300, which are illustrated in FIG. 1.

For example, a housing according to another embodiment may include a protrusion 1330, an upper stopper 1340 and a support member recess 1350.

The housing according to the embodiment may include the protrusion 1330 extending upwards from the upper surface thereof and positioned outside the upper elastic member 150.

The protrusion 1330 of the housing according to the embodiment may be positioned at at least one of the first to fourth corner portions of the housing. For example, the protrusion 1330 of the housing may include the first to fourth protrusions illustrated in FIG. 20. The first imaginary line, which connects the center of the first protrusion 1331 with the center of the third protrusion 1333, may be orthogonal to the second imaginary line, which connects the center of the second protrusion 1332 with the center of the fourth protrusion 1334, at the center of the housing 1310.

The protrusion of the housing according to the embodiment may overlap the upper elastic member 150 in a direction perpendicular to the optical-axis. By virtue of this configuration, the protrusion 1330 of the housing according to the embodiment is able to prevent the upper elastic member 150 from being exposed to the outside in the diagonal direction.

The protrusion 1330 of the housing according to the embodiment may be positioned outside of the upper stopper 1340. The upper end of the protrusion 1330 of the housing according to the embodiment may be positioned so as to be lower than the upper end of the upper stopper 1340 but higher than the upper elastic member 150. The protrusion 1330 of the housing according to the embodiment may overlap the round portion of the cover member 300 in the optical-axis direction.

For example, the protrusion 1330 of the housing according to the embodiment may overlap the round portion of the cover member 300 in the vertical direction or in a direction parallel to the optical-axis.

The upper stopper 1340 of the housing according to the embodiment may overlap the top plate of the cover member 300 in a direction parallel to the optical-axis. For example, the upper stopper 1340 of the housing according to the embodiment may not overlap the round portion of the cover member 300 in a direction parallel to the optical-axis. By virtue of this configuration, the upper stopper 1340, rather than the protrusion 1330, may come into contact with the inner surface of the top plate of the cover member 300 when the housing according to the embodiment moves fully upward.

The protrusion 1330 of the housing according to the embodiment may be configured such that the upper elastic member 150 and the soldering initiation portion of the support member 220 are shielded when the lens moving apparatus is viewed in a diagonal direction (at an angle of 45 degrees with respect to the side surface).

The top end of the upper stopper 1340 of the housing according to the embodiment may define the top end of the housing. By virtue of this configuration, when the housing is moved upward due to application of external force, the upper stopper 1340 comes into contact with the cover member 300, thereby limiting movement of the housing. In a modification, the protrusion 1330 of the housing according to the embodiment may be integrally formed with the upper stopper 1340. In other words, the upper stopper 1340 may be omitted. In this case, the upper end of the protrusion 1330 of the housing according to the embodiment may serve as the top end of the housing.

The housing according to the embodiment may include the upper stopper 1340, which extends upwards from the upper surface thereof and is positioned inside the protrusion 1330. In other words, the protrusion of the housing according to the embodiment may be positioned outside of the upper stopper.

The upper stopper 1340 of the housing according to the embodiment may overlap the cover member 300 in the optical-axis direction. By virtue of this configuration, when the housing moves upwards, the upper stopper 1340 comes into contact with the cover member 300, thereby limiting the movement of the housing.

The housing according to the embodiment may include the support member recess 1350, which accommodates the support member 220 and is positioned inside the protrusion 1330. The support member recess 1350 of the housing according to the embodiment may be formed by depressing a portion of the side surface of the housing 1310 inwards.

The size of the support member recess 1350 in the housing according to the embodiment may be smaller at the portion thereof at which a stepped portion 1360 is formed than at the upper end of the support member recess 1350. The size of the support member recess 1350 in the housing according to the embodiment in the horizontal direction may be reduced somewhat due to the stepped portion 1360. By virtue of this configuration, it is possible to prevent a first damper introduced into the support member recess 1350 of the housing according to the embodiment from flowing downwards.

Next, the first magnet 130 and the second magnet 190 will be described.

The first magnet 130 may be disposed on the first magnet seat 141*a* of the housing 140 so as to overlap the first coil 120 in the direction perpendicular to the optical-axis OA.

In another embodiment, both the first and second magnets 130 and 190 may be disposed outside or inside the first side portion 141 of the housing 140, or may be disposed inside or outside the second side portion 142 of the housing 140.

In a further embodiment, the second magnet 190 may be disposed in the inner portion of the first side portion 141 of the housing 140, and the first magnet 130 may be disposed in the outer portion of the first side portion 141 of the housing 140.

In yet a further embodiment, the first magnet 130 may be disposed in the inner portion or the outer portion of the first side portion 141 of the housing 140, and the second magnet 190 may be disposed on the second side portion 142.

The first magnet 130 may have a form that corresponds to the first side portion 141 of the housing 140, that is, the form of an approximately rectangular parallelepiped. The surface of the first magnet 130 that faces the first coil 120 may have a radius of curvature that corresponds to that of the first coil 120.

The first magnet 130 may be configured as a single body, and may be oriented such that the surface thereof facing the first coil 120 is the S-pole 132 and the opposite surface is the N-pole 134, without being limited thereto, and the opposite configuration is also possible.

At least two first magnets 130 may be provided, and in the embodiment, four first magnets 130 may be installed. The first magnet 130 may have an approximately rectangular shape, or may have a triangular or diamond shape.

Although the surface of the first magnet 130 that faces the first coil 120 may be planar, the disclosure is not limited thereto. The corresponding surface of the first coil 120 is curved, and the surface of the first magnet 130 that faces the first coil 120 may be curved so as to have the same radius of curvature as that of the surface of the first coil 120. By virtue of this configuration, it is possible to keep the distance between the first magnet 130 and the first coil 120 constant.

In an embodiment, four first side portions 141 of the housing 140 may be provided with the first magnets 130-1, 130-2, 130-3 and 130-4, respectively, without being limited thereto. In some designs, only one of the first magnet 130 and the first coil 120 may have a flat surface, and the other of the first magnet 130 and the first coil 120 may have a curved surface. Alternatively, both the first coil 120 and the first magnet 130, which face each other, may have curved surfaces. In this case, the surface of the first coil 120 may have the same radius of curvature as the surface of the first magnet 130.

When the first magnets 130 have a rectangular flat surface, a pair of magnets 130-1 and 130-3, among the plurality of first magnets 130-1 to 130-4, may be arranged in the second direction so as to be parallel to each other, and the other pair of magnets 130-2 and 130-4 may be arranged in the third direction so as to be parallel to each other. By virtue of this arrangement, it is possible to control the movement of the housing 140 for handshake correction, which will be described later.

In the embodiment illustrated in FIGS. 2 to 9, the first position sensor 170 is disposed at the bobbin 110, and the second magnet 190 is disposed at the housing 140, without being limited thereto. In another embodiment, the first position sensor may be disposed at the first side portion or the second side portion of the housing 140, and the second magnet may be disposed on the outer circumferential surface of the bobbin 110.

Next, the upper elastic member 150, the lower elastic member 160, and the support members 220 will be described.

The upper elastic member 150 and the lower elastic member 160 elastically support the bobbin 110. The support members 220 may support the housing 140 so as to be movable relative to the base 210 in the direction perpendicular to the optical-axis, and may conductively connect at least one of the upper and lower elastic members 150 and 160 to the circuit board 250.

Figure 11:
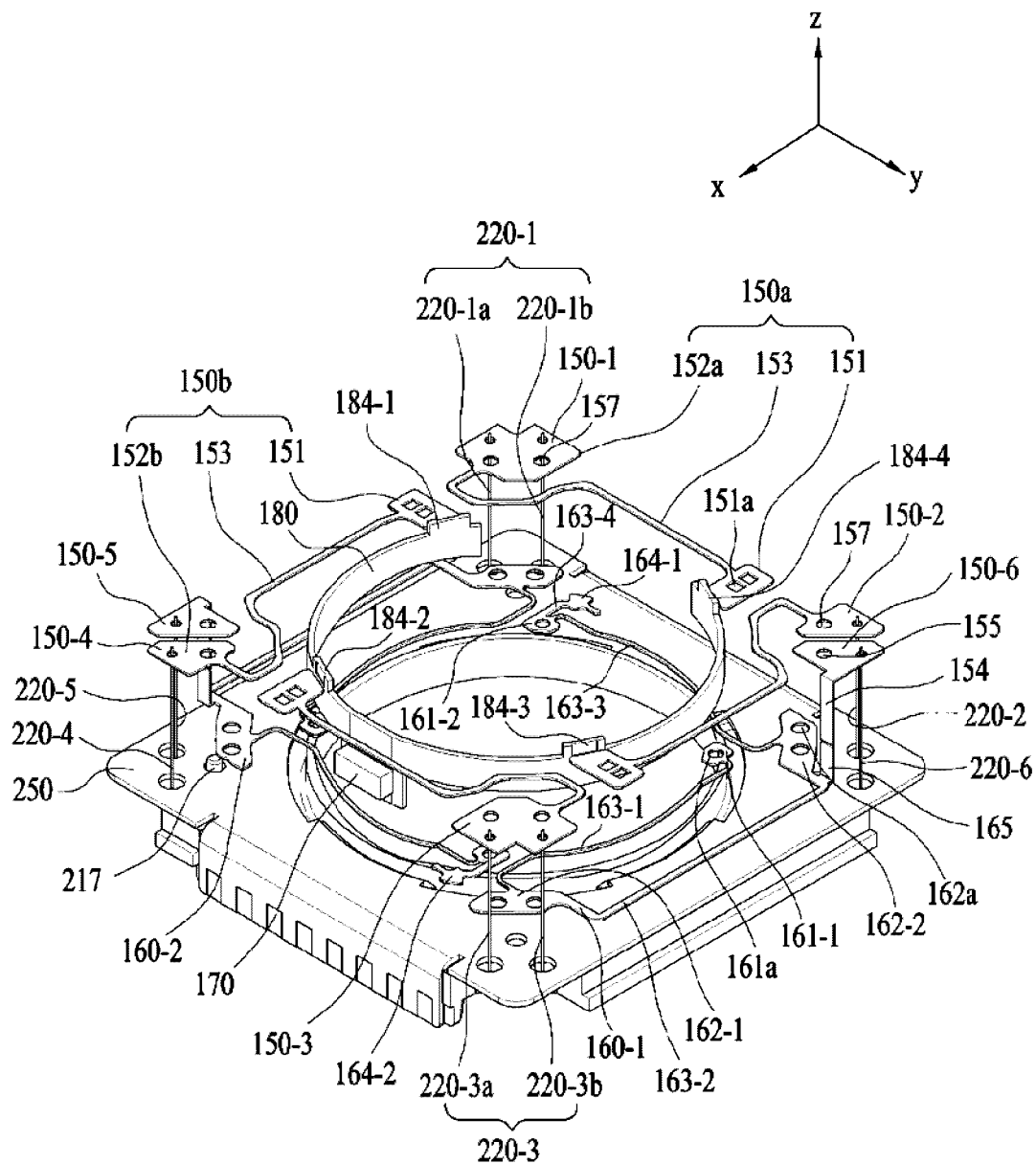
FIG. 11 is an assembled perspective view illustrating the upper elastic member, the lower elastic member, the first position sensor, the sensor board, the base, the support members, and the circuit board, which are illustrated in FIG. 1.

FIG. 11 is an assembled perspective view illustrating the upper elastic member 150, the lower elastic member 160, the first position sensor 170, the sensor board 180, the base 210, the support members 220, and the circuit board 250, which are illustrated in FIG. 1.

The upper elastic member 150 may include a plurality of upper elastic members 150 (150-1 to 150-4), which are conductively isolated and spaced apart from one another.

The elastic member contact portions 184-1 to 184-4 of the sensor board 180 may be conductively connected to at least one of the upper elastic member 150 and the lower elastic member 160.

Although FIG. 11 illustrates by way of example that the elastic member contact portions 184-1 to 184-4 come into electrical contact with the upper elastic members 150-1 to 150-4, the disclosure is not limited thereto. In another embodiment, the elastic member contact portions 184-1 to 184-4 may come into electrical contact with the lower elastic member 160, or may come into electrical contact with both the upper elastic member 150 and the lower elastic member 160.

Each of the respective elastic member contact portions 184-1 to 184-4, which are conductively connected to the first position sensor 170, may be conductively connected to a corresponding one of the upper elastic members 150-1 to 150-4. Each of the upper elastic members 150-1 to 150-4 may be conductively connected to a corresponding one of the plurality of support members 220.

Each one 150a of the first and third upper elastic members 150-1 and 150-3 may include a first inner frame 151, a first of first outer frame 152a, and a first frame connector 153.

Each one 150b of the second and fourth upper elastic members 150-2 and 150-4 may include the first inner frame 151, a second of first outer frame 152b, and the first frame connector 153.

The first inner frame 151 of the first to fourth upper elastic members 150-1 to 150-4 may be coupled to a corresponding one of the bobbin 110 and the elastic member contact portions 184-1 to 184-4.

As illustrated in FIG. 3, when the upper surface 112a of the second protrusion 112 of the bobbin 110 is flat, the first inner frame 151 of the upper elastic member 150 may be placed on the upper surface 112a of the second protrusion 112 of the bobbin 110, and may be secured thereto using an adhesive member.

The first of first outer frame 152a and the second of first outer frame 152b may be coupled to the housing 140, and may be connected to the support members 220.

The first frame connector 153 may connect the first inner frame 151 to the first of first outer frame 152a, and may connect the first inner frame 151 to the second of first outer frame 152b.

Although the first outer frame 152b may be formed by bisecting the first of first outer frame 152a, the disclosure is not limited thereto. In another embodiment, the first of first outer frame may be bisected so as to have the same shape as the second of first outer frame 152b.

The first frame connector 153 may be bent at least one time so as to form a predetermined pattern. Upward and/or downward movement of the bobbin 110 in the optical-axis direction OA may be elastically supported via positional variation and fine deformation of the first frame connector 153.

The first of first outer frame 152a and the second of first outer frame 152b of the upper elastic member 150 illustrated in FIG. 11 may be coupled and secured to the housing 140 by means of the first upper support protrusion 143 of the housing 140. In the embodiment, each of the first of first outer frame 152a and the second of first outer frame 152b may be formed with a second of second through-hole 157, which has a shape and position corresponding to those of the first upper support protrusion 143. Here, the first upper support protrusion 143 and the second of second through-hole 157 may be fixed or coupled to each other via thermal fusion, or using an adhesive such as, for example, epoxy.

By virtue of conductive connections between the elastic member contact portions 184-1 to 184-4 of the sensor board 180 and the first to fourth upper elastic members 150-1 to 150-4 via conductive adhesive members, such as solder, four pins P11 to P22 of the first position sensor 170 may be conductively connected to the first to fourth upper elastic members.

The respective first to fourth upper elastic members 150-1 to 150-4 may be connected or coupled to the circuit board 250 via the support members 220.

For example, the first upper elastic members 150-1 may be conductively connected to the circuit board 250 via at least one of the first of first support member 220-1*a* and the second of first support member 220-1*b*, and the second upper elastic members 150-2 may be conductively connected to the circuit board 250 via the second support members 220-2. The third upper elastic members 150-3 may be conductively connected to the circuit board 250 via at least one of the first of third support member 220-3*a* and the second of third support member 220-3*b*, and the fourth upper elastic members 150-4 may be conductively connected to the circuit board 250 via the fourth support members 220-4.

The first position sensor 170 may receive a drive signal (for example, drive current) from the circuit board 250 through two of the first to fourth upper elastic members 150-1 to 150-4 and the support members connected to the upper elastic members (for example, 220). The first position sensor 170 may output an output signal (for example, detection voltage) thereof to the circuit board 250 through the remaining two of the first to fourth upper elastic members 150-1 to 150-4 and the support members connected to the upper elastic members (for example, 220).

Meanwhile, the lower elastic member 160 may include first and second lower elastic members 160-1 and 160-2, which are conductively isolated and spaced apart from each other. The first coil 120 may be connected to the plurality of support members 220 through the first and second lower elastic members 160-1 and 160-2.

Each of the first and second lower elastic members 160-1 and 160-2 may include at least one second inner frame 161-1 or 161-2, at least one second outer frame 162-1 or 162-2, and at least one second frame connector 163-1 or 163-2.

The second inner frames 161-1 and 161-2 of the first and second lower elastic members 160-1 and 160-2 may be coupled to the bobbin 110, and the second outer frames 162-1 and 162-2 may be coupled to the housing 140.

The first of second frame connector 163-1 may connect the second inner frame 161-1 and the second outer frame 162-1 to each other, the second of second frame connector 163-2 may connect the two second outer frames 161-1 and 162-2 to each other, and the third of second frame connector 163-3 may connect the second inner frame 161-2 and the second outer frame 162-2 to each other.

The first lower elastic member 160-1 may further include a first coil frame 164-1 connected to the second inner frame, and the second lower elastic member 160-2 may further include the second coil frame 164-2 connected to the second inner frame.

Referring to FIG. 11, each of the first and second coil frames 164-1 and 164-2 may be connected to a corresponding one of two ends of the first coil 120 via conductive connection members such as solder. The first and second lower elastic members 160-1 and 160-2 may receive drive signals (for example drive current) from the circuit board 250, and may transfer the drive signals to the first coil 120.

Each of the first and second lower elastic members 160-1 and 160-2 may further include a fourth of second frame connector 163-4. The fourth of second frame connector 163-4 may connect the coil frame 164 to the second inner frame 161-2.

At least one of the first of second to fourth of second frame connectors 163-1 to 163-4 may be bent once or more so as to define a predetermined pattern. In particular, by positional variation and fine deformation of the first of second and third of second frame connectors 163-1 and 163-3, upward and/or downward movement of the bobbin 110 in the first direction, parallel to the optical-axis, may be elastically supported.

In an embodiment, each of the first and second lower elastic members 160-1 and 160-2 may further include a bent portion 165 so as to be connected to a corresponding one of the upper elastic members 150-1 to 150-4, as illustrated in the drawings. The bent portion 165 may be bent at the second of second frame connector 163-2 toward the corresponding upper elastic member 150-5 or 150-6 in the first direction.

The upper elastic member 160 may further include fifth and sixth upper elastic members 150-5 and 150-6. The first to sixth upper elastic members 150-1 to 150-6 may be conductively isolated and spaced apart from one another.

Each of the fifth and sixth upper elastic members 150-5 and 150-6 may include a first of second outer frame 155, coupled to the second side portion of the housing 140, and a connecting frame 154 extending from the first of second outer frame 155.

The connecting frame 154 of the fifth upper elastic member 150-5 may be connected to the bent portion 165 of the second lower elastic member 160-2, and the connecting frame 154 of the sixth upper elastic member 150-6 may be connected to the bent portion 165 of the first lower elastic member 160-1.

Each of the outer frames 155 of the fifth and sixth upper elastic members 150-5 and 150-6 may be bent at the connecting frame 154 in the direction perpendicular to the first direction, and may be coupled to the housing 155. The outer frame 155 may be connected to the support member 220.

In other words, the fifth upper elastic member 150-5 may be connected to the fifth support member 220-5, and the sixth upper elastic member 150-6 may be connected to the sixth support member 220-6.

Here, the bent portion 165 of each of the first and second lower elastic members 160-1 and 160-2 may be integrally formed with the connecting frame 154 of a corresponding one of the fifth or sixth upper elastic members 150-5 and 150-6 and the outer frame 155. Each of the first and second lower elastic members 160-1 and 160-2 and the fifth and sixth upper elastic members 150-5 and 150-6 may include portions 165 and 154, which are bent in the first direction.

By virtue of the bent portion 165 of the connecting frame 154, the first lower elastic member 160-1 may be conductively connected to the sixth upper elastic member 150-6, and the second lower elastic member 160-2 may be conductively connected to the fifth upper elastic member 150-5.

Drive signals from the circuit board 250 may be provided to the first coil 120 via the first and second lower elastic members 160-1 and 160-2, the support members 220-5 and 220-6 and the fifth and sixth upper elastic members 150-5 and 150-6. Specifically, the first lower elastic member 160-1 may be conductively connected to the circuit board 250 via the sixth upper elastic member 150-6 and the sixth support member 220-6, and the second lower elastic member 160-2 may be conductively connected to the circuit board 250 via the fifth upper elastic member 150-5 and the fifth support member 220-5.

Although each of the upper and lower elastic members 150 and 160 of the embodiment is divided into two or more parts, in another embodiment, at least one of the upper and lower elastic members 150 and 160 may not be divided.

The second support protrusion 117 of the bobbin 110 may be coupled and secured to the second inner frame 161-1 or 161-2 of the lower elastic member 160. The second lower support protrusion 145 of the housing 140 may be coupled and secured to the second outer frame 162-1 or 162-2 of the lower elastic member 160.

Each of the second inner frames 161-1 and 161-2 of the first and second lower elastic members 160-1 and 160-2 may be provided with a third through hole 161a, which is formed at a position corresponding to the first lower support protrusion 117 of the bobbin 110 so as to have a shape corresponding to the first lower support protrusion 117 of the bobbin 110. Here, the first lower support protrusion 117 of the bobbin 110 and the third through hole 161a may be secured to each other via thermal fusion, or using an adhesive member such as epoxy.

Each of the second outer frames 162-1 and 162-2 of the first and second lower elastic members 160-1 and 160-2 may be provided with a fourth through hole 162a at a position corresponding to the second lower support protrusion 145 of the housing 140. Here, the second lower support protrusion 145 of the housing 140 and the fourth through hole 162a may be secured to each other via thermal fusion, or using an adhesive member such as epoxy.

Although each of the upper elastic member 150 and the lower elastic member 160 may be constituted by a leaf spring, the disclosure is not restricted as to the material used for the upper and lower elastic members 150 and 160.

The power or a drive signal may be supplied to the first position sensor 170 via two upper elastic members, which are conductively isolated from each other, signals output from the first position sensor 170 may be transferred to the circuit board 250 via the other two upper elastic members, which are conductively isolated from each other, and power or a drive signal may be supplied to the first coil 120 via two lower elastic members 160-1 and 160-2, which are conductively isolated from each other. However, the disclosure is not limited thereto.

In another embodiment, the role of the plurality of upper elastic members 150 and the role of the plurality of lower elastic members 160 may be exchanged. In other words, power may be supplied to the first coil 120 via two upper elastic members, which are conductively isolated from each other, power may be supplied to the first position sensor 170 via two lower elastic members, which are conductively isolated from each other, and signals output from the first position sensor 170 may be transferred to the circuit board 250 via the other two lower elastic members, which are conductively isolated from each other. Although this arrangement is not illustrated in the drawings, it will be apparent from the drawings.

Next, the support members 220 will be described.

The plurality of support members 220-1 to 220-6 may be disposed at respective second side portions 142 of the housing 140. For example, although two support members may be disposed at each of the four second side portions 142, the disclosure is not limited thereto.

In another embodiment, only one support member may be disposed at each of two side portions 142 among the four second side portions 142 of the housing 140, and two support members may be disposed at each of the other two side portions 142.

In a further embodiment, the support members 220 may be disposed in the form of a leaf spring at the first side portions of the housing 140.

The support members 220 may be embodied as members for elastic support, for example leaf springs, coil springs, suspension wires or the like. In another embodiment, the support members 220 may be integrally formed with the upper elastic member.

Next, the base 210, the circuit board 250, and the second coil 230 will be described.

The base 210 may have a bore corresponding to the bore of the bobbin 110 and/or the bore of the housing 140, and may have a shape that corresponds to that of the cover member 300, for example, a square shape.

Figure 12:
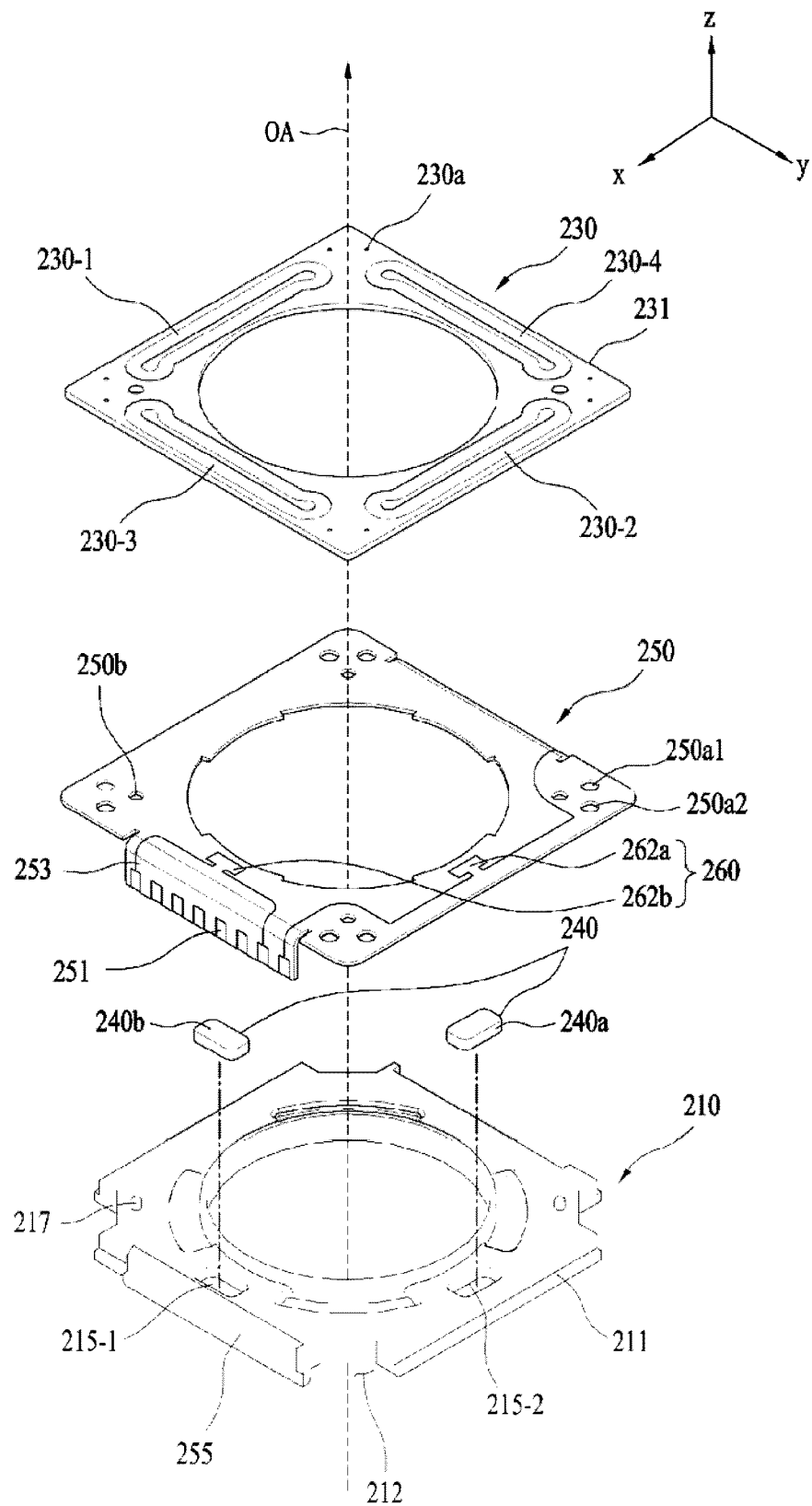
FIG. 12 is an exploded perspective view illustrating the base, the second coil and the circuit board illustrated in FIG. 1.

FIG. 12 is an exploded perspective view of the base 210, the second coil 230, and the circuit board 250, which are illustrated in FIG. 1.

The base 210 may have a stepped portion 211, to which an adhesive may be applied when the cover member 300 is secured to the base 210 using the adhesive. Here, the stepped portion 211 may guide the cover member 300 coupled to the upper side thereof, and may be coupled to the end of the cover member 300 in a surface-contact manner.

The stepped portion 211 of the base 210 and the end of the cover member 300 may be attached or secured to each other using an adhesive or the like.

The base 210 may be provided with a support portion 255 having a corresponding size on the surface thereof facing the terminal 251 of the circuit board 250. The support portion 255 of the base 210 may be formed on the outer side surface of the base 210, which does not have the stepped portion, and may support a terminal rib 253 of the circuit board 250.

A second recess 212 may be formed in each corner of the base 210. When the cover member 300 has a protrusion formed at each corner thereof, the protrusion of the cover member 300 may be fitted into the second recess 212 in the base 210.

In addition, seating recesses 215-1 and 215-2 may be formed in the upper surface of the base 210 so that the second position sensor 240 may be disposed in each of the seating recesses 215-1 and 215-2. In an embodiment, the base 210 may be provided in the upper surface thereof with two seating recesses 215-1 and 215-2, in which the second position sensors 240 may be disposed. Imaginary lines connecting the centers of the seating recesses 215-1 and 215-2 to the center of the base 210, may intersect each other. Although the angle defined between the imaginary lines may be an angle of 90° by way of example, the disclosure is not limited thereto.

For example, the seating recesses 215-1 and 215-2 in the base 210 may be disposed at or near the centers of the respective second coils 230, or the centers of the second coils 230 may coincide with the centers of the second position sensors 240.

The second coil 230 may be disposed above the circuit board 250, and the second position sensor 240 may be disposed under the circuit board 250.

The circuit board 250 may be disposed on the upper surface of the base 210, and may have a bore corresponding to the bore of the bobbin 110, the bore of the housing 140 and/or the bore of the base 210. The outer circumferential surface of the circuit board 250 may have a shape that coincides with or corresponds to the upper surface of the base 210, for example, a square shape.

The circuit board 250 may include at least one terminal rib 253, which is bent at the upper surface thereof and is provided with a plurality of terminals or pins 251, which receive electrical signals from the outside.

In FIG. 12, the second coil 230 is implemented as being provided on the circuit member 231, which is separate from the circuit board 250, without being limited thereto. In another embodiment, the second coil 230 may take the form of a ring-shaped coil block, an FP coil, or a circuit pattern formed on the circuit board 250.

The second coil 230 may have through-holes 230a formed in the circuit member 231 so as to allow the support members 220 to extend therethrough, or may have avoidance recesses for avoiding interference with the support members 220.

The second coil 230 is located above the circuit board 250 so as to be opposite the first magnet 130 disposed or secured to the housing 140.

The second coil 230 may include a plurality of optical image stabilization (OIS) coils 230-1 to 230-4 that correspond to the plurality of first magnets 130-1 to 130-4.

Each of the plurality of OIS coils 230-1 to 230-4 may be oriented so as to correspond to or to be aligned with one of the plurality of first magnets.

For example, the plurality of OIS coils 230-1 to 230-4 may be respectively disposed on the four sides of the circuit board 250, without being limited thereto.

In FIG. 12, the second coil 230 includes two OIS coils 230-3 and 230-4 for the second direction and two OIS coils 230-3 and 230-4 for the third direction, without being limited thereto. In another embodiment, the second coil may include one or more OIS coils for the second direction and one or more OIS coils for the third direction.

Electromagnetic force may be generated via interaction of the first magnets 130-1 to 130-4 and the plurality of OIS coils 230-1 to 230-4, which are arranged to be opposite each other. The housing 140 may be moved in the second and/or third direction using the electromagnetic force, thereby performing handshake correction.

The second position sensor 240 may detect the intensity of the magnetic field of the first magnets 130-1 to 130-4 depending on the movement of the housing 140, and may form output signals based on the result of the detection.

In order to detect the displacement of the housing 140 in a direction perpendicular to the optical-axis OA, the second position sensor 240 may include two OIS position sensors 240a and 240b, which are oriented so as to intersect each other or so as to be perpendicular to each other.

A controller for a camera module or an optical device, which will be described later, may detect the displacement of the housing 140 in the second and third directions based on the signals output from the two OIS position sensors 240a and 240b.

The second position sensor 240 may be embodied as a Hall sensor, or any other sensor may be used as long as it can detect the intensity of a magnetic field. For example, each of the OIS position sensors 240a and 240b may take the form of a driver that includes a Hall sensor, or may be embodied as a position detection sensor alone, such as a Hall sensor.

The second position sensor 240 may be mounted on the lower surface of the circuit board 250, without being limited thereto.

A plurality of terminals 251 may be installed on the terminal rib 253 of the circuit board 250. For example, the circuit board 250 may receive external power through the plurality of terminals 251 installed on the terminal rib 253, and may supply drive signals or power to the first and second coils 120 and 230 and the first and second position sensors 170 and 240. The circuit board 250 may outwardly output signals received from the first and second position sensors 170 and 240.

In the embodiment, although the circuit board 250 may be embodied as a Flexible Printed Circuit Board (FPCB), the disclosure is not limited thereto. The terminals 251 of the circuit board 250 may be directly formed on the surface of the base 210 via, for example, a surface electrode process.

The circuit board 250 may have through holes 250a1 and 250a2 through which the support members 220 extend.

One end of each of the support members 220 may be coupled to the outer frame 152a, 152b or 155 of the upper elastic member 150, and the other end of each of the support members 220 may extend through the through holes 250a1 or 250a2 in the circuit board 250 and may be conductively connected to a circuit pattern or a pad provided on the lower surface of the circuit board 250 via solder or the like.

In another embodiment, the circuit board 250 may not have the through holes 250a1 and 250a2 therein, and the other end of the support member 220 may be conductively connected to the circuit pattern or a pad formed on the upper surface of the circuit board 250 via soldering or the like.

In a further embodiment, the other end of the support member 220 may extend through the through hole 230 in the circuit member 231, and may be conductively connected to the circuit pattern or the pad provided on the lower surface of the circuit member 231 via soldering or the like.

The circuit board 250 may further have a through hole 250b, which is coupled to an upper support protrusion 217 of the base 210. The upper support protrusion 217 of the base 210 and the through hole 250b in the circuit board 250 may be coupled to each other, as illustrated in FIG. 11, and may be secured to each other via an adhesive member such as epoxy.

Next, the third coil 260 will be described.

The third coil 260 is disposed between the second position sensor 240 and the second coil 230. The third coil 260 receives drive signals (for example, drive current), and generates a magnetic field in response to the drive signals.

For the purpose of OIS driving for handshake correction, a drive signal may be applied to the second coil 230, and the second coil 230 may thus generate a magnetic field in response to the drive signal.

With respect to the second position sensor 240, the magnetic field from the third coil 260 and the magnetic field from the second coil 230 are generated in directions such that the two magnetic fields counteract each other. For example, the magnetic field from the third coil 260 detected by the second position sensor 240 and the magnetic field from the second coil 230 may be directed so as to counteract each other.

The second coil 230 may be disposed on the circuit board 250, the second position sensor 240 may be disposed under the circuit board 250, and the third coil 260 may be provided on the circuit board 250. For example, the third coil 230 may be embodied as a metal pattern wired on the circuit board 250.

The third coil 260 may include a first of third coil 262a that corresponds to the first OIS position sensor 262a and a second of third coil 262b that corresponds to the second OIS position sensor 262b.

The first of third coil 262a and the second of third coil 262b may be conductively isolated from each other, and may be provided on the circuit board 250 so as to be spaced apart from each other.

The third coil 260 may be conductively connected to the terminals 251 of the circuit board 250, and drive signals may thus be supplied to the third coil 260 via the terminals 251 of the circuit board 250.

For example, one end of the first of third coil 262a may be conductively connected to one of the terminals on one of the terminal ribs of the circuit board 250, and the other end may be conductively connected to one of the terminals on the other terminal rib of the circuit board 250.

The second of third coil 262b may be conductively connected to two terminals on one of the terminal ribs of the circuit board 250.

The connection relationship between the terminals on the terminal rib of the circuit board 250 and the first of third and second of third coils 262a and 262b may not be limited to the configuration illustrated in FIG. 12, and may be embodied as various configurations.

The third coil 260 illustrated in FIG. 12 is formed on the upper surface of the circuit board 250, without being limited thereto. In another embodiment, the third coil may be formed on the lower surface of the circuit board 250. In a further embodiment, the third coil may be formed on an additional circuit member (not shown), rather than being formed on the circuit board 250.

In yet a further embodiment, the second coil 230 may be provided on the upper surface of the circuit member 231, and the third coil 260 may be provided on the lower surface of the circuit member 231.

The second coils 230 and the third coil 260 may be configured to have a loop shape, which is wound clockwise or counterclockwise with respect to the optical-axis OA. The number of times the third coil 260 is wound may be smaller than the number of times the second coil 230 is wound.

The number of times each of the first of third coil 262a and the second of third coil 262b is wound may be one time or more.

The first of third coil 262a and the second of third coil 262b may have the same shape and size.

For example, each of the first or third coil 262a and the first of third coil 262b may include a first wire with one end connected to one terminal on the circuit board 250, a second wire with one end connected to another terminal on the circuit board 250, and a loop portion connected to the other end of the first wire and the other end of the second wire and having a loop shape. Here, the loop portion may be a portion at which an induction magnetic field is generated in response to a drive signal (for example, current).

FIGS. 13a to 13e illustrate embodiments of the first of third coil 262a.

Referring to FIGS. 13a to 13e, the first of third coil 262a1 to 262a5 may include the first wire 13a-1 to 13e-1 with one end connected to one terminal on the circuit board 250, the second wire 13a-2 to 12e-2 with one end connected to another terminal on the circuit board 250, and the loop portion 13a-3 to 13e-3 connected to the other end of the first wire 13a-1 to 13e-1 and the other end of the second wire 13a-2 to 12e-2 and having a loop shape.

Figure 13A:
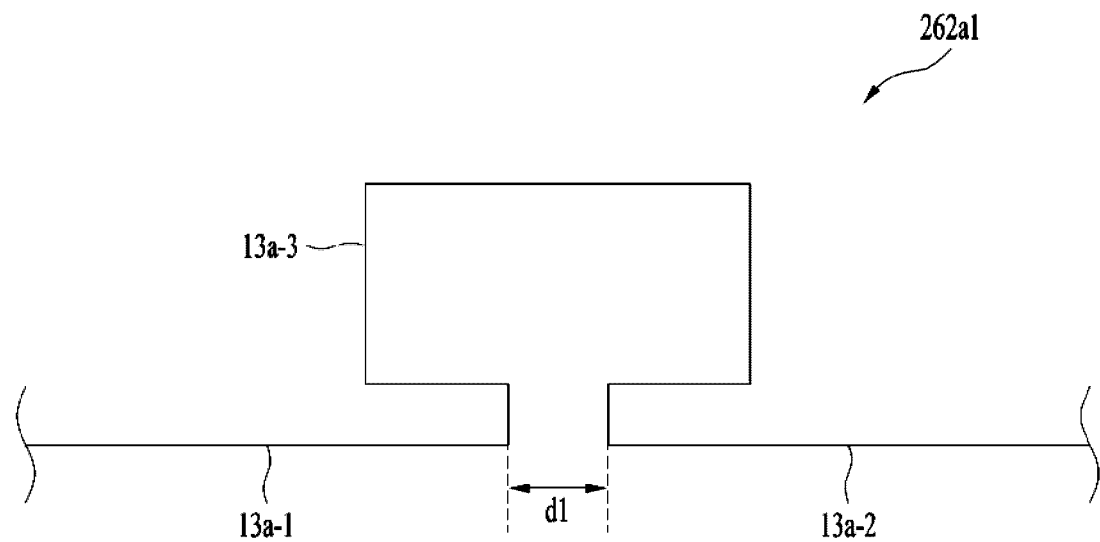
FIGS. 13a to 13e illustrate embodiments of a first of third coil.
Figure 13B:
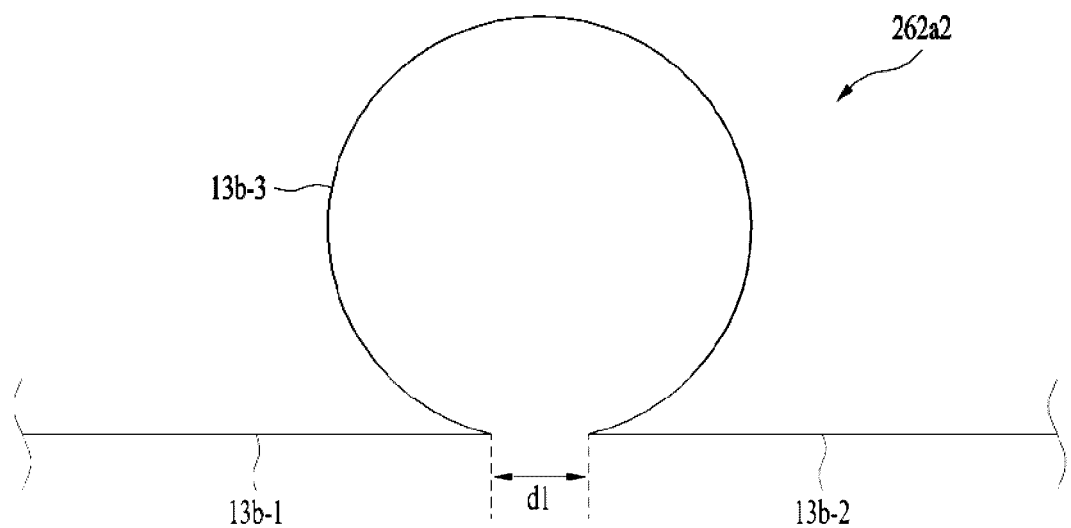
Figure 13C:
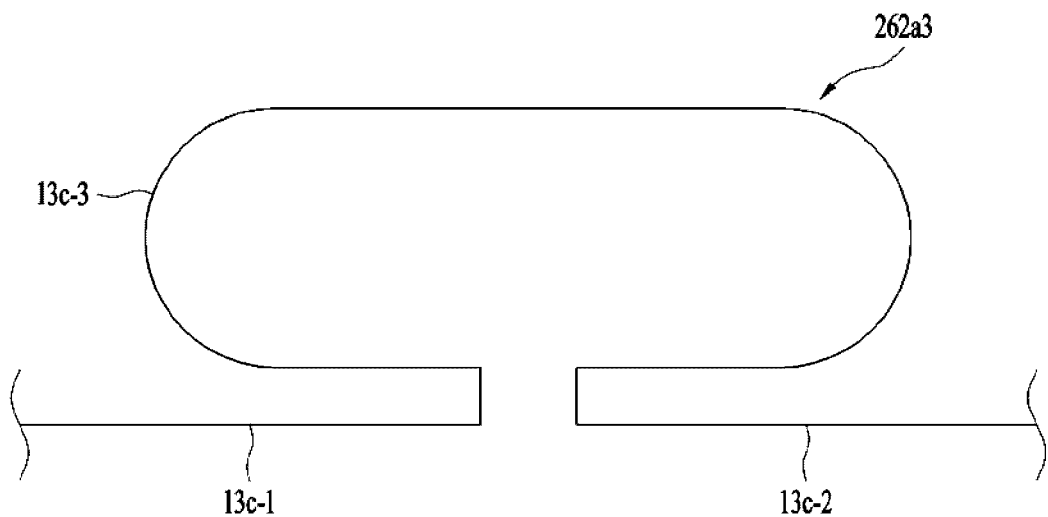
Figure 13D:
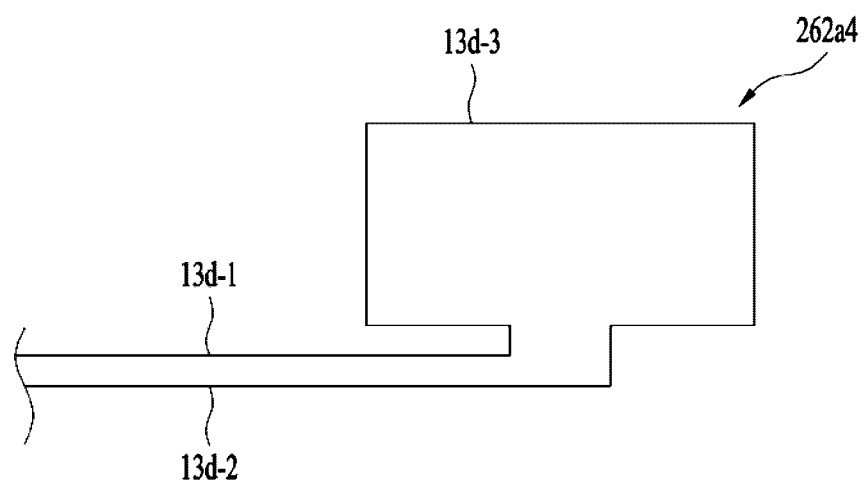
Figure 13E:
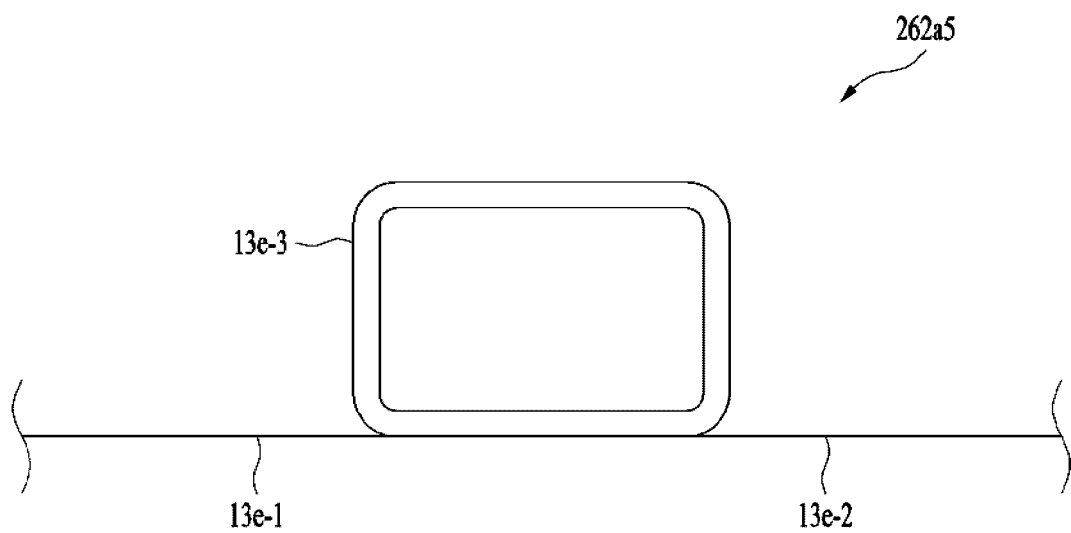

The loop portion 13a-3 to 13e-3 may be configured to have various shapes. Each of the loop portions 13a-3, 13d-3 and 13e-3, which are illustrated in FIGS. 13a, 13d and 13e, may have a rectangular shape, the loop portion 13b-3 illustrated in FIG. 13b may have a circular shape, and the loop portion 13c-3 illustrated in FIG. 13c may have an elliptical shape, without being limited thereto. In other embodiments, the loop portion may have a polygonal shape.

the first wire 13a-1 to 13c-1 and 13e-1 and the second wire 13a-2 to 13c-2 and 13e-2 may extend in opposite directions, as illustrated in FIGS. 13a to 13c and FIG. 13e, and the first wire 13d-1 and the second wire 13d-2 may extend in the same direction, as illustrated in FIG. 13d.

The point at which the other end of the first wire 13a-1 to 13e-1 is connected to one end of the loop portion 13a-3 to 13e-3 and the point at which the other end of the second wire 13a-2 to 13e-2 is connected to the other end of the loop portion 13a-3 to 13e-3 may be spaced apart from each other by a predetermined distance d1.

For example, d1 may range from 5 μm to 1000 μm.

If d1 is smaller than 5 μm, it is not easy to perform a patterning process for formation of the third coil. If d1 is greater than 1000 μm, the desired intensity of a magnetic field from the third coil 262a1 to 262a5 may not be obtained. In order to ensure ease of a patterning process, d1 may range from 5 μm to 1000 μm.

In another embodiment, the loop portion may be embodied in such a manner that the first wire and the second wire intersect each other.

The loop portion 13a-3 to 13e-3 of the third coil 260 may include a first region that overlaps the second coil 230-2 or 230-3 in the optical-axis direction OA and a second region that does not overlap the second coil 230-2 or 230-3. The second region may overlap the OIS position sensor 240a and 240b at at least part thereof.

The diameter or width of the loop portion 13a-3 to 13e-3 of the third coil 260 in the second direction (for example, in the X-axis direction) may be smaller than or equal to the diameter or width of the OIS position sensor 240a in the second direction (for example, in the X-axis direction), without being limited thereto. In another embodiment, the diameter or width of the loop portion 13a-3 to 13e-3 of the third coil 260 in the second direction (for example, in the X-axis direction) may be greater than the diameter or width of the OIS position sensor 240a in the second direction (for example, in the X-axis direction).

The length of the second region of the loop portion 13a-3 to 13e-3 of the third coil 260 in the third direction (for example, in the Y-axis direction) may be greater than or equal to the length of the first region of the loop portion 13a-3 to 13e-3 of the third coil 260 in the third direction, without being limited thereto. In another embodiment, the length of the second region in the third direction may be smaller than the length of the first region in the third direction.

The loop portion 13a-3 to 13d-3 of the third coil illustrated in FIGS. 13a to 13d has a loop, which is configured to have a single pattern or a winding of one turn. In order to counteract the intensity of a magnetic field of the second coil 230 so as to improve the reliability of OIS feedback control by output of the second position sensor 240, the loop portion 13c-3 of the third coil 262a5 illustrated in FIG. 13e may be a loop that is configured to have a plurality of patterns or a winding of two or more turns. Here, the number of times the wire of the loop is wound may be limited within a range in which OIS drive by the interaction between the second coil 230 and the magnet 130 is not limited or interrupted.

For example, the number of times the third coil 262a5 is wound may be two to five times. In another embodiment, the number of times the third coil 262a5 is wound may be six to ten times. In a further embodiment, the number of times the third coil 262a5 is wound may be eleven times to fifteen times. The number of times the third coil is wound may be inversely proportional to the size of the region P2 or P4 of the third coil that overlaps the second coil 230 in the optical-axis direction OA. For example, when the size of the region P2 or P4 (see FIGS. 17a and 17b) of the third coil 262a5 that overlaps the second coil 230 in the optical-axis direction OA is increased, the intensity of a magnetic field of the second coil 230 is counteracted, and the reliability of OIS feedback control is improved even when the number of times the third coil 262a5 is wound is reduced.

Although the loop portion 13e-3 is configured to have a rectangular shape in FIG. 13e, the disclosure is not limited thereto. The loop portion may be configured to have a polygonal shape, rather than a circular, elliptical or rectangular shape.

In another embodiment, the number of times the loop portion 13e-3 illustrated in FIG. 13e is wound may be once, and the loop portion 13e-3 may be configured such that a portion thereof intersects another portion thereof.

Figure 14:
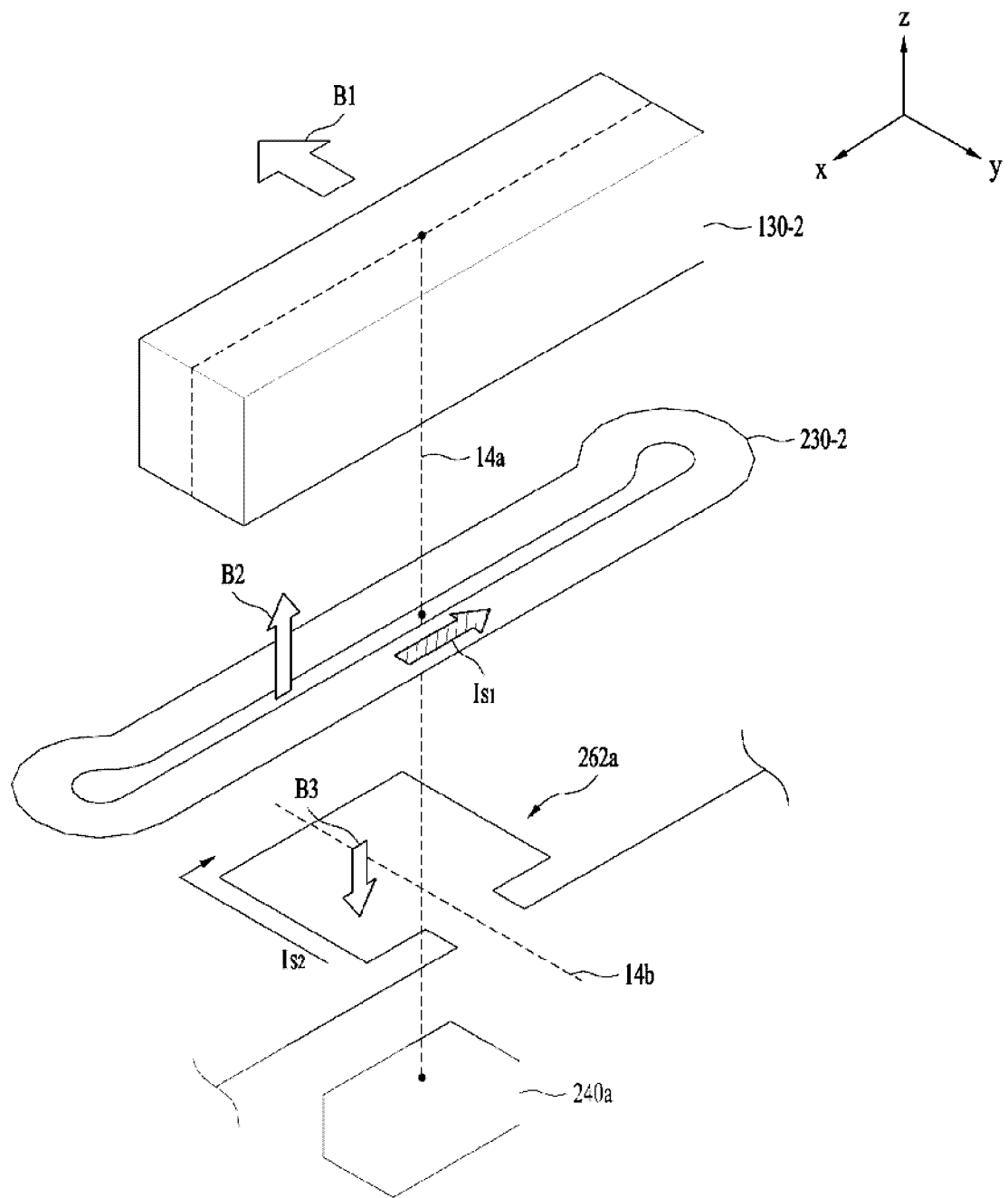
FIG. 14 illustrates the relative positional relationships among a first magnet, a second coil, a first of third coil and a first OIS position sensor, which are aligned with one another.

FIG. 14 illustrates the relative positional relationship among the first magnet 130-2, the second coil 230-2, the first of third coil 262a and the first OIS position sensor 240a, which are aligned with one another.

Referring to FIG. 14, at least part of the third coil 260 may overlap the second position sensor 240 in the optical-axis direction OA. Furthermore, at least part of the third coil 260 may overlap the second coil 230 in the optical-axis direction OA.

For example, at least part of each of the first of third and second of third coils 262a and 262b may overlap a corresponding one of the first and second OIS position sensors 240a and 240b in the optical-axis direction OA.

Furthermore, at least part of each of the first of third and second of third coils 262a and 262b may overlap a corresponding one of the OIS coils 230-1 to 230-4 in the optical-axis direction OA.

The centers of the first magnet 130-2 or 130-3, the second coil 230-2 or 230-3 and the OIS position sensor 240a or 240b, which are aligned with one another, may be aligned with a first central line 14a in the optical-axis direction OA. For example, the first central line may be parallel to the optical-axis OA, and may be an imaginary straight line that extends through the centers of the first magnet 130-2 or 130-3, the second coil 230-2 or 230-3 and the OIS position sensor 240a or 240b, which are aligned with one another.

The centers of the first magnet 130-2 or 130-3, the second coil 230-2 or 230-3 and the OIS position sensor 240a or 240b, which are aligned with one another, may be overlapped with a second central line 14b in the optical-axis direction OA.

For example, the second central line 14b may be an imaginary straight line, which is perpendicular to the optical-axis, parallel to the third direction (for example, the Y-axis direction) and perpendicular to the first central line 14a and which extends through the center of the loop portion of the third coil 262a. For example, the second coil 230-2 or 230-3 may be symmetric with respect to the second central line 14b. The center of the OIS position sensor 240a or 240b may be located at the center of a sensing element adapted to detect electromagnetic force of the second coil 230-2 or 230-3.

In FIG. 14, B1 represents the direction of a magnetic field of the first magnet, B2 represents the direction of an induction magnetic field of the first OIS coil 230-2 generated by first drive current IS1, and B3 represents the direction of an induction magnetic field of the first of third coil 262a generated by second drive current IS2.

For example, the direction in which the first drive current IS1 flows and the direction in which the second drive current IS2 flows may be opposite each other, and the direction of the induction magnetic field of the first OIS coil 230-2 and the direction of the induction magnetic field of the first of third coil 262a may be opposite each other.

Figure 15:
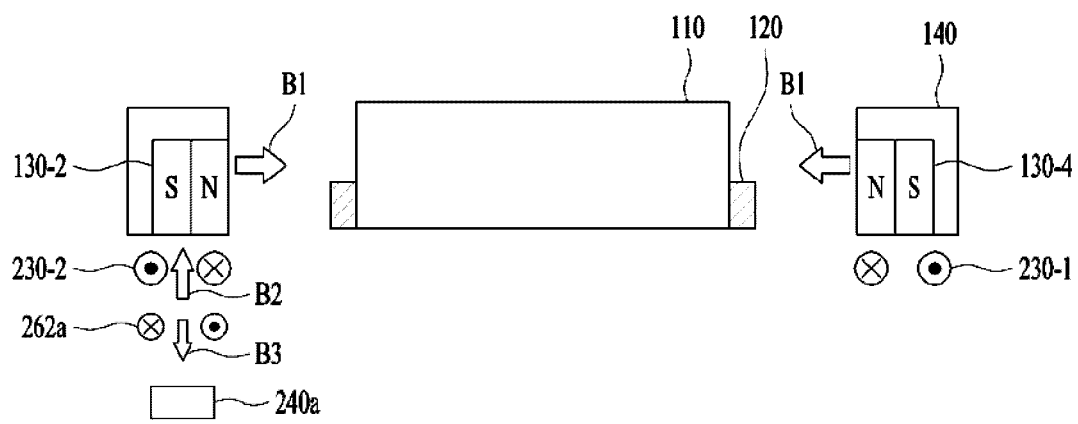
FIG. 15 illustrates one example of the direction of a magnetic field of the first magnet, the second coil and the first of third coil, which are aligned with one another.
Figure 16:
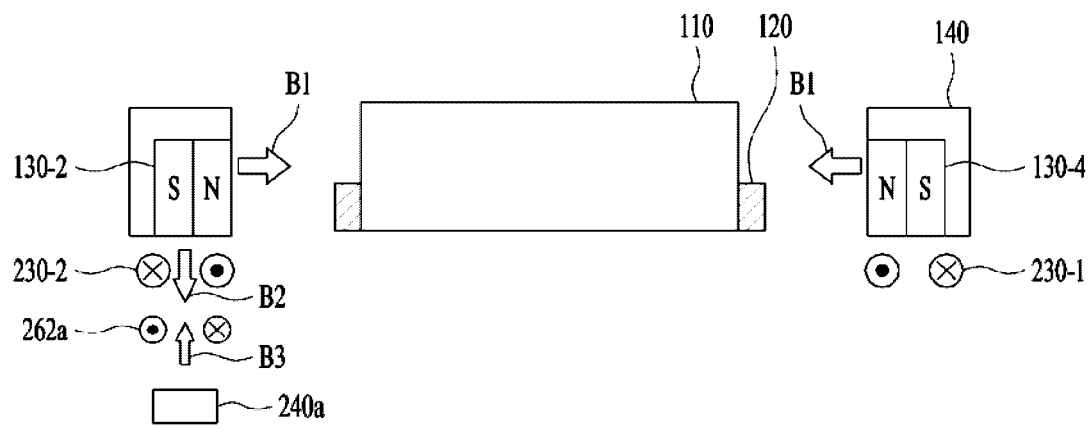
FIG. 16 illustrates another example of the direction of a magnetic field of the first magnet, the second coil and the first of third coil, which are aligned with one another.

FIG. 15 illustrates one example of the direction of a magnetic field of the first magnet 130-2, the second coil 230-2 and the first of third coil 262a, which are aligned with one another, and FIG. 16 illustrates another example of the direction of a magnetic field of the first magnet 130-2, the second coil 230-2 and the first of third coil 262a, which are aligned with one another.

Referring to FIGS. 15 and 16, the direction of a magnetic field B2 induced by the second coil 230-2 and the direction of a magnetic field B3 of the first of third coil 262a may be oriented so as to counteract each other, that is, so as to be opposite each other. For example, the first drive current applied to the second coil 230-2 and the second drive current applied to the first of third coil 262a may flow in opposite directions.

Here, the intensity of the magnetic field B3 induced by the first of third coil 262a may be lower than the intensity of the magnetic field B2 induced by the second coil 230-2. If the intensity of the magnetic field B3 induced by the first of third coil 262a is equal to or higher than the intensity of the magnetic field B2 induced by the second coil 230-2, the compensation by the magnetic field induced by the first of third coil 262a is overly increased, and it is thus impossible to obtain electromagnetic force having a desired direction or intensity between the first magnet 130 and the second coil 230.

The first and second OIS position sensors 240a and 240b may detect the intensity of the magnetic field of the first magnets 130-1 to 130-4. Here, since the second coils 230-2 and 230-3 and the OIS position sensors 240a and 240b are positioned so as to be adjacent to each other, the OIS position sensors 240a and 240b may be influenced by the magnetic field induced by the second coils 230-2 and 230-3.

Owing to the influence of the induction magnetic field generated by the second coils 230-2 and 230-3, the OIS position sensors 240a and 240b cannot accurately detect variation in the intensity of magnetic force of the first magnet 130 depending on movement of the housing 140, thereby deteriorating the reliability of handshake correction.

Performance and stability of OIS control for handshake correction may be verified through analysis of frequency response properties using a frequency response analyzer (FRA), for example, analysis of a gain margin and a phase margin.

For example, it is possible to measure the degree of performance of OIS feedback control using a suppression ratio. For example, the suppression ratio may be defined by a value of log (20 log(Y)) of a ratio (Y=OUTPUT/INPUT) of an output signal (OUT) of the OIS position sensor to an input signal (INPUT) applied to the second coil.

According to the frequency response property based on the suppression ratio of the OIS position sensor, the gain is increased in a frequency range higher than the second resonant frequency, and the gain margin may thus be decreased due to the influence of a magnetic field of the second coil by magnetic induction. The decrease in the gain margin of the frequency response property by the suppression ratio of the OIS position sensor may cause oscillation and deterioration in stability of OIS feedback control.

By providing the third coil (for example, 262a) adapted to generate the magnetic field B3, which is directed so as to counteract the magnetic field B2 induced by the second coil (for example, 230-2), the embodiment is able to prevent a decrease in the gain margin in a frequency range higher than the second resonant frequency, and is able to ensure the stability of OIS feedback control and reliability of handshake correction.

Figure 17A:
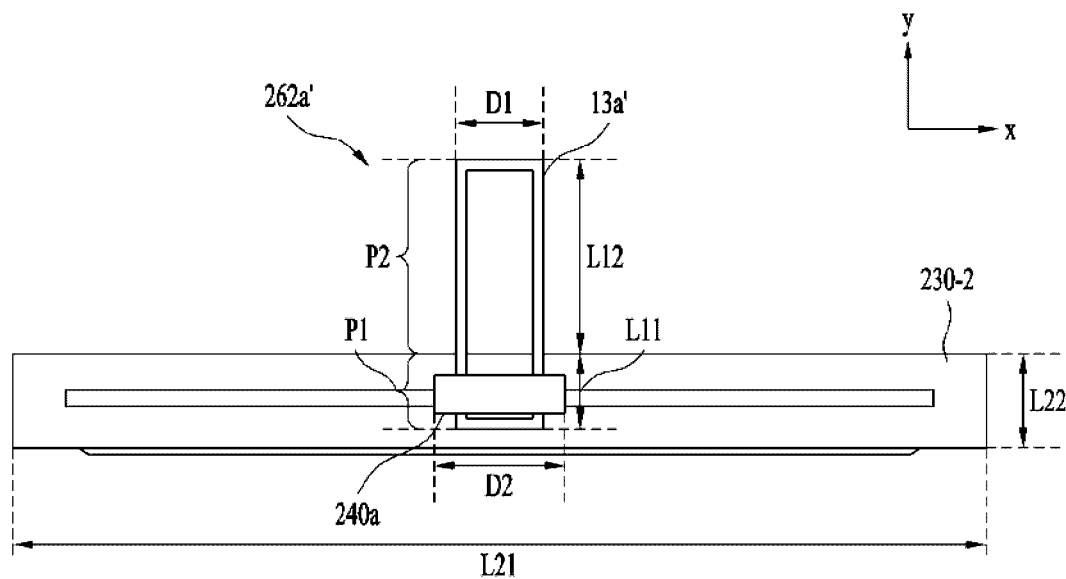
FIGS. 17a and 17b illustrate schematic views showing an output experiment of the OIS position sensor depending on a shape and disposition of the first of third coil.
Figure 17B:
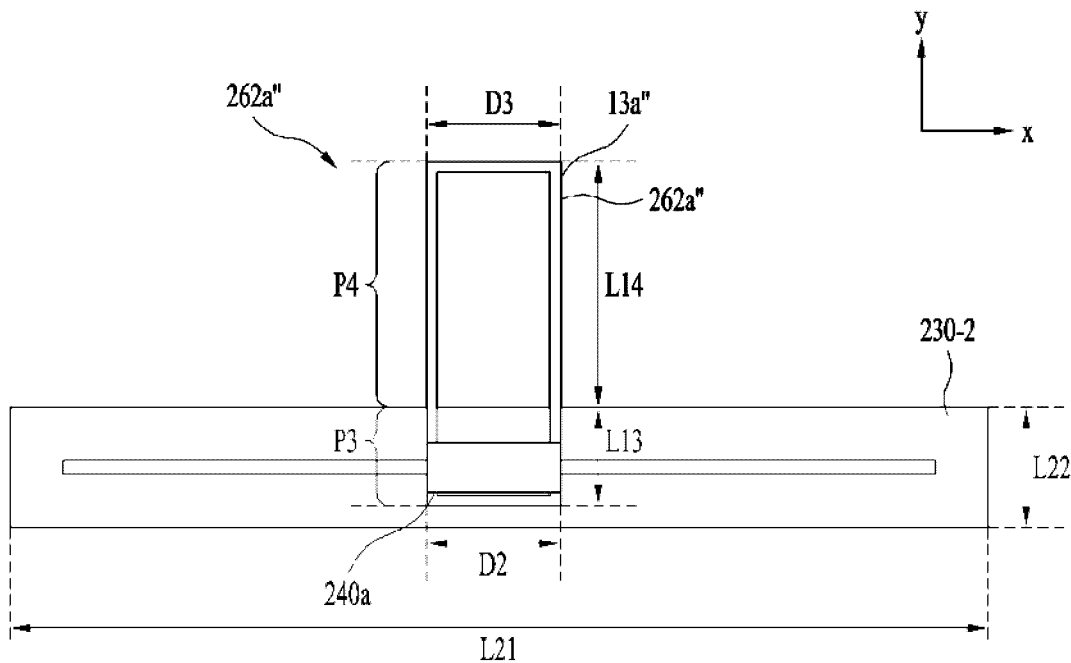
Figure 17C:
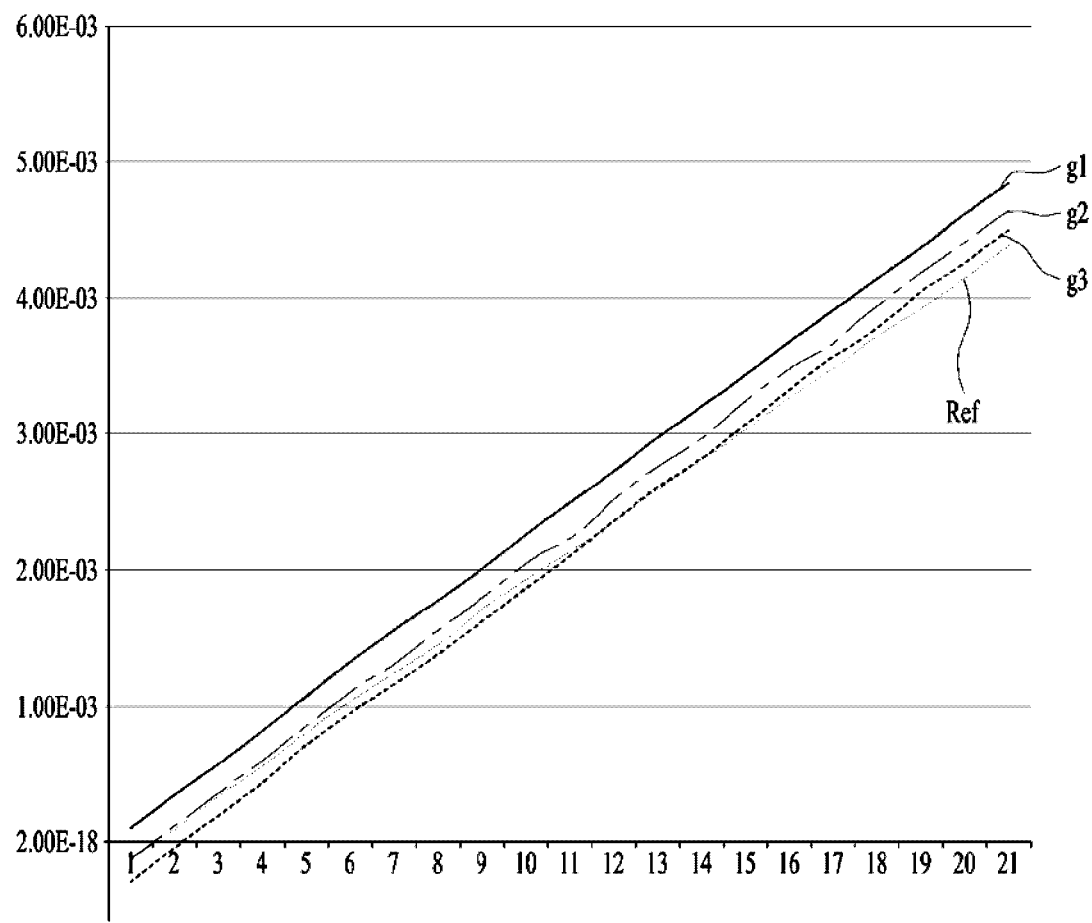
FIG. 17c illustrates a simulation experiment result obtained by the experiment of FIGS. 17a and 17b.

FIGS. 17a and 17b illustrate schematic views showing an output experiment of the OIS position sensor depending on the shape and disposition of the first of third coil, and FIG. 17c illustrates a simulation experiment result obtained through the experiment of FIGS. 17a and 17b. In FIG. 17c, the X axis represents time, wherein the unit is second, and the Y axis represents the output of the OIS position sensor, wherein the unit is mV.

Referring to FIG. 17a, the loop portion 13a' of the first of third coil 262a' may include a first region P1, which overlaps the second coil 230-2 in the optical-axis direction OS, and a second region P2, which does not overlap the second coil 230-2 in the optical-axis direction.

The first region P1 overlaps the OIS position sensor 240a in the optical-axis direction whereas the second region P2 does not overlap the OIS position sensor 240a in the optical-axis direction.

For example, the first region P1 may include a first portion that overlaps the OIS position sensor 240a and a second portion that does not overlap the OIS position sensor.

The diameter or width of the loop portion 13a' of the first of third coil 262a' in the second direction (for example, in the X-axis direction) may be smaller than the diameter or width of the OIS position sensor 240a in the second direction. For example, the second direction may be parallel to the longitudinal direction of the second coil 230.

The length D1 of the first region P1 in the second direction is smaller than the diameter of the OIS position sensor 240a in the second direction (D1<D2).

The length L12 of the second region P2 in the third direction (for example, in the Y-axis direction) is longer than the length L11 of the first region P1 in the third direction (L12>L11). For example, the third direction may be perpendicular to the longitudinal direction of the second coil 230.

The diameter of the loop portion 13a' of the first of third coil 262a' in the second direction is smaller than the diameter of the OIS coil 230-2 in the second direction.

The length D1 of the first region P1 in the second direction is shorter than the length L21 of the OIS coil 230-2 in the second direction (D1<L21).

The length L11 of the first region P1 in the third direction is shorter than the length L22 of the OIS coil 230-2 in the third direction (L11<L22).

The second region P2 may be located closer to the reference line than is the first region P1. The reference line may be an imaginary straight line that extends through the center of the housing 140 and is parallel to the optical-axis. For example, the reference line may be the optical-axis OA illustrated in FIG. 12.

Referring to FIG. 17b, the loop portion 13a" of the first of third coil 262a" may include a third region P3 that overlaps the second coil 230-2 in the optical-axis direction OA, and a fourth region P4 that does not overlap the second coil 230-2 in the optical-axis direction. The third region P3 does not overlap the OIS position sensor 240a in the optical-axis direction, and the fourth region P4 does not overlap the OIS position sensor 240a in the optical-axis direction. For example, the third region P3 may include a third portion that overlaps the OIS position sensor 240a and a fourth portion that does not overlap the OIS position sensor.

The diameter or width of the loop portion 13a" of the first of third coil 262a" in the second direction may be equal to the diameter or width of the OIS position sensor 240a in the second direction.

The length D3 of the third region P3 in the second direction may be equal to the diameter D2 of the OIS position sensor 240a in the second direction.

The length L14 of the fourth region P4 in the third direction is longer than the length L13 of the third region P3 in the third direction (L14>L13).

The length L14 of the fourth region P4 illustrated in FIG. 17b in the third direction may be longer than the length of the second region P2 illustrated in FIG. 17a in the third direction (L14>L12). g3 is closer to Ref than g2 is. Therefore, it is possible to further improve the reliability of OIS feedback control by the OIS position sensor 240a.

The diameter of the loop portion 13a" of the first of third coil 262a" in the second direction is smaller than the diameter of the OIS coil 230-2 in the second direction.

The length D3 of the third region P3 in the second direction is smaller than the length L21 of the OIS coil 230-2 in the second direction (D3<L21).

The length L14 of the third region P3 in the third direction is smaller than the length L22 of the OIS coil 230-2 in the third direction (L14<L22).

The fourth region P4 may be located closer to the reference line (for example, the optical-axis OA) than the third region P3 is.

The ratio (L11:L12) of the length L11 of the first region P1 and the length L12 of the second region P2 in the third direction or the ratio (L13:L14) of the length L13 of the third region P3 and the length L14 of the fourth region P4 may be 1:2-1:4. In another embodiment, the ratio (L11:L12) of L11 and L12 or the ratio (L13:L14) of L13 and L14 may be 1:2.4-1:2.8, without being limited thereto.

Referring to FIG. 17c, Ref represents the output of the OIS position sensor 240a with the result of detection of the intensity of a magnetic field of the first magnet 130 in the state in which the second coil 230 and the third coil 260 are not provided. Ref represents the result obtained under the condition in which the OIS position sensor 240a is not at all affected by a magnetic field of the second coil 230.

g1 represents output of the OIS position sensor 240a under the condition in which the second coil 230 is provided but the third coil 260 is not provided. Here, the output of the OIS position sensor 240a is different from Ref due to the influence of a magnetic field generated by the second coil 230.

g2 and g3 represent output of the OIS position sensor 240a under the condition in which the third coil 260 according to the embodiment is provided. g2 represents the output of the OIS position sensor 240a in the case of FIG. 17a, and g3 represents the output of the OIS position sensor 240a in the case of FIG. 17b.

Compared to the output of the OIS position sensor 240a in g1, the output of the OIS position sensor 240a in g2 and g3 is closer to Ref.

The embodiment is able to diminish the influence of the magnetic field of the second coil 230, which affects the output of the OIS position sensor 240, using a magnetic field generated by the third coil 260. Furthermore, the embodiment is able to cause the output of the OIS position sensor 240 to be close to the reference value (for example, Ref) using the third coil 260, with the result that it is possible to prevent a decrease in the gain margin of a frequency response property by the suppression ratio of the OIS position sensor in a frequency range higher than the second resonant frequency and is possible to ensure the stability of OIS feedback control and reliability of handshake correction.

Figure 19:
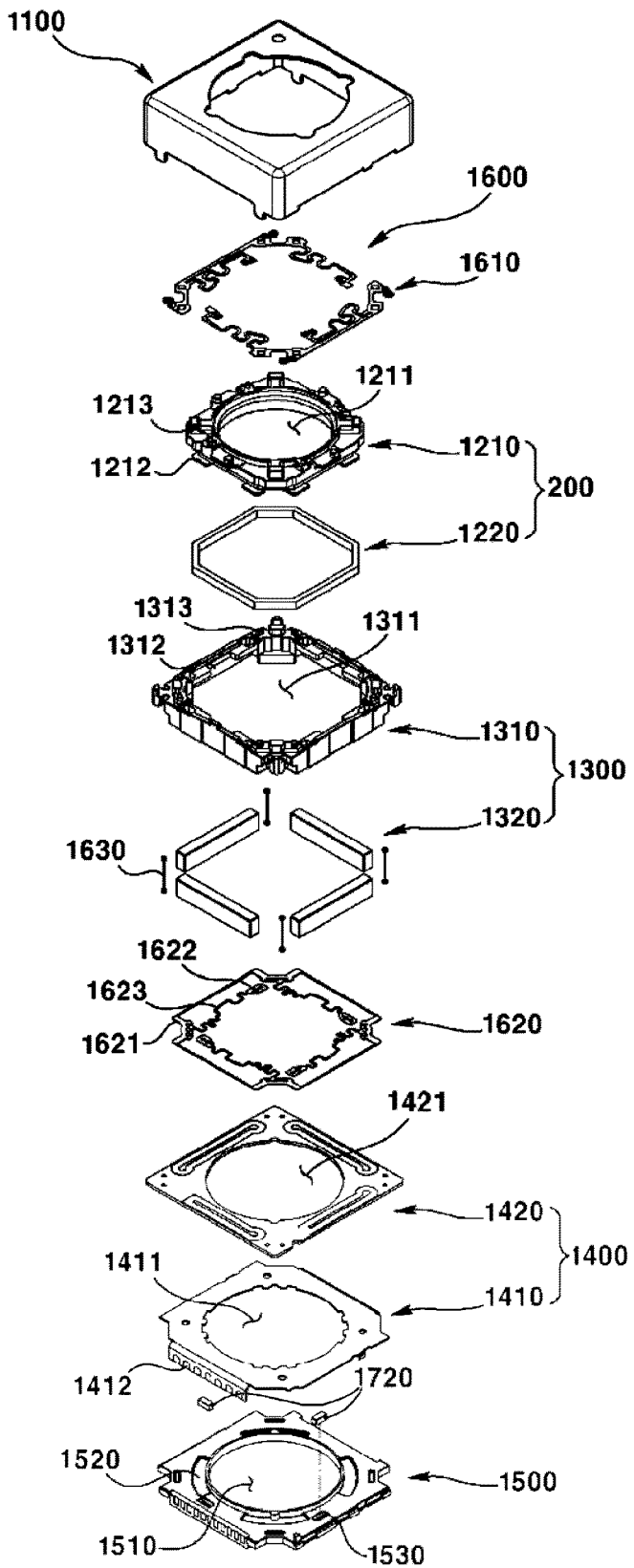
FIG. 19 is an exploded perspective view of the lens moving apparatus shown in FIG. 18.
Figure 20:
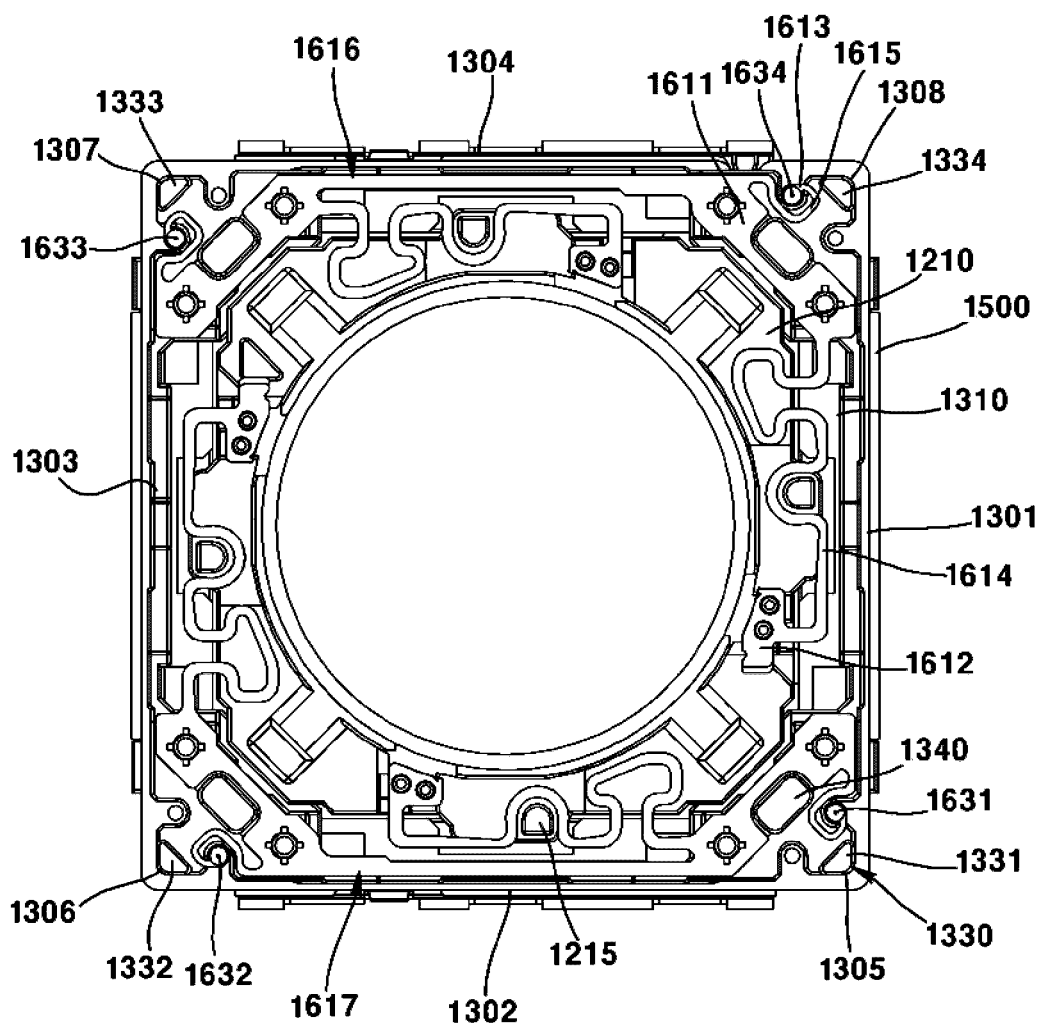
FIG. 20 is a cross-sectional view showing part of the lens moving apparatus shown in FIG. 19.
Figure 21:
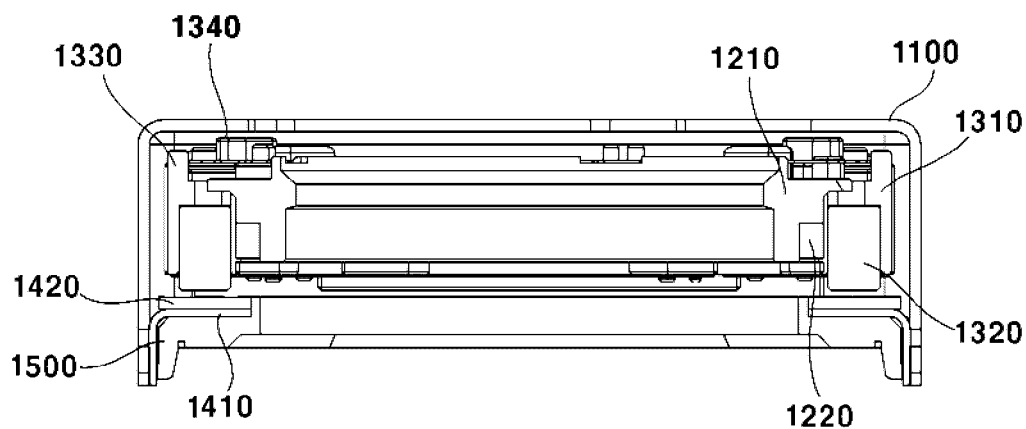
FIG. 21 is a cross-sectional view of the lens moving apparatus shown in FIG. 18.
Figure 22:
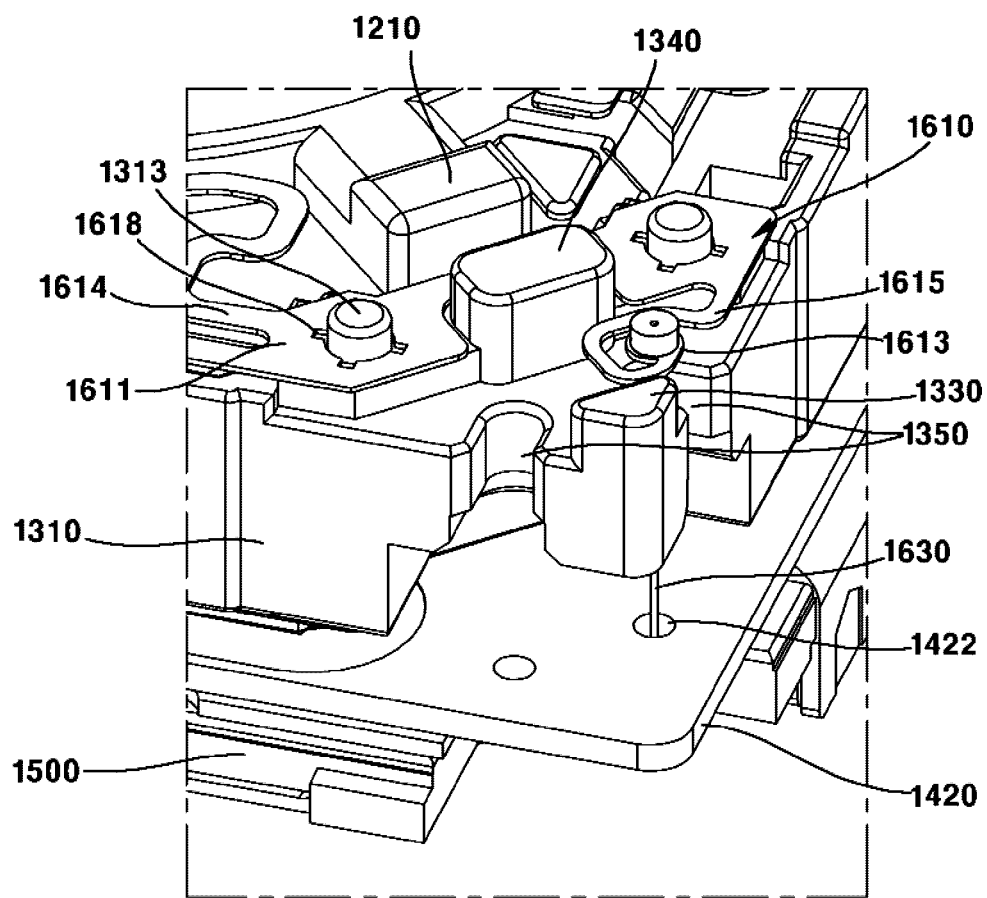
FIG. 22 is a perspective view showing part of the lens moving apparatus shown in FIG. 20.

FIG. 18 is a perspective view of a lens moving apparatus according to another embodiment. FIG. 19 is an exploded perspective view of the lens moving apparatus shown in FIG. 18. FIG. 20 is a cross-sectional view showing part of the lens moving apparatus shown in FIG. 19. FIG. 21 is a cross-sectional view of the lens moving apparatus shown in FIG. 18. FIG. 22 is a perspective view showing part of the lens moving apparatus shown in FIG. 20.

Referring to FIGS. 18 to 22, the lens moving apparatus may include a cover member 1100, a first movable unit 1200, a second movable unit 1300, a stationary unit 1400, a base 1500, support members 1600 and a sensor unit (not shown). However, one or more of the cover member 1100, the first movable unit 1200, the second movable unit 1300, the stationary unit 1400, the base 1500, the support members 1600 and the sensor unit may be omitted in the lens moving apparatus shown in FIGS. 18 to 22. Particularly, the sensor unit, which is intended to perform functions of autofocus feedback and/or handshake correction feedback, may be omitted.

The cover member 1100 may accommodate a housing 1310 and a bobbin 1210 in the internal space thereof. The cover member 1100 may be coupled to the base 1500. The cover member 100 may define the appearance of the lens moving apparatus. The cover member 1100 may be configured to have the shape of a rectangular parallelepiped having an open bottom, without being limited thereto.

The cover member 1100 may be made of, for example, metal. More specifically, the cover member 110 may be made of a metal plate. In this case, the cover member 110 may shield the interior against electromagnetic interference (EMI). Owing to these characteristics of the cover member 1100, the cover member 1100 may be referred as an EMI shield can. The cover member 1100 may prevent electric waves, which are generated outside the lens moving apparatus, from being introduced thereinto. Furthermore, the cover member 1100 may prevent electric waves, which are generated inside the cover member 1100, from being emitted outside. However, the material of the cover member 1100 is not limited to the above-mentioned material.

The cover member 110 may include a top plate 1101, a side plate 1102 and a round portion 1103. The cover member 1100 may include the side plate 1102, which is coupled at the lower end thereof to the base 1500. The cover member 1100 may include the top plate 1101, which is positioned above the housing 1310. The cover member 1100 may include the round portion 1103, which connects the side plate 1102 to the top plate 1101 and has a round shape. The lower end of the side plate 1102 of the cover member 1100 may be mounted on the base 1500. The cover member 1100 may be mounted on the base 1500 such that the inner surface of the cover member 1100 comes into close contact with a partial area or the entire area of the side surface of the base 1500. The first movable unit 1200, the second movable unit 1300, the stationary unit 1400 and the support members 1600 may be positioned in the internal space defined by the cover member 1100 and the base 1500. By virtue of this configuration, the cover member 100 is able to protect the internal components from external shocks and to prevent the entry of external contaminants. However, the embodiment is not limited to the above configuration, and the lower end of the side plate 1102 of the cover member 1100 may be directly coupled to the printed circuit board of the camera module, which is positioned under the base 1500.

The cover member 1100 may include an opening 1110, which is formed in the top plate 1101 so as to expose the lens module. The opening 1110 may be configured to have a shape corresponding to the lens module. The size of the opening 1110 may be larger than the diameter of the lens module so as to allow the lens module to be mounted through the opening 1110. Light, which is introduced through the opening 1110, may pass through the lens module. Here, the light having passed through the lens module may be obtained as an image at an image sensor.

The first movable unit 1200 may include a bobbin 1210 and an AF coil unit 1220. The first movable unit 1200 may include the bobbin 1210, which is coupled to the lens module. The first movable unit 1200 may include the AF coil unit 1220, which is positioned at the bobbin 1210 and which is moved by the electromagnetic interaction with a drive magnet unit 1320.

The bobbin 1210 may be coupled to the lens module. More specifically, the outer circumferential surface of the lens module may be coupled to the inner circumferential surface of the bobbin 1210. The AF coil unit 1220 may be positioned at the bobbin 1210. The AF coil unit 1220 may be coupled to the bobbin 1210. An upper elastic member 1610 may be coupled to an upper portion of the bobbin 1210. The bobbin 1210 may be positioned inside the housing 1310. The bobbin 1210 may move in the optical-axis direction relative to the housing 1310.

The bobbin 1210 may include a lens-accommodating portion 1211, a first drive-coupling portion 1212, an upper coupling portion 1213, a lower coupling portion (not shown) and a protrusion 1215.

The bobbin 1210 may include the lens-accommodating portion 1211 having an open top and an open bottom. The bobbin 1210 may include the lens-accommodating portion 1211 formed therein. The lens module may be coupled to the lens-accommodating portion 1211. The lens-accommodating portion 1211 may be provided on the inner circumferential surface thereof with a threaded portion that corresponds to a threaded portion formed on the outer circumferential surface of the lens module. In other words, the lens-accommodating portion 1211 may be threadedly coupled to the lens module. An adhesive is disposed between the lens module and the bobbin 1210. Here, the adhesive may be epoxy, which is hardened by ultraviolet or heat. In other words, the lens module and the bobbin 1210 may be bonded to each other via ultraviolet hardening epoxy and/or thermohardening epoxy.

The bobbin 1210 may include the first drive-coupling portion 1212, on which the AF coil unit 1220 is disposed. The first drive-coupling portion 1212 may be integrally formed with the outer surface of the bobbin 1210. The first drive-coupling portion 1212 may be continuously formed along the outer surface of the bobbin 1210 or may be intermittently formed along the outer surface of the bobbin 1210 at predetermined intervals. For example, the first drive-coupling portion 1212 may be configured to have a recess, which is formed by depressing part of the outer surface of the bobbin 1210 so as to correspond to the shape of the AF coil unit 1220. Here, the AF coil unit 1220 may be directly wound around the first drive-coupling portion 1212. In a modification, the first drive-coupling portion 1212 may be open at the top or bottom thereof. Here, the AF coil unit 1220 may be fitted into the first drive-coupling portion 1212 through a coil-ring-shaped opening.

The bobbin 1210 may include an upper coupling portion 1213, which is coupled to the upper elastic member 1610. The upper coupling portion 1213 may be coupled to the inner frame 1612 of the upper elastic member 1610. For example, the protrusion (not shown) of the upper coupling portion 1213 may be fitted into and coupled to a groove or hole (not shown) in the first inner frame 1612 of the upper elastic member 1610. Here, the protrusion of the upper coupling portion may be fitted into the inner frame 1612 of the upper elastic member 1610 and thermally fused thereto, thereby securing the upper elastic member 1610.

The bobbin 1210 may include a lower coupling portion (not shown), which is coupled to the lower elastic member 1620. The lower coupling portion may be coupled to the inner frame 1622 of the lower elastic member 1620. For example, the protrusion (not shown) of the lower coupling portion may be fitted into and coupled to a groove or hole (not shown) in the inner frame 1622 of the lower elastic member 1620. Here, the protrusion of the lower coupling portion may be fitted into the inner frame 1622 of the lower elastic member 1620 and thermally fused thereto, thereby securing the lower elastic member 1620.

The bobbin 1210 may include the protrusion 1215 projecting upwards from the upper surface of the bobbin 1210. The protrusion 1215 may project upwards from the upper surface of the bobbin 1210. The protrusion 1215 may be constituted by four protrusions, without being limited thereto. A second damper may be applied to the protrusion 1215. Part of the upper elastic member 1610 may be configured so as not to interfere with the protrusion 1215.

Among the AF coil unit 1220, the drive magnet unit 1320 and the OIS coil unit 1420, one may be referred to as a 'first drive part', another may be referred to as a 'second drive part', and the remaining one may be referred to as a 'third drive part'. Although the embodiment has been described as being configured such that the AF coil unit 1220 is positioned at the bobbin 1210, the drive magnet unit 1320 is positioned at the housing 1310 and the OIS coil unit 1420 is positioned at the base 1500, the positions of the AF coil unit 1220, the drive magnet unit 1320 and the OIS coil unit 1420 may be exchanged with one another. Furthermore, one or more of the coil units 1220 and 1420 may be replaced with an additional magnet part. In other words, the first to third drive parts may be designed to have any configuration as long as electromagnetic interaction among the first to third drive parts can be performed. One of the AF coil unit 1220 and the OIS coil unit 1420 may be referred to as a 'first coil unit' or a 'first coil', and the other thereof may be referred to as a 'second coil unit' or a 'second coil'.

The AF coil unit 1220 may be guided by the first drive-coupling portion 1212 and may be wound around the outer surface of the bobbin 1210. In another embodiment, the AF coil unit 1220 may include four independent coils, and two adjacent coils, among the four coils, may be disposed on the outer surface of the bobbin 1210 so as to define an angle of 90 degrees therebetween. The AF coil unit 1220 may face the drive magnet unit 1320. The AF coil unit 1220 may be disposed so as to perform electromagnetic interaction with the drive magnet unit 1320. The AF coil unit 1220 may move the bobbin 1210 with respect to the housing 1310 via electromagnetic interaction.

The AF coil unit 1220 may include a pair of lead wires (not shown) for the supply of power. Here, the pair of lead wires of the AF coil unit 1220 may be conductively connected to first and second upper elastic members 1616 and 1617, which are components of the upper elastic member 1610.

In other words, the AF coil unit 1220 may be supplied with power through the upper elastic member 1610. By virtue of this configuration, when power is supplied to the AF coil unit 1220, an electromagnetic field may be formed around the AF coil unit 1220.

The second movable unit 1300 may move to fulfill a function of handshake correction. The second movable unit 1300 may be positioned outside the first movable unit 1200 so as to face the first movable unit 1200. The second movable unit 1300 may move the first movable unit 1200 or may move along with the first movable unit 1200. The second movable unit 1300 may be movably supported by the stationary unit 1400 and/or the base 1500. The second movable unit 1300 may be positioned in the internal space of the cover member 1100.

The second movable unit 1300 may include the housing 1310 and the drive magnet unit 1320. The second movable unit 1300 may include the housing 1310, which is positioned outside the bobbin 1210. The second movable unit 1300 may include the drive magnet unit 1320, which is positioned so as to face the housing 1310 and is fixed to the housing 1310.

The housing 1310 may include a first side surface 1301, a second side surface 1302 adjacent to the first side surface 1301, and a corner portion 1305 positioned between the first side surface 1301 and the second side surface 1302. The housing 1301 may include first to fourth side surfaces 1301 to 1304, which are continuously positioned, and corner portions 1305 to 1308, which are positioned between the first to fourth side surfaces 1301 to 1304.

At least part of the housing 1310 may be configured to have a shape corresponding to the inner surface of the cover member 1100. Particularly, the outer surface of the housing 1310 may be configured to have a shape corresponding to the inner surface of the side plate 1102 of the cover member 1100. For example, the housing may be configured to have the shape of a rectangular parallelepiped having four side surfaces. However, the housing 1310 may be configured to have any shape, as long as the housing 1310 can be disposed in the cover member 100. The housing 1310 may be made of an insulating material, and may be made of an injection-molded product in consideration of productivity.

The housing 1310 may be positioned outside the bobbin 1210. The drive magnet unit 1320 may be positioned at the housing 1310. The housing 1310 may be positioned above the base 1500. The housing 1310, which is a part adapted to be moved for the OIS drive, may be disposed so as to be spaced apart from the cover member 1100 by a predetermined distance. However, the housing 1310 may be fixed to the base 1500 in an AF model. Alternatively, the housing 1310 may be omitted, and the drive magnet unit 1320 may be fixed to the cover member 1100 in the AF model. The upper elastic member 1610 may be coupled to an upper portion of the housing 1310.

The housing 1310 may include an internal space 1311, a second drive-coupling portion 1312, an upper coupling portion 1313, a lower coupling portion (not shown), a protrusion 1330, an upper stopper 1340 and a support member recess 1350.

The housing 1310 is open at the upper and lower sides thereof such that the first movable unit 1200 is accommodated in the housing 1310 and is moved up and down. The housing 1310 may include therein the internal space 1311, which is open at the upper and lower sides thereof. The bobbin 1210 may be movably disposed in the internal space 1311. In other words, the internal space 1311 may be configured to have a shape corresponding to that of the bobbin 1210. The inner circumferential surface of the housing 1310, which defines the internal space 1311, may be positioned so as to be spaced apart from the outer circumferential surface of the bobbin 1210.

The housing 1310 may include the second drive-coupling portion 1312 formed on the side surface thereof, which is configured to have a shape corresponding to the drive magnet unit 1320 so as to accommodate the drive magnet unit 1320. The second drive-coupling portion 1312 may accommodate the drive magnet unit 1320 and may secure the drive magnet unit 1320.

The drive magnet unit 1320 may be secured to the second drive-coupling portion 1312 via an adhesive (not shown). The second drive-coupling portion 1312 may be positioned on the inner circumferential surface of the housing 1310. In this case, this configuration gives an advantage to electromagnetic interaction with the AF coil unit 1220, which is positioned inside the drive magnet unit 1320. For example, the second drive-coupling portion 1312 may be configured to be open at the lower side thereof. In this case, this configuration gives an advantage to electromagnetic interaction between the drive magnet unit 1320 and the OIS coil unit 1420 positioned under the drive magnet unit 1320. For example, the second drive-coupling portion 1312 may be constituted by four second drive-coupling portions. The drive magnet unit 1320 may be coupled to each of the four second drive-coupling portions 1312. The second drive-coupling portions 1312 may be respectively formed on the first to fourth corner portions 1305 to 1308, at which adjacent side surfaces of the housing 1310 adjoin each other. Alternatively, the second drive-coupling portions 1312 may be respectively formed on the first to fourth side surfaces 1301 to 1304 of the housing 1310.

The housing 1310 may include the upper coupling portion 1313, which is coupled to the upper elastic member 1610. The upper coupling portion 1313 may be coupled to a first outer frame 1611 of the upper elastic member 1610. For example, the protrusion of the upper coupling portion 1313 may be fitted into and coupled to a groove or hole (not shown) in the first outer frame 1611 of the upper elastic member 1610. Here, the protrusion of the upper coupling portion 1313 may be fitted into the hole in the first outer frame 1611 and may be thermally fused thereto, thereby securing the upper elastic member 1610.

The housing 1310 may include the lower coupling portion, which is coupled to the lower elastic member 1620. The lower coupling portion may be coupled to a second outer frame 1621 of the lower elastic member 1620. For example, the protrusion of the lower coupling portion may be fitted into and coupled to a groove or hole (not shown) in the second outer frame 1621 of the lower elastic member 1620. Here, the protrusion of the lower coupling portion may be fitted into the hole in the second outer frame 1621 and may be thermally fused thereto, thereby securing the lower elastic member 1620.

The housing 1310 may include the protrusion 1330, which extends upwards from the upper surface thereof and which is positioned outside the upper elastic member 1610. The protrusion 1330 may extend upwards from the upper surface. The protrusion 1330 may be positioned outside the upper elastic member 1610. The protrusion 1330 may be positioned on at least one of the first to fourth corner portions 1305 to 1308 of the housing 1310. The protrusion 1330 may overlap the upper elastic member 1610 in a direction perpendicular to the optical-axis of the lens module, which is coupled to the bobbin 1210. In other words, the protrusion 1330 may overlap the upper elastic member 1610 in a horizontal direction.

By virtue of this configuration, the protrusion 1330 is able to prevent the upper elastic member 1610 from being exposed to the outside in a diagonal direction. In other words, even when a worker grasps the upper portion of the housing 1310, to which the upper elastic member 1610 is coupled, in a diagonal direction, the protrusion 330 of the housing 1310, rather than the upper elastic member 1610, is grasped, thereby preventing the upper elastic member 1610 from being deformed due to contact with the worker.

The protrusions 1330 may include a first protrusion 1331, positioned at the first corner portion 1305, a second protrusion 1332, positioned at the second corner portion 1306, a third protrusion 1333, positioned at the third corner portion 1307, and a fourth protrusion 1334, positioned at the fourth corner portion 1308. Here, a first imaginary line, which connects the center of the first protrusion 1331 to the center of the third protrusion 1333, may be orthogonal to a second imaginary line, which connects the center of the second protrusion 1332 to the center of the fourth protrusion 1334, at the center of the housing 1310. In other words, the first to fourth protrusions 1331 to 1334 may be symmetrically positioned with the center of the housing 1310.

The protrusion 1330 may be positioned outside the upper stopper 1340. The upper end of the protrusion 1330 may be positioned so as to be lower than the upper end of the upper stopper 1340 but higher than the upper elastic member 1610. The protrusion 1330 may overlap the round portion 1103 of the cover member 1100 in the optical-axis direction of the lens module coupled to the bobbin 1210.

In other words, the protrusion 1330 may overlap the round portion 1103 of the cover member 1100 in the up-and-down direction. In other words, the protrusion 1330 may overlap the round portion 103 of the cover member 1100 in the vertical direction. The upper stopper 1340 may overlap the top plate 1101 of the cover member 1100 in the optical-axis direction. In other words, the upper stopper 1340 may not overlap the round portion 1103 in the optical-axis direction. In other words, the upper stopper 1340 may not overlap the round portion 1103 in the optical-axis direction. By virtue of this configuration, when the housing 1310 is moved fully upwards, the upper stopper 1340, rather than the protrusion 1330, may come into contact with the inner side surface of the top plate 1101 of the cover member 1100.

If the height of the protrusion 1330 corresponds to or is equal to the height of the upper stopper 1340, the protrusion 1330 first comes into contact with the round portion 1103 of the cover member 1100 before the upper stopper 1340 comes into contact with the inner surface of the top plate 1101 of the cover member 1100. In this case, there is a problem in that the outer portion of the protrusion 1330 is ground while moving along the round portion 1103, thereby generating contaminants. In other words, the embodiment is constructed such that the upper stopper 1340, rather than the protrusion 1330, comes into contact with the cover member 1100, thereby preventing the generation of contaminants attributable to grinding of the protrusion 1330.

The protrusion 1330 is configured such that the upper elastic member 1610 and the soldering initiation portion of the support member 1630 are shielded when the lens moving apparatus is viewed in a diagonal direction (at an angle of 45 degrees with respect to the side surface).

The protrusion 1330 may be positioned outside the upper stopper 1340. The upper end of the protrusion 1330 may be positioned so as to be lower than the upper end of the upper stopper 1340.

In other words, the upper end of the upper stopper 1340 may serve as the top end of the housing 1310. By virtue of this configuration, when the housing 1310 is moved upward due to external force, the upper stopper 1340 may come into contact with the cover member 1100, whereby the movement of the housing 1310 is restricted.

In a modification, the protrusion 1330 may be integrally formed with the upper stopper 1340. In other words, the upper stopper 1340 may be omitted. In this case, the upper end of the protrusion 1330 may serve as the top end of the housing 1310.

The housing 1310 may include the upper stopper 1340, which extends upwards from the upper surface thereof and which is positioned inside the protrusion 1330. The upper stopper 1340 may extend upwards from the upper surface of the housing 1310. The upper stopper 1340 may be positioned inside the protrusion 1330. The upper stopper 1340 may overlap the cover member 1100 in the optical-axis direction. By virtue of this configuration, when the housing 1310 is moved upwards, the upper stopper 1340 may come into contact with the cover member 1100, whereby the movement of the housing 1310 is restricted. In other words, the upper stopper 1340 may be a structure adapted to mechanically restrict the upper limit of movement of the housing 1310.

The housing 1310 may include the support member recess 1350, which accommodates the support member 1630 and which is positioned inside the protrusion 1330. The support member recess 1350 may be formed by depressing part of the inner surface of the housing 1310 inwards. The support member recess 1350 may accommodate the support member 1630. The support member recess 1350 may be positioned inside the protrusion 1330.

The size of the support member recess 1350 may be smaller at a portion at which the stepped portion 1360 is formed than at the upper end of the support member recess 1350. In other words, the size of a portion of the support member recess 1350 in a horizontal direction may be reduced due to the stepped portion 1360. By virtue of this configuration, it is possible to prevent the first damper, which is introduced into the support member recess 1350, from flowing downwards.

The drive magnet unit 1320 may face the AF coil unit 1220. The drive magnet unit 1320 may move the AF coil unit 1220 via the electromagnetic interaction with the AF coil unit 1220. The drive magnet unit 1320 may be positioned at the housing 1310. The drive magnet unit 1320 may be fixed to the second drive-coupling portion 1312 of the housing 1310. The drive magnet unit 1320 may include four independent magnets, which are disposed at the housing 1310 such that two adjacent magnets define an angle of 90 degrees therebetween. In other words, the drive magnet unit 1320 is able to realize efficient utilization of the internal space of the housing 1310 by means of magnets, which are mounted on the four side surfaces of the housing 1310 at regular intervals. The drive magnet unit 1320 may be bonded to the housing 1310 via an adhesive, without being limited thereto.

The stationary unit 1400 may be positioned at the base 1500. The stationary unit 1400 may be positioned under the second movable unit 1300. The stationary unit 1400 may face the second movable unit 1300. The stationary unit 1400 may support the second movable unit 1300 in a movable manner. The stationary unit 1400 may move the second movable unit 1300. Here, the first movable unit 1200 may also be moved together with the second movable unit 1300. The stationary unit 1400 may be provided in the center thereof with through holes 1411 and 1421, which correspond to the lens module.

For example, the stationary unit 1400 may include a circuit board 1410 and an OIS coil unit 420. The stationary unit 1400 may include the circuit board 1410, which is positioned between the OIS coil unit 420 and the base 1500. The stationary unit 1400 may include the OIS coil unit 420, which faces the drive magnet unit 1320.

The circuit board 1410 may include a flexible printed circuit board. The base 1410 may be positioned between the base 1500 and the housing 1310. The circuit board 1410 may be positioned between the OIS coil unit 1420 and the base 1500. The circuit board 1410 may supply power to the OIS coil unit 1420. The circuit board 1410 may supply power to the AF coil unit 1220. For example, the circuit board 1410 may supply power to the AF coil unit 1220 via the support member 1630 and the upper elastic member 1610. Furthermore, the circuit board 1410 may supply power to the AF sensor unit via the support member 1630 and the upper elastic member 1610.

For example, the circuit board 1410 may include the through hole 1411 and a terminal unit 1412. The circuit board 1410 may include the through hole 1411 through which light, having passed through the lens module, passes. The circuit board 1410 may include the terminal unit 1412, which is bent downwards and is exposed to the outside. The terminal unit 1412 may be exposed at at least part thereof to the outside, and may be connected to an external power source, whereby power is supplied to the circuit board 1410.

The OIS coil unit 1420 may move the drive magnet unit 1320 via electromagnetic interaction. The OIS coil unit 1420 may be positioned at the circuit board 1410. The OIS coil unit 1420 may be positioned between the base 1500 and the housing 1310. The OIS coil unit 1420 may face the drive magnet unit 1320. When power is applied to the OIS coil unit, the drive magnet unit 1320 and the housing 1310, to which the drive magnet unit 1320 is fixed, may be moved together via interaction between the OIS coil unit 1420 and the drive magnet unit 1320.

The OIS coil unit 1420 may be constituted by a fine pattern coil (FP coil), which is mounted on the circuit board 1410. This may be efficient in terms of miniaturization of the lens moving apparatus (decrease in the height of the lens moving apparatus in the optical-axis direction, i.e., in the Z-axis direction). For examples, the OIS coil unit 1420 may be disposed so as to minimize interference with the OIS sensor unit 1720, which is positioned thereunder. The OIS coil unit 1420 may be positioned so as not to overlap the OIS sensor unit 1720 in an up-and-down direction.

The OIS coil unit 1420 may include the through hole 1421, through which light, having passed through the lens module, passes. The through hole 1421 may have a diameter corresponding to the diameter of the lens module. The through hole 1421 in the OIS coil unit 1420 may have a diameter corresponding to that of the through hole 1411 in the circuit board 1410. The through hole 1421 in the OIS coil unit 1420 may have a diameter corresponding to that of the through hole in the base 1500. For example, the through hole 1421 may be circular, without being limited thereto.

The base 1500 may be positioned under the bobbin 1210. The base 1500 may be positioned under the housing 1310. The base 1500 may support the second movable unit 1300. A printed circuit board may be positioned under the base 1500. The base may serve as a sensor holder adapted to function to protect the image sensor mounted on the printed circuit board.

The base 1500 may include a through hole 1510, a contaminant collector 1520 and a sensor mount 1530.

The base 1500 may include the through hole 1510, which is formed at a position that corresponds to the lens-accommodating portion 1211 in the bobbin 1210. An infrared ray filter may be coupled to the through hole 1510 in the base 1500. Alternatively, the infrared ray filter may also be coupled to an additional sensor holder disposed under the base 1500.

The base 1500 may include the contaminant collector 1520 for collecting contaminants, which are introduced into the cover member 1100. The contaminant collector 1520 may be positioned on the upper surface of the base 1500, and may include an adhesive material so as to collect contaminants in the internal space defined by the cover member 1100 and the base 1500.

The base 1500 may include the sensor mount 1530, to which the OIS sensor unit 1720 is coupled. In other words, the OIS sensor unit 1720 may be mounted on the sensor mount 1530. Here, the OIS sensor unit 1720 may detect the drive magnet unit 1320 coupled to the housing 1310 so as to detect horizontal movement or tilting of the housing 1310. For example, the sensor mount 1530 may include two sensor mounts. Each of the two sensor mounts 1530 may be configured to have a groove shape, and may be provided with the OIS sensor unit 1720. In this case, the OIS sensor unit 1720 may include a first axis sensor and a second axis sensor, which are disposed so as to detect movement of the housing 1310 both in the X-axis and Y-axis directions.

The elastic support member 600 may connect two or more of the first movable unit 1200, the second movable unit 1300, the stationary unit 1400 and the base 1500 to each other. The elastic support member 1600 may elastically connect two or more of the first movable unit 1200, the second movable unit 1300, the stationary unit 1400 and the base 1500 to each other so as to support the components while allowing the components to move relatively to one another. The elastic support member 600 may be formed so as to have elasticity at at least part thereof. In this case, the elastic support member 600 may be referred to as an elastic member or a spring.

For example, the elastic support member 600 may include the upper elastic member 1610, the lower elastic member 1620 and the support member 1630. Here, the upper elastic member 1610 and the lower elastic member 1620 may be referred to as a 'spring for autofocus', an 'elastic member for autofocus', a 'spring' or the like. The support member 1630 may be referred to as a 'spring for handshake correction', an 'elastic member for OIS' or the like.

The upper elastic member 1610 may be coupled both to an upper portion of the housing and to an upper portion of the bobbin 1210. The first inner frame 1612 of the upper elastic member 1610 may be coupled to the upper coupling portion 1213 of the bobbin 1210, and the first outer frame 1611 of the upper elastic member 1610 may be coupled to the upper coupling portion 1313 of the housing 1310. At least part of the upper elastic member 1610 may be positioned between the upper stopper 1340 and the protrusion 1330.

The upper elastic member 1610 may include the first outer frame 1611, the first inner frame 1612, a coupling portion 1613, a first connecting portion 1614 and a second connecting portion 1615.

The upper elastic member 1610 may include the first inner frame 1612, which is coupled to the bobbin 1210. The upper elastic member 1610 may include the first outer frame 1611, which is coupled to the housing 1310. The upper elastic member 1610 may include the coupling portion 1613, which is coupled to the support member 1630. The upper elastic member 1610 may include the first connecting portion 1614, which connects the first inner frame 1612 to the first outer frame 1611. The upper elastic member 1610 may include the second connecting portion 1615, which connects the first outer frame 1611 to the coupling portion 1613.

The first outer frame 1611 may be coupled to the housing 1310. The first inner frame 1612 may be coupled to the bobbin 1210. The coupling portion 1613 may be coupled to the support member 1630. The first damper may be positioned at the coupling portion 1613. The first coupling portion 1614 may connect the first inner frame 1612 to the first outer frame 1611. The second connecting portion 1615 may connect the first outer frame 1611 to the coupling portion 1613. The second connecting portion 1615 may be bent multiple times.

For example, the upper elastic member 1610 may be divided into a pair of members so as to supply power to the AF coil unit 1220. The upper elastic member 1610 may include the first upper elastic member 1616 and the second upper elastic member 1617, which are spaced apart from each other. The first upper elastic member 1616 may be conductively connected to one end of the AF coil unit 1220, and the second upper elastic member 1617 may be conductively connected to the other end of the AF coil unit 1220. By virtue of this configuration, the upper elastic member 1610 is able to supply power to the AF coil unit. The upper elastic member 1610 may be supplied with power from the circuit board 1410 via the support member 1630.

The upper elastic member 1610 may include a fusion groove 1618. The fusion groove 1618 may be formed in the first outer frame 1611. The fusion groove 1618 may extend from the hole into which the protrusion of the housing 1310 is fitted. By virtue of this configuration, when the protrusion of the housing 1310 is fused by heat in the state in which the protrusion of the housing 1310 is fitted into the hole in the upper elastic member 1610, part of the fused protrusion is introduced into the fusion groove 1618, thereby preventing rotation of the first outer frame 1611.

The lower elastic member 1620 may be coupled both to a lower portion of the bobbin 1210 and to a lower portion of the housing 1310. The lower elastic member 1620 may include the second outer frame 1621, the second inner frame 1622 and a connecting portion 1623. The lower elastic member 1620 may include the second outer frame 1621, coupled to the housing 1310, the second inner frame 1622, coupled to the bobbin 1210, and the connecting portion 1623, elastically connecting the second outer frame 1621 to the second inner frame 1622. For example, the lower elastic member 1620 may be integrally formed, without being limited thereto. In a modification, the lower elastic member 1620 may be divided into a pair of members so as to supply power to the AF coil unit 1220 and the like.

The support member 1630 may elastically support the housing 1310 with respect to the base 1500. The support member 1310 may be coupled at one end thereof to the stationary unit 1400 and/or the base 1500, and may be coupled at the other end thereof to the upper elastic member 1610 and/or the housing 1310. The support member 1630 may be coupled to the stationary unit 1400 and to the upper elastic member 1610. The support member 1630 may be coupled at one end thereof to the stationary unit 1400, and may be coupled at the other end thereof to the upper elastic member 1610. By virtue of this configuration, the support elastically supports the second movable unit 1300 with respect to the stationary unit 1400 such that the second movable unit 1300 is moved horizontally or tilted. For example, the support member 1630 may include a plurality of wires. In a modification, the support member 1630 may include a plurality of leaf springs. The support member 1630 may be integrally formed with the upper elastic member 1610.

The support member 1630 may be conductively connected at one end thereof to the circuit board 1410, and may be conductively connected at the other end thereof to the upper elastic member 1610. For example, the support member 1630 may include four support members. In other words, the support member 1630 may include first to fourth support members 1631 to 1634, which are disposed so as to be spaced apart from one another.

The support member 1630 may include the first support member 1631, positioned at the first corner portion 1305 of the housing 1310. The support member 1630 may include the second support member 1632, positioned at the second corner portion 1306 of the housing 1310. The support member 1630 may include the third support member 1633, positioned at the third corner portion 1307 of the housing 1310. The support member 1630 may include the fourth support member 1634, positioned at the fourth corner portion 1308 of the housing 1310. In other words, the first to fourth support members 1631 to 1634 may be continuously disposed so as to be adjacent to each other. However, the number of support members 1630 is not limited to four.

The support member 1630 or the upper elastic member 1610 may include a shock-absorbing portion (not shown) for absorbing shocks. The shock-absorbing portion may be provided at one or more of the support member 1630 and the upper elastic member 1610. The shock-absorbing portion may be a separate member, such as a damper. Alternatively, the shock-absorbing portion may be realized by partial change of the shape of one or more of the support member 1630 and the upper elastic member 1610.

The sensor unit may be provided for one or more of autofocus feedback and handshake correction feedback. The sensor unit may detect the position or movement of one or more of the first movable unit 1200 and the second movable unit 1300.

For example, the sensor unit may include the AF sensor unit and the OIS sensor unit 1720. The AF sensor unit may detect relative vertical movement of the bobbin 1210 with respect to the housing 1310 so as to provide information for AF feedback. The OIS sensor unit 1720 may detect horizontal movement or tilting of the second movable unit 1300 so as to provide information for OIS feedback.

For example, the AF sensor unit may include an AF sensor (not shown), a sensor circuit board (not shown) and a sensing magnet (not shown). The AF sensor may be disposed at an upper portion of the housing 1310. Here, the sensing magnet may be disposed at an upper portion of the bobbin 1210. The AF sensor may be disposed at the housing 1310 in the state of being mounted on the sensor circuit board. The AF sensor may detect the position or movement of the bobbin 1210 by detecting the sensing magnet disposed at the bobbin 1210. The AF sensor may be a Hall sensor adapted to detect the magnetic force of the sensing magnet, without being limited thereto.

The OIS sensor unit 1720 may be positioned at the stationary unit 1400. The OIS sensor unit 1720 may be positioned on the upper or lower surface of the circuit board 1410. For example, the OIS sensor unit 1720 may be disposed on the lower surface of the circuit board 1410, and may be positioned on the sensor mount 1530 formed on the base 1500. For example, the OIS sensor unit 1720 may include a Hall sensor. In this case, the OIS sensor unit may detect relative movement of the second movable unit 1300 with respect to the stationary unit 1400 by detecting a magnetic field of the drive magnet unit 1320. For example, the OIS sensor unit 1720 may include a first axis sensor and a second axis sensor so as to detect the movement of the second movable unit 1300 both in both the X-axis and Y-axis directions. The OIS sensor unit 1720 may be positioned so as not to overlap the FP coil of the OIS coil unit 1420 in the up-and-down direction.

The first damper (not shown) may be applied to the support member 1630. The first damper may be positioned at one or more of the coupling portion 1613, the support member 1630 and the housing 1310. By virtue of this configuration, the first damper is able to prevent a resonance phenomenon (oscillation phenomenon at the resonant frequency) of the elastic support member 1600, which may occur in the OIS feedback procedure. Here, the first damper may be positioned inside the protrusion 1330 of the housing 1310. In this case, since a phenomenon in which the first damper is separated outwards is prevented, it is possible to more efficiently manage the first damper.

The second damper (not shown) may be positioned at the protrusion 1215 of the bobbin 1210 and the first inner frame 1612 of the upper elastic member 1610. By virtue of this configuration, the first damper is able to prevent a resonance phenomenon of resonance of the elastic support member 1600, which may occur in AF feedback and/or OIS feedback procedure.

Hereinafter, the autofocus function of the camera module including the lens moving apparatus according to an embodiment will be described. When power is supplied to the AF coil unit 1220, the AF coil unit 1220 is moved with respect to the drive magnet unit 1320 via electromagnetic interaction between the AF coil unit 1220 and the drive magnet unit 1320. Here, the bobbin 1210, to which the AF coil unit 1220 is coupled, is moved together with the AF coil unit 1220. In other words, the bobbin 1210, which is provided therein with the lens module, is moved in the optical-axis direction (in the up-and-down direction or in the vertical direction) with respect to the housing 1310. Since the movement of the bobbin 1210 causes the lens module to be moved close to or away from the image sensor, the embodiment is able to perform control of focus on an object by supplying power to the AF coil unit 1220.

For the purpose of more precise realization of an autofocus function, autofocus feedback may be applied to the embodiment. The AF sensor, which is disposed at the housing 1310 and is embodied as a Hall sensor, detects a magnetic field of the sensing magnet secured to the bobbin 1210. Accordingly, as the bobbin 1210 is moved relative to the housing 1310, the amount of the magnetic field that is detected by the AF sensor, varies. The AF sensor detects an amount of movement or position of the bobbin 1210 in the Z-axis direction using the above principle, and transmits the detected value to the controller. The controller determines whether or not further movement of the bobbin 1210 is performed based on the detected value. Since this procedure is performed in real time, it is possible to perform a more precise autofocus function of the camera module according to the embodiment by means of the autofocus feedback.

The function of handshake correction of the camera module including the lens moving apparatus according to the embodiment will be described. When power is supplied to the OIS coil unit 1420, the drive magnet unit 1320 is moved with respect to the OIS coil unit 1420 via electromagnetic interaction between the OIS coil unit 1420 and the drive magnet unit 1320. At this time, the housing 1310, to which the drive magnet unit 1320 is coupled, is moved together with the drive magnet unit 1320. In other words, the housing 1310 is moved horizontally with respect to the base 1500. However, the housing 1310 may be tilted with respect to the base 1500. The bobbin 1210 is moved together with the housing 1310. Accordingly, since the movement of the housing 1310 causes the lens module to be moved with respect to the image sensor in a direction parallel to the direction in which the image sensor is disposed (perpendicular to the optical-axis, i.e., a horizontal direction), the embodiment is able to perform the function of handshake correction by supplying power to the OIS coil unit 1420.

For the purpose of more precise realization of the function of handshake correction, handshake correction feedback may be applied to the embodiment. The OIS sensor unit 1720 composed of a pair of OIS sensor units, which are mounted on the base 1500 and are embodied as Hall sensors, detects a magnetic field of the drive magnet unit 1320 secured to the housing 1310. Accordingly, as the housing 1310 moves relative to the base 1500, the amount of the magnetic field that is detected by the OIS sensor unit 1720 varies. The pair of OIS sensor units 1700 detects an amount of movement or position of the housing 1310 in the horizontal direction (in the X-axis and Y-axis directions) using the above principle, and transmits the detected value to the controller. The controller determines whether or not further movement of the housing 1310 is performed based on the detected value. Since this procedure is performed in real time, it is possible to perform a more precise handshake correction function of the camera module according to the embodiment by means of the handshake correction feedback.

Figure 23:
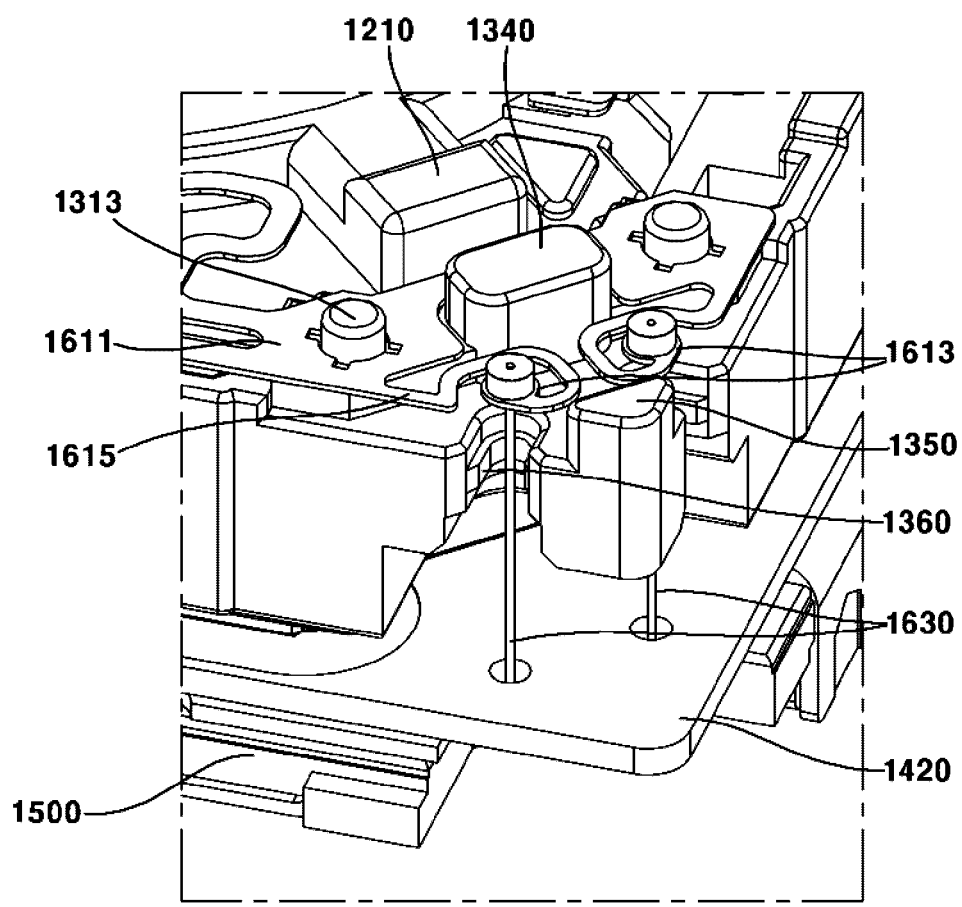
FIG. 23 is a perspective view showing part of a lens moving apparatus according to a further embodiment.

FIG. 23 is a perspective view showing part of a lens moving apparatus according to a further embodiment. FIG. 23 may be a modification of the embodiment shown in FIGS. 18 to 22.

Referring to FIG. 23, the lens moving apparatus may include the cover member 1100, the first movable unit 1200, the second movable unit 1300, the stationary unit 1400, the base 1500, the elastic support member 1600 and the sensor unit (not shown). Here, a description regarding the cover member 1100, the first movable unit 1200, the second movable unit 1300, the stationary unit 1500, the elastic support member 1600 and the sensor unit (not shown) may be replaced with the description regarding those shown FIGS. 18 to 21. The difference between the modification and the previous embodiment resides in the shape of the housing 1310 of the second movable unit 1300 and the number of support members 1630 of the elastic support member 600.

The housing 1310 according to the embodiment may include the stepped portion 1360, projecting from the side surface of the housing that defines the support member recess 1350. The stepped portion 1360 may project from the side surface of the housing 1310 that defines the support member recess 1350. In other words, the stepped portion 1360 may be formed in a partial region of the support member recess 1350 so as to reduce the diameter of the support member recess 1350. The stepped portion 1360 may prevent the first damper from being separated downwards along the support member recess 1350. In other words, the stepped portion 1360 may serve as a structure for prevention of separation of the damper.

The modification may include eight support members 1630, which are spaced apart or separated from each other. In the modification, each of the support member recess 1350 adapted to accommodate the support member 1630 and the upper elastic member 1610 coupled to the support member 1630 may be divided into eight parts.

Figure 24:
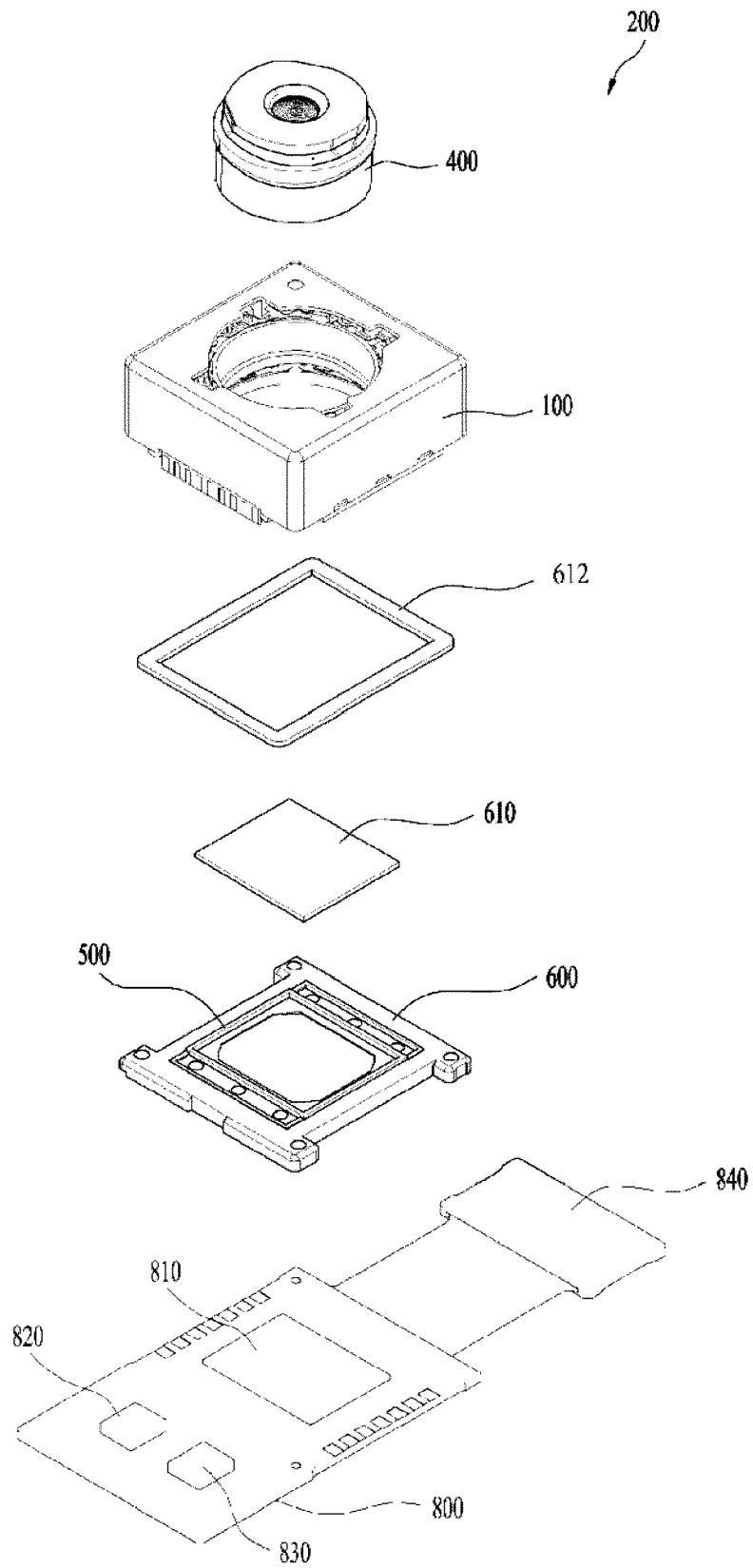
FIG. 24 is an exploded perspective view of a camera module according to an embodiment.

FIG. 24 is an exploded perspective view illustrating a camera module 200 according to an embodiment.

Referring to FIG. 24, the camera module may include a lens module 400, the lens moving apparatus, an adhesive member 710, a filter 610, a first holder 600, a second holder 800, an image sensor 810, a motion sensor 820, a controller 830, and a connector 840.

The lens module 400 may include a lens or may include a lens and a lens barrel. The lens module 400 may be mounted in the bobbin 110 of the lens moving apparatus.

The configuration of the lens module 400 is not limited to a lens barrel, and the lens module 400 may have any other configuration as long as the lens module can support one or more lenses. For example, the lens module 400 may be coupled to the inside of the lens moving apparatus. For example, the lens module may be coupled to the lens moving apparatus in a threaded manner. For example, the lens module may be coupled to the lens moving apparatus via an adhesive (not shown). The light that has passed through the lens module 400 may be radiated to the image sensor 810.

The first holder 600 may be located under the base 210 of the lens moving apparatus. The filter 610 may be mounted on the first holder 600, and the first holder 600 may have a raised portion 500 on which the filter 610 is seated.

The adhesive member 710 may couple or attach the base 210 of the lens moving apparatus to the first holder 600. In addition to the attachment function described above, the adhesive member 710 may serve to prevent contaminants from entering the lens moving apparatus.

The adhesive member 710 may be, for example, epoxy, thermohardening adhesive, ultraviolet hardening adhesive or the like.

The filter 610 may serve to prevent light within a specific frequency band, having passed through the lens module 400, from being introduced into the image sensor 810. The filter 610 may be an infrared-light-blocking filter, without being limited thereto. Here, the filter 610 may be oriented parallel to the X-Y plane.

The region of the first holder 600 in which the filter 610 is mounted may be provided with a bore so as to allow the light that passes through the filter 610 to be introduced into the image sensor 810.

The second holder 800 may be disposed under the first holder 600, and the image sensor 810 may be mounted on the second holder 800. The light that passes through the filter 610 is introduced into the image sensor 810 so as to form an image on the image sensor 810.

The second holder 800 may include, for example, various circuits, devices, and a controller in order to convert the image, formed on the image sensor 810, into electrical signals and to transmit the electrical signals to an external component.

The second holder 800 may be embodied as a circuit board on which the image sensor may be mounted, a circuit pattern may be formed, and various devices may be coupled.

The image sensor 810 may receive an image contained in the light introduced through the lens moving apparatus, and may convert the received image into electrical signals. The image sensor 810 may output radiated light as an image. The image sensor 810 may be, for example, a charge-coupled device (CCD), a metal oxide semiconductor (MOS), CPD or CID. However, the kind of the image sensor is not limited thereto.

The filter 610 and the image sensor 810 may be spaced apart from each other so as to be opposite to each other in the first direction.

The motion sensor 820 may be mounted on the second holder 800, and may be conductively connected to the controller 830 through the circuit pattern formed on the second holder 800.

The motion sensor 820 outputs rotational angular speed information regarding the movement of the camera module 200. The motion sensor 820 may be embodied as a dual-axis or triple-axis gyro sensor or an angular speed sensor.

The controller 830 may be mounted on the second holder 800, and may be conductively connected to the second position sensor 240 and the second coil 230 of the lens moving apparatus. For example, the second holder 800 may be conductively connected to the circuit board 250 of the lens moving apparatus, and the controller 820 mounted on the second holder 800 may be conductively connected to the second position sensor 240 and the second coil 230 through the circuit board 250.

For example, the controller 820 may supply drive signals to the first coil 120 and the second coil 230, may supply drive signals to the first position sensor 170 and the second position sensor 240, and may receive output signals from the first position sensor 170 and the second position sensor 240.

For example, the handshake controller 830 may output a drive signal, which is required in order to allow the lens moving apparatus to perform AF feedback driving for the AF movable unit and/or handshake feedback correction for the OIS movable unit, based on output signals provided from the second position sensor 240 of the lens moving apparatus.

The connector 840 may be conductively connected to the second holder 800, and may have a port for electrical connection of an external component.

The lens moving apparatus 100 according to the embodiment may be embedded in an optical instrument, which is intended to form an image of an object in a space so as to increase a user's visual perception using reflection, refraction, absorption, interference, diffraction and the like, which are properties of light, which is intended to record an image formed through a lens and to reproduce the image, or which is intended to perform optical measurement, propagation or transmission of an image or the like. For example, the optical instrument according to the embodiment may be any one of a mobile phone, a smartphone, a portable smart device, a digital camera, a laptop computer, a digital broadcasting terminal, a Personal Digital Assistant (PDA), a Portable Multimedia Player (PMP), and a navigation tablet PC, but is not limited hereto. Any kind of device for capturing an image or a photograph may be possible.

Figure 25:
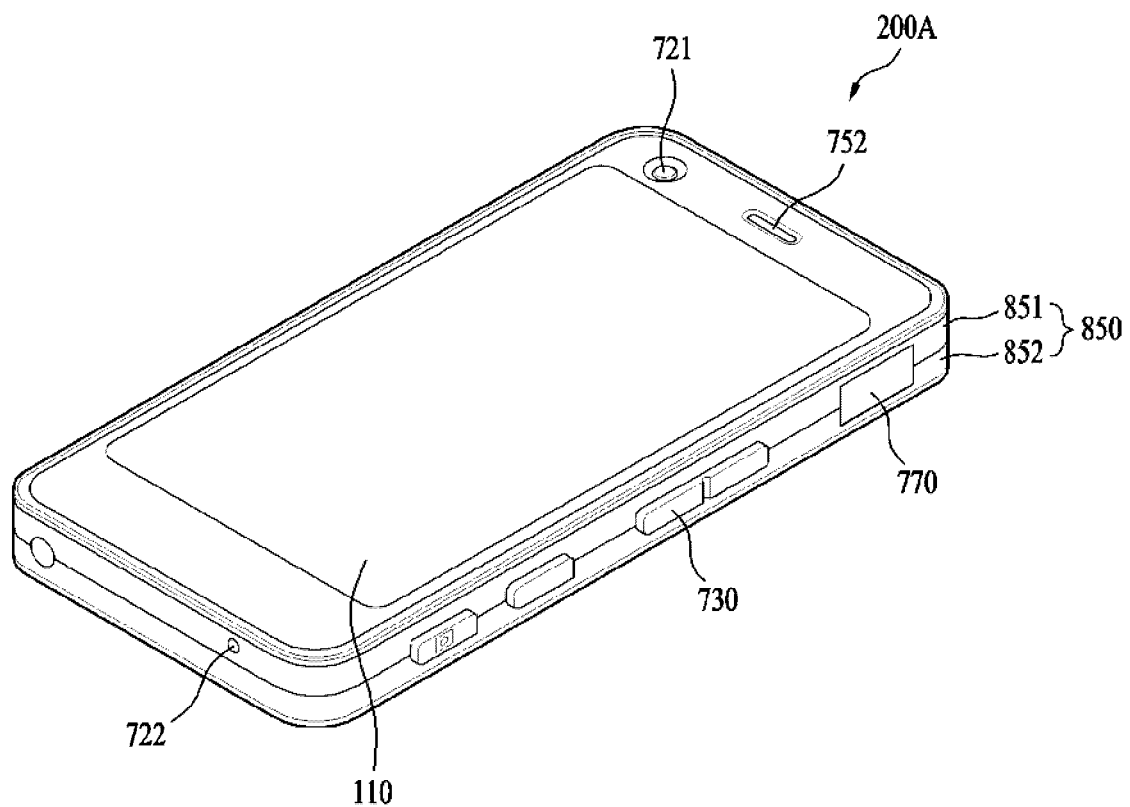
FIG. 25 is a perspective view illustrating a portable terminal according to an embodiment.
Figure 26:
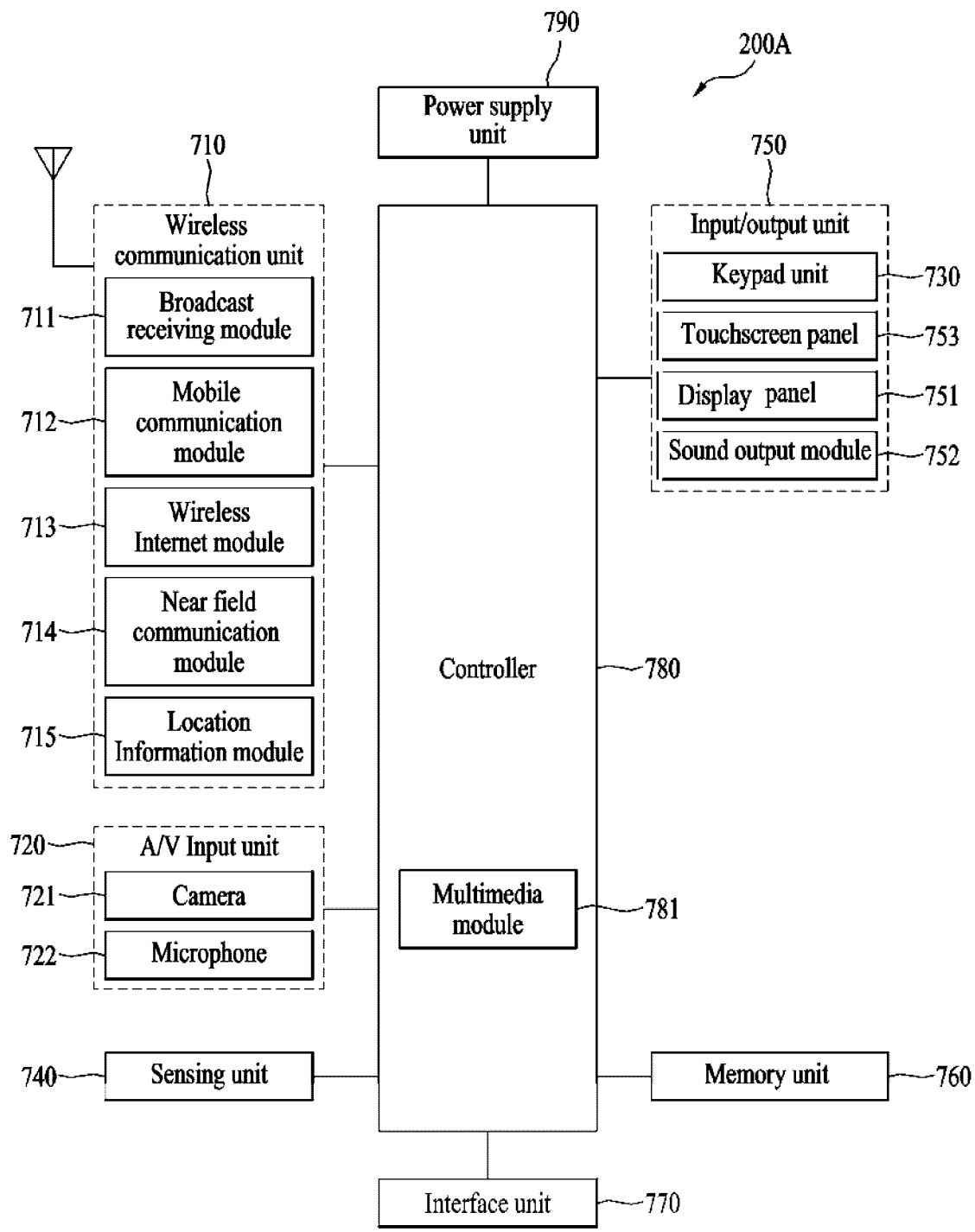
FIG. 26 is a view illustrating the configuration of the portable terminal illustrated in FIG. 25.

FIG. 25 is a perspective view illustrating a portable terminal 200A according to an embodiment. FIG. 26 is a view illustrating the configuration of the portable terminal illustrated in FIG. 25.

Referring to FIGS. 25 and 26, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 25 has a bar shape, without being limited thereto, and may be any of various types such as, for example, a slide type, a folder type, a swing type, or a swivel type, in which two or more sub-bodies are coupled so as to be movable relative to each other.

The body 850 may include a case (e.g. casing, housing, or cover) defining the external appearance of the terminal. For example, the body 850 may be divided into a front case 851 and a rear case 852. A variety of electronic components of the terminal may be mounted in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast reception module 711, a mobile communication module 712, a wireless Internet module 713, a nearfield communication module 714, and a location information module 715.

The A/V input unit 720 serves to input audio signals or video signals, and may include, for example, a camera 721 and a microphone 722.

The camera 721 may be the camera 200 including the lens moving apparatus 100 according to the embodiment illustrated in FIG. 18.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. For example, when the terminal 200A is a slide-type phone, the sensing unit 740 may detect whether the slide-type phone is open or closed. In addition, the sensing unit 740 serves to sense, for example, whether power is supplied from the power supply unit 790, or whether the interface unit 770 is coupled to an external component.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touch screen panel 753. The keypad unit 730 may generate input data in response to input to a keypad.

The display module 751 may include a plurality of pixels, the color of which varies in response to electrical signals. For example, the display module 751 may include at least one of a liquid crystal display, a thin film transistor liquid crystal display, an organic light emitting diode display, a flexible display and a 3D display.

The sound output module 752 may output audio data received from the wireless communication unit 710 in, for example, a call-signal-receiving mode, a call mode, a recording mode, a voice recognition mode, or a broadcast receiving mode, or may output audio data stored in the memory unit 760.

The touch screen panel 753 may convert variation in capacitance, caused by a user's touch on a specific region of a touch screen, into electrical input signals.

The memory unit 760 may store programs for the processing and control of the controller 780, and may temporarily store input/output data (e.g. a phone book, messages, audio, still images, pictures, and moving images). For example, the memory unit 760 may store images captured by the camera 721, for example, pictures or moving images.

The interface unit 770 serves as a passage for connection between the terminal 200A and an external component. The interface unit 770 may receive power or data from the external component, and may transmit the same to respective constituent elements inside the terminal 200A, or may transmit data inside the terminal 200A to the external component. For example, the interface unit 770 may include, for example, a wired/wireless headset port, an external charger port, a wired/wireless data port, a memory card port, a port for the connection of a device having an identification module, an audio input/output (I/O) port, a video I/O port, and an earphone port.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be provided inside the controller 780, or may be provided separately from the controller 780.

The controller 780 may perform pattern recognition processing, by which writing or drawing input to a touch screen is perceived as characters and images, respectively.

The power supply unit 790 may supply power required to operate the respective constituent elements upon receiving external power or internal power under the control of the controller 780.

The features, configurations, effects and the like described above in the embodiments are included in at least one embodiment, but are not necessarily limited to only one embodiment. In addition, the features, configuration, effects and the like exemplified in the respective embodiments may be combined with other embodiments or modified by those skilled in the art. Accordingly, content related to these combinations and modifications should be construed as falling within the scope of the embodiments.

INDUSTRIAL APPLICABILITY

The embodiments may be applied to a lens moving apparatus, which is capable of reducing the influence of induction magnetic field of an OIS coil on an OIS position sensor and of ensuring stability of OIS feedback control and reliability of handshake correction, and to a camera module and an optical device each including the same.

The invention claimed is:

1. A lens moving apparatus comprising:
   a housing;
   a bobbin disposed in the housing;
   a magnet disposed on the housing;
   a first coil disposed on the bobbin, the first coil being moved in an optical-axis direction via interaction with the magnet;
   an elastic member coupled to the bobbin and the housing;
   a second coil, to which a first drive signal is applied, the second coil moving the housing in a direction perpendicular to the optical-axis direction via the interaction with the magnet;
   a position sensor for detecting an intensity of a magnetic field of the magnet depending on movement of the housing; and
   a third coil, to which a second drive signal is applied and which is disposed so as to correspond to the position sensor,
   wherein a first magnetic field of the second coil, which is generated in response to the first drive signal, and a second magnetic field of the third coil, which is generated in response to the second drive signal, are directed so as to counteract each other.

2. The lens moving apparatus according to claim 1, further comprising a circuit board disposed under the housing and providing the first drive signal and the second drive signal,
   wherein the third coil is provided at the circuit board.

3. The lens moving apparatus according to claim 2, wherein the second coil is disposed on the circuit board, and the position sensor is disposed under the circuit board.

4. The lens moving apparatus according to claim 1, wherein each of the second coil and the third coil is configured to have a loop shape, which is wound clockwise or counterclockwise about the optical-axis, and a number of times the third coil is wound is smaller than a number of times the second coil is wound.

5. The lens moving apparatus according to claim 1, wherein at least part of the third coil overlaps the position sensor in the optical-axis direction.

6. The lens moving apparatus according to claim 1, wherein an intensity of the second magnetic field is smaller than an intensity of the first magnetic field.

7. The lens moving apparatus according to claim 2, wherein the third coil comprises:
   a first wire with one end connected to one terminal of the circuit board;
   a second wire with one end connected to another terminal of the circuit board; and
   a loop portion connected between the other end of the first wire and the other end of the second wire and having a loop shape.

8. The lens moving apparatus according to claim 7, wherein a point at which the other end of the first wire is connected to one end of the loop portion and a point at which the other end of the second wire is connected to the other end of the loop portion are spaced apart from each other by a predetermined distance.

9. The lens moving apparatus according to claim 4, wherein the number of times the third coil is wound is one time.

10. The lens moving apparatus according to claim 2, wherein a direction in which a first drive current flows and a direction in which a second drive current flows are opposite each other.

11. The lens moving apparatus according to claim 9, wherein the third coil comprises:
    a first region overlapping the second coil in a first direction; and
    a second region not overlapping the second coil in the first direction,
    wherein the first direction is the optical-axis direction.

12. The lens moving apparatus according to claim 11, wherein at least one portion of the first region overlaps the position sensor in the first direction.

13. The lens moving apparatus according to claim 11, wherein a diameter of the third coil in a second direction is smaller than or equal to a diameter of the position sensor in the second direction, and the second direction is perpendicular to the first direction and parallel to a longitudinal direction of the second coil.

14. The lens moving apparatus according to claim 11, wherein a length of the second region in a third direction is longer than a length of the first region in the third direction, and the third direction is perpendicular to the first direction and a longitudinal direction of the second coil.

15. The lens moving apparatus according to claim 7, wherein a diameter of the loop portion in a second direction is smaller than a diameter of the second coil in the second direction, and the second direction is perpendicular to the optical-axis direction and parallel to a longitudinal direction of the second coil.

16. A lens moving apparatus comprising:
    a housing;
    a bobbin disposed in the housing;
    a magnet disposed on the housing;
    a first coil disposed on the bobbin, the first coil being moved in an optical-axis direction via interaction with the magnet;
    an elastic member coupled to the bobbin and the housing;
    a second coil, to which a first drive signal is applied, the second coil moving the housing in a direction perpendicular to the optical-axis direction via the interaction with the magnet;

a position sensor for detecting an intensity of a magnetic field of the magnet depending on movement of the housing; and a third coil, to which a second drive signal is applied and which is disposed so as to correspond to the position sensor, wherein the third coil comprises:

a first region overlapping the second coil in a first direction; and a second region not overlapping the second coil in the first direction, wherein the first direction is the optical-axis direction.

17. The lens moving apparatus according to claim 16, wherein the third coil comprises:

a first wire and a second wire; and a loop portion connected between the first wire and the second wire and having a loop shape, wherein the loop portion comprises the first region and the second region.

18. The lens moving apparatus according to claim 17, wherein the first region overlaps the position sensor in the first direction, and the second region does not overlap the position sensor in the first direction.

19. The lens moving apparatus according to claim 16, wherein a length of the first region in a second direction is equal to or smaller than a diameter of the position sensor in the second direction, and the second direction is perpendicular to the first direction and parallel to a longitudinal direction of the second coil.

20. A lens moving apparatus comprising:

a housing;

a bobbin disposed in the housing;

a magnet disposed on the housing;

a first coil disposed on the bobbin, the first coil being moved in an optical-axis direction via interaction with the magnet;

an elastic member coupled to the bobbin and the housing;

a second coil, to which a first drive signal is applied, the second coil moving the housing in a direction perpendicular to the optical-axis direction via the interaction with the magnet;

a position sensor for detecting an intensity of a magnetic field of the magnet depending on movement of the housing; and a third coil, to which a second drive signal is applied and which is disposed so as to correspond to the position sensor, wherein the third coil comprises:

a first wire and a second wire; and a loop portion connected between the first wire and the second wire and having a loop shape.

* * * * *